United States Patent
Lee et al.

(10) Patent No.: US 11,166,333 B2
(45) Date of Patent: Nov. 2, 2021

(54) ELECTRONIC DEVICE AND METHOD FOR SWITCHING NETWORK CONNECTION BETWEEN PLURALITY OF ELECTRONIC DEVICES

(71) Applicant: SAMSUNG ELECTRONICS CO., LTD., Suwon-si (KR)

(72) Inventors: Wonchang Lee, Suwon-si (KR); Hyoungtak Cho, Suwon-si (KR); Jongsung Joo, Suwon-si (KR); Dongil Son, Suwon-si (KR); Sunkee Lee, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/889,148

(22) Filed: Jun. 1, 2020

(65) Prior Publication Data

US 2020/0383157 A1    Dec. 3, 2020

(30) Foreign Application Priority Data

May 30, 2019    (KR) .......................... 10-2019-0063823

(51) Int. Cl.
*H04B 7/00*        (2006.01)
*H04W 76/15*    (2018.01)
(Continued)

(52) U.S. Cl.
CPC ............. *H04W 76/15* (2018.02); *H04L 41/12* (2013.01); *H04W 4/80* (2018.02)

(58) Field of Classification Search
CPC ........ H04W 76/15; H04W 4/80; H04L 41/12; H04L 67/00; G01S 1/00
(Continued)

(56) References Cited

U.S. PATENT DOCUMENTS 9,392,626 B2    7/2016  Paisal et al.
2003/0224840 A1  12/2003  Frank et al.
(Continued)

OTHER PUBLICATIONS

International Search Report and Written Opinion dated Sep. 11, 2020 in counterpart International Patent Application No. PCT/KR2020/007076.

*Primary Examiner* — Don N Vo

(74) *Attorney, Agent, or Firm* — Nixon & Vanderhye P.C.

(57) ABSTRACT

An electronic device according to various embodiments may include: a communication circuit; a display; a memory; and at least one processor operably connected to the communication circuit, the display, and the memory. The at least one processor may be configured to control the electronic device to: identify a first network connection between the electronic device and a first external electronic device using the communication circuit. In response to the identification of the first network connection, the electronic device may identify a second external electronic device. In response to the identification of the second external electronic device, the at least one processor may display a UI for connecting the first external electronic device and the second external electronic device on the display. In response to an identification of an input on the UI, the at least electronic device may transmit, to the second external electronic device, information at least partially based on the first network connection and usable for establishing a second network connection between the first external electronic device and the second external electronic device.

20 Claims, 37 Drawing Sheets

(51) Int. Cl.
*H04W 4/80* (2018.01)
*H04L 12/24* (2006.01)

(58) Field of Classification Search
USPC .......................................... 375/356; 455/41.2
See application file for complete search history.

(56) References Cited

U.S. PATENT DOCUMENTS

| | | |
|---|---|---|
| 2008/0045234 A1* | 2/2008 | Reed ...................... H04W 8/02 |
| | | 455/456.1 |
| 2011/0164106 A1 | 7/2011 | Kim |
| 2016/0259622 A1 | 9/2016 | Kim |
| 2017/0155720 A1* | 6/2017 | Song ..................... B60R 16/023 |
| 2017/0237986 A1 | 8/2017 | Choi et al. |
| 2017/0303326 A1 | 10/2017 | Kwon et al. |
| 2018/0183855 A1 | 6/2018 | Sabella et al. |
| 2018/0317079 A1* | 11/2018 | Kang .................... H04W 8/005 |
| 2018/0348893 A1* | 12/2018 | Kim .................... G06F 3/04883 |
| 2019/0306712 A1* | 10/2019 | Suzuki .................... H04L 63/18 |

* cited by examiner

ELECTRONIC DEVICE AND METHOD FOR SWITCHING NETWORK CONNECTION BETWEEN PLURALITY OF ELECTRONIC DEVICES

CROSS-REFERENCE TO RELATED APPLICATION

This application is based on and claims priority under 35 U.S.C. § 119 to Korean Patent Application No. 10-2019-0063823, filed on May 30, 2019, in the Korean Intellectual Property Office, the disclosure of which is incorporated by reference herein in its entirety.

BACKGROUND

1) Field

The disclosure relates to an electronic device for switching network connection between a plurality of electronic devices and a method therefor.

2) Description of Related Art

Recently, with the advance of digital technology, various types of electronic devices such as a mobile communication terminal, a smartphone, a tablet personal computer (PC), an electronic organizer, a personal digital assistant (PDA), or a wearable device are widely used. Through the development of a communication network such as Internet, a communication service, such as a video call or Internet broadcasting, requiring a relatively wide bandwidth has been developed.

When a user carrying an electronic device such as a smartphone boards a vehicle, the user may use a speaker and/or a microphone in the vehicle, based on Bluetooth. In this case, the vehicle may perform a headset function of the electronic device. When a user executing an application (e.g. video call or personal broadcasting) using the electronic device boards a vehicle, a method for performing the application using the vehicle may be required in the vehicle.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide an electronic device and a method thereof in which a communication service such as a video call performed by a user can be switched based on whether a user boards a vehicle to provide a communication service based on the vehicle.

An electronic device according to various example embodiments may include: a communication circuit; a display; a memory; and at least one processor operably connected to the communication circuit, the display, and the memory, wherein the at least one processor is configured to: identify a first network connection between the electronic device and a first external electronic device using the communication circuit; identify a second external electronic device and the first external electronic device in a state where the identified first network connection is maintained; in response to the identification of the second external electronic device, control the display to display a UI for connecting the first external electronic device and the second external electronic device on the display; and in response to an identification of a user input to the UI, control the communication circuit to transmit, to the second external electronic device, information which is at least partially based on the first network connection and is usable for establishing a second network connection between the first external electronic device and the second external electronic device.

An electronic device according to various example embodiments may include: at least one communication module comprising communication circuitry; a speaker; a microphone; a camera; a display; a processor operably connected to the at least one communication module, the speaker, the microphone, the camera, and the display; and a memory operably connected to the processor, wherein the memory is configured to store instructions which, when executed, cause the processor to control the electronic device to: identify an external electronic device located within a designated distance from the electronic device through the at least one communication module; in response to the identification of the external electronic device, establish a first network connection with the external electronic device to identify whether a user registered in the external electronic device is a user registered in the electronic device; in response to an identification of the user registered in the external electronic device as the user registered in the electronic device, activate at least a part of the speaker, the microphone, the camera, and the display; receive information relating to a second network connection distinguished from the first network connection from the external electronic device through the first network connection; based on the received information, establish a third network connection based on at least one external server and the second network connection through the at least one communication module; and transmit information obtained from at least one of the microphone or the camera of the electronic device to the external server through the third network connection.

An electronic device according to various example embodiments may include: at least one communication module comprising communication circuitry; a user interface; a processor operably connected to the at least one communication module and the user interface; and a memory operably connected to the processor, wherein the memory is configured to store instructions which, when executed, cause the processor to control the electronic device to: establish a first network connection with at least one external server, configured for an application, using the at least one communication module; based on the first network connection being established, identify an external electronic device located within a designated distance from the electronic device and distinguished from the external server, using the at least one communication module; in response to the identification of the external electronic device, establish a second network connection with the external electronic device to identify whether a user registered in the external electronic device is a user registered in the electronic device; based on the user registered in the external electronic device being identified to be the user registered in the electronic device, transmit information relating to the first network connection to the external electronic device through the second network connection; receive an input relating to whether to receive a service related to the application through the external electronic device, through a user interface based on the application; and in response to receiving the input, request the external electronic device to establish a third network connection based on the first network connection and connect the external server and the external electronic device.

In an electronic device and a method thereof according to various example embodiments, a communication service such as a video call performed by a user can be switched according to whether the user boards a vehicle, to provide a communication service based on the vehicle.

Aspects which can be acquired by various example embodiments are not limited to the above described examples, and other aspects that have not been mentioned may be clearly understood by those skilled in the art from the following detailed description.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
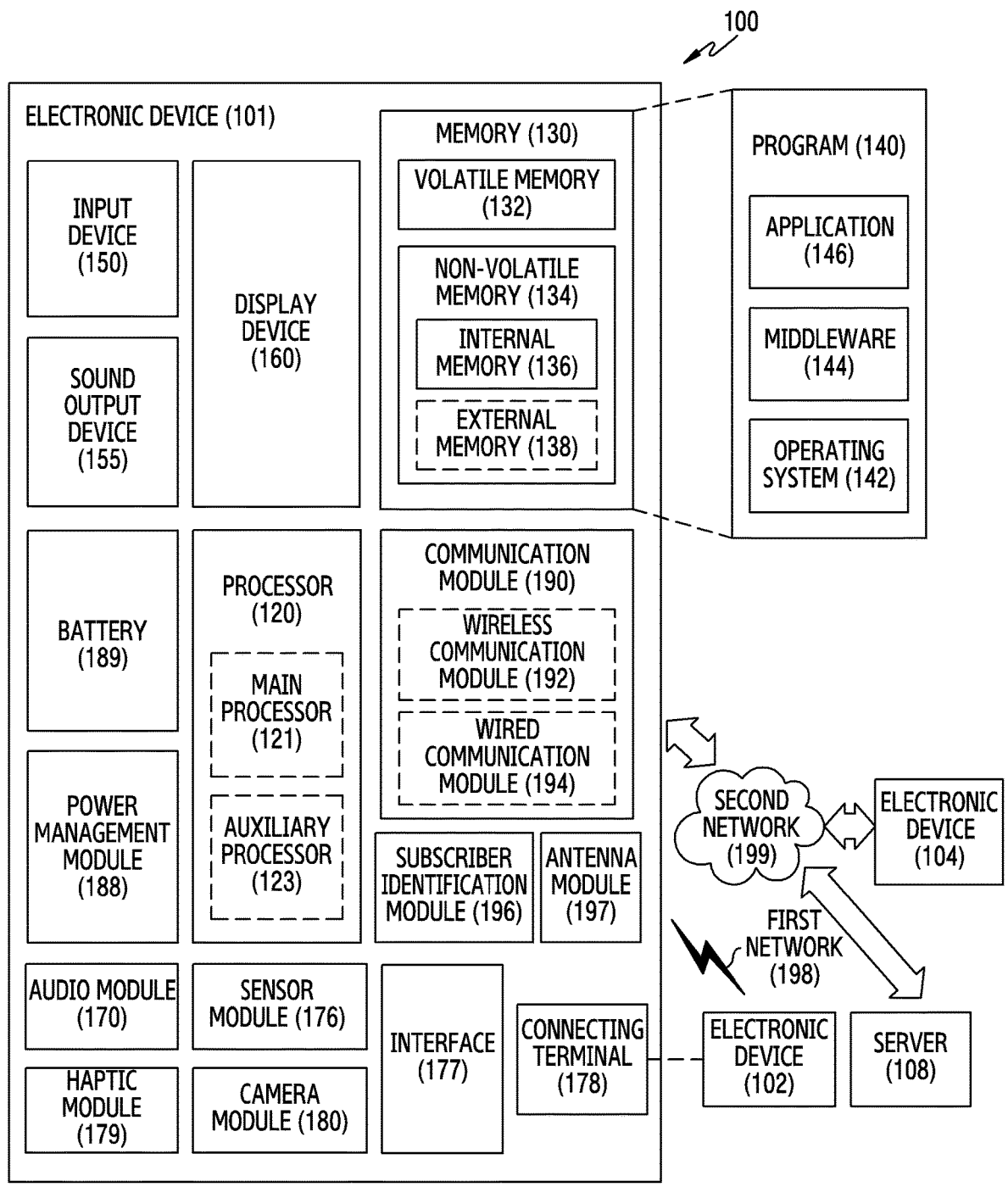
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
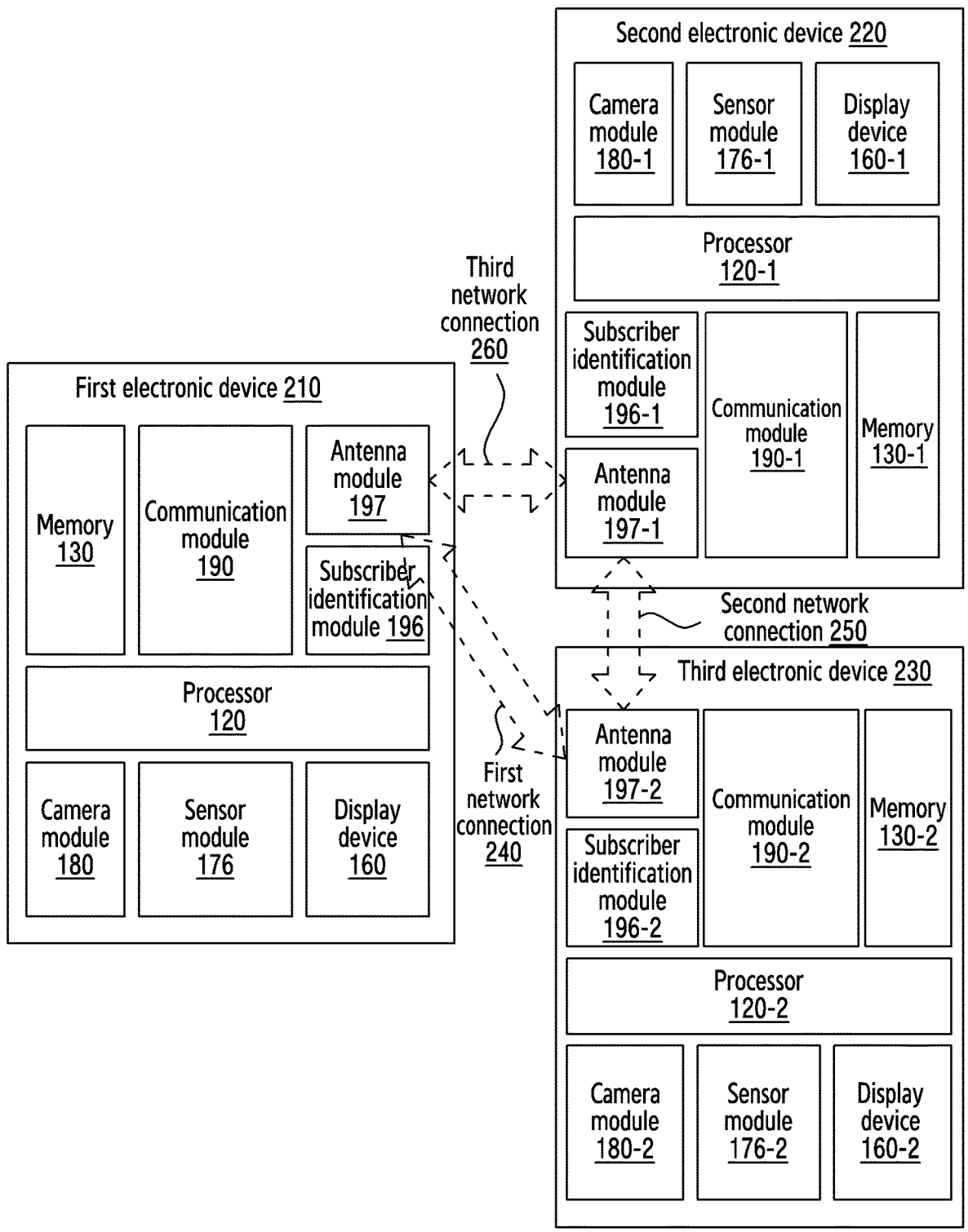
FIG. 2 is a block diagram illustrating an example first electronic device, a second electronic device, and a third electronic device according to various embodiments.

FIG. 2 is a block diagram illustrating an example first electronic device 210, a second electronic device 220, and a third electronic device 230 according to various embodiments. Each of the first electronic device 210 to the third electronic device 230 may correspond to the electronic device 101 in FIG. 1, and may include at least one of hardware components included in the electronic device 101 in FIG. 1.

Each of the first electronic device 210 and the third electronic device 230 may correspond, for example, to at least one of a smartphone, a smart pad, a tablet PC, a personal digital assistant (PDA), a laptop PC, a desktop PC, or the like. Each of the first electronic device 210 and the third electronic device 230 may be correspond, for example, to a wearable device including at least one of an accessory type (e.g. watch, ring, wristlet, anklet, necklace, glasses, contact lenses, head mounted device (HMD)), a fabric or clothing-integrated type (e.g. electronic clothing), a body-attached type (e.g. skin pad or tattoo), a bioimplant type (e.g. implantable circuit), or the like. The second electronic device 220 may be included in a vehicle. In an embodiment, the second electronic device 220 may be included in an electronic control unit (ECU) of a vehicle.

Hereinafter, the following description is based on the first electronic device 210, but the second electronic device 220 and the third electronic device 230 may include the same or similar hardware components as those of the first electronic device 210, and may operate similar to the first electronic device 210.

The first electronic device 210 may include at least one of a processor (e.g., including processing circuitry) 120, a memory 130, a sensor module 176, a camera module 180, a communication module (e.g., including communication circuitry) 190, a subscriber identification module (e.g., SIM) 196, display device 160, and/or an antenna module 197. The second electronic device 220 may include at least one of a processor (e.g., including processing circuitry) 120-1, a memory 130-1, a sensor module 176-1, a camera module 180-1, a communication module (e.g., including communication circuitry) 190-1, a subscriber identification module (e.g., SIM) 196-1, display device 160-1 and/or an antenna module 197-1. The third electronic device 230 may include at least one of a processor (e.g., including processing circuitry) 120-2, a memory 130-2, a sensor module 176-2, a camera module 180-2, a communication module (e.g., including communication circuitry) 190-2, a subscriber identification module (e.g., SIM) 196-2, a display device 160-2 and/or an antenna module 197-2.

The processor 120, 120-1, or 120-2, the memory 130, 130-1, or 130-2, the sensor module 176, 176-1, or 176-2, the camera module 180, 180-1, or 180-2, the communication module 190, 190-1, or 190-2, the subscriber identification module 196, 196-1, or 196-2, the display device 160, 160-1, 160-2 and/or the antenna module 197, 197-1, or 197-2 may correspond to the processor 120, the memory 130, the sensor module 176, the camera module 180, the communication module 190, the subscriber identification module 196, the display device 160 and/or the antenna module 197 illustrated in FIG. 1, respectively. The processor 120, the memory 130, the sensor module 176, the camera module 180, the communication module 190, the subscriber identification module 196, and the antenna module 197 may be electrically and/or operably coupled through a communication bus (not illustrated).

The processor 120 may include various processing circuitry and execute one or more instructions stored in the memory 130. The processor 120 may include at least one of a circuit configured to process data, for example, an integrated circuit (IC), an arithmetic logic unit (ALU), a field programmable gate array (FPGA) and a large scale integration (LSI). The memory 130 may store data relating to the first electronic device 210. The memory 130 may include a volatile memory such as a random access memory (RAM) including a static random access memory (SRAM) or a dynamic RAM (DRAM), or may include a nonvolatile memory such as a flash memory, an embedded multimedia card (eMMC), and a solid state drive (SSD), as well as a read only memory (ROM), a magnetoresistive RAM (MRAM), a spin-transfer torque MRAM (STT-MRAM), a phase-change RAM (PRAM), a resistive RAM (RRAM), and a ferroelectric RAM (FeRAM).

The memory 130 may store a plurality of instructions relating to an application and a plurality of instructions relating to an operating system (OS). An operating system is system software executed by the processor 120. The processor 120 may execute an operating system to manage the hardware components included in the first electronic device 210. An operating system may provide an application programming interface (API) to an application that is the remaining software other than system software.

In the memory 130, at least one application that is a set of a plurality of applications may be installed. An application being installed in the memory 130 may imply that the application is stored in a format allowing the application to be executed by the processor 120 connected to the memory 130. In an embodiment, an application for voice calls, video calls, and/or broadcasting may be installed in the memory 130. The application may perform the voice calls, the video calls, and/or the broadcasting, based on a network connection of an external electronic device (e.g. second electronic device 220 and/or third electronic device 230) distinguished from the first electronic device 210.

The display device 160 may visually output information to a user using, for example, and without limitation, at least one of organic light emitting diodes (OLEDs), a liquid crystal display (LCD), light emitting diodes (LEDs), or the like. The first electronic device 210 may include a touch sensor panel (TSP) (not illustrated) disposed on the display device 160 to allow a user interface (UI) output through the display device 160 to be more intuitionally controlled. The touch sensor panel may detect the position of an object (e.g. user's finger and stylus) hovering on the display device 160 or touching the display device 160 using at least one of a resistive film, a capacitive element, a surface acoustic wave, and infrared rays.

The sensor module 176 may include at least one sensor configured to identify the state of the first electronic device 210 and a space including the first electronic device 210. The sensor module 176 may include, for example, at least one of a gyro sensor, a gravity sensor, and an acceleration sensor which are configured to measure the posture or movement of the first electronic device 210. The sensor module 176 may include, for example, at least one of a microphone, an acoustic sensor, and an illuminance sensor which are configured to measure a surrounding environment of the first electronic device 210.

The camera module 180 may include one or more image sensors. The camera module 180 may output image data based on external light transferred from one or more lenses seen to the outside through a housing of the first electronic device 210, to the one or more image sensors. The image data may be converted into an image file by the processor 120 or may be included as frame data in a video file and/or video streaming.

Each of the first electronic device 210 and the third electronic device 230 may correspond to at least one of a smartphone, a smart pad, a tablet PC, a personal digital assistant (PDA), a laptop PC, or a desktop PC, the camera module 180 of each of the first electronic device 210 and the third electronic device 230 may be seen to the outside through at least one of a plurality of surfaces of a corresponding housing. In the case of the second electronic device 220 included in a vehicle, the camera module 180 may be seen to the outside through various components of the vehicle. An example in which the camera module 180 of the second electronic device 220 is disposed in a vehicle will be described in greater detail below with reference to FIGS. 8A and 8B.

The communication module 190 may include various communication circuitry and connect the first electronic device 210 with an external electronic device such as the second electronic device 220 and/or the third electronic device 230, based on a wireless network, such as, for example, and without limitation, Bluetooth, wireless fidelity (WiFi), near field communication (NFC), and long term evolution (LTE), and a wired network, such as local area network (LAN) and Ethernet. The communication modules 190 may include at least one of a communication circuit, a communication processor (CP) and a communication interface which support a wireless network or a wired network.

The communication module 190 may access a wireless network and/or a wired network, based on information (e.g. phone number or subscriber information such as IMSI) stored in the subscriber identification module 196. The communication module 190 may access the wireless network using the antenna module 197. Information stored in the subscriber identification module 196 may be used to identify the first electronic device 210 among a plurality of electronic devices connected to a wireless network. The subscriber identification module 196 may include at least one memory configured to store information required for identifying the first electronic device 210 in a wireless network and/or wired network.

The subscriber identification module 196 may be a type (e.g. SIM card) in which the subscriber identification module is attachable to the first electronic device 210, or a type (e.g. embedded SIM (eSIM)) in which the subscriber identification module is embedded in the first electronic device 210.

Information stored in the subscriber identification module 196 may include designated information (preset information) based on a contract between a user of the first electronic device 210 and a service provider of a wireless network. For example, a first user may be assumed to own both the first electronic device 210 and the second electronic device 220. Under the assumption, information stored in both the subscriber identification module 196 of the first electronic device 210 and the subscriber identification module 196 of the second electronic device 220 may be associated with an account of the first user. Under the assumption, the subscriber identification module 196 of the first electronic device 210 and the subscriber identification module 196 of the second electronic device 220 may have identifiers (e.g. different phone numbers) distinguished from each other, or identical identifiers according to a contract between the first user and a service provider.

Referring to FIG. 2, a first user may access a wireless network and/or a wired network through the first electronic device 210 and/or the second electronic device 220. For example, if a first user boards a vehicle including the second electronic device 220 while carrying the first electronic device 210 such as a mobile terminal, the first user may communicate with a second user having the third electronic device 230 using the first electronic device 210 and/or the second electronic device 220. The communication between the first user and the second user may be based on a communication service, such as broadcasting, that connects three or more users to each other, as well as voice calls and/or video calls.

Referring to FIG. 2, if a first user communicates with a second user having the third electronic device 230 using the first electronic device 210, the first electronic device 210 and the third electronic device 230 may be connected to each other through a first network connection 240 based on the communication module 190. If the first user communicates with the second user having the third electronic device 230 using the second electronic device 220, the second electronic device 220 and the third electronic device 230 may be connected to each other through a second network connection 250 based on the communication module 190. The first network connection 240 and/or the second network connection 250 may be based on a wireless network (e.g. 5G mobile communication network).

The second electronic device 220 of a vehicle may communicate with an external electronic device such as the first electronic device 210 and/or the third electronic device 230, based on, for example, vehicle-to-everything (V2X) and 5G cellular-V2X (5G C-V2X). The second electronic device 220 may share, based on the V2X, various types of information related to the vehicle with an external electronic device such as the first electronic device 210 and/or the third electronic device 230.

In an embodiment, information relating to a network connection connecting two electronic devices among a plurality of electronic devices may be shared with the remaining electronic device except the two electronic devices. For example, information relating to a first network connection 240 between the first electronic device 210 and the third electronic device 230 may be shared with the second electronic device 220. The information may be shared through a third network connection 260 between the first electronic device 210 and the second electronic device 220. The information may allow the second electronic device 220 to establish a second network connection 250 between the second electronic device 220 and the third electronic device 230.

In an embodiment, the first electronic device 210 to the third electronic device 230 may ensure seamless handover and/or continuity in transmission of media streams. In an embodiment, if a first network connection 240 is established for transmission of a media stream (e.g. real-time video data such as video call) between the first electronic device 210 and the second electronic device 220, the second electronic device 220 may establish the second network connection 250 such that the media stream is continued between the second electronic device 220 and the third electronic device 230 without disconnection. For example, if a first user boards a vehicle including the second electronic device 220 while performing a video call with a second user of the third electronic device 230 using the first electronic device 210, the video call between the first electronic device 210 and the third electronic device 230 may be continuously switched to a video call between the second electronic device 220 and the third electronic device 230.

As the video call requiring the transmission and reception of a relatively large volume of data is switched continuously, the first user may continuously perform the video call using the display device 160 (e.g. display in vehicle) of the second electronic device 220, which is larger than the display device 160 of the first electronic device 210 such as a mobile terminal. In an embodiment, as the first user performs the video call through the display device 160 of the second electronic device 220, having a relatively larger size, the user experience (UX) of the first user may be improved.

In a state where a user receives a service based on at least one of a voice call, a video call, and/or multimedia streaming (e.g. video streaming) using the first electronic device 210 according to various embodiments, as the user boards a vehicle including the second electronic device 220 according to various embodiments, the service may be switched (e.g. handed off) between the first electronic device 210 and the second electronic device 220. According to the switch of the service, images acquired through at least one of a plurality of cameras (e.g. a camera capturing a surrounding environment of the vehicle and/or a camera capturing the inside of the vehicle) included in the vehicle may be transmitted automatically and/or by a user's selection to another electronic device (e.g. one or more third electronic devices 230) distinguished from the first electronic device 210 and the second electronic device 220.

Hereinafter, an operation performed by the first electronic device 210 to the third electronic device 230 to ensure the continuity of a communication service such as a video call will be described in greater detail.

Figure 3:
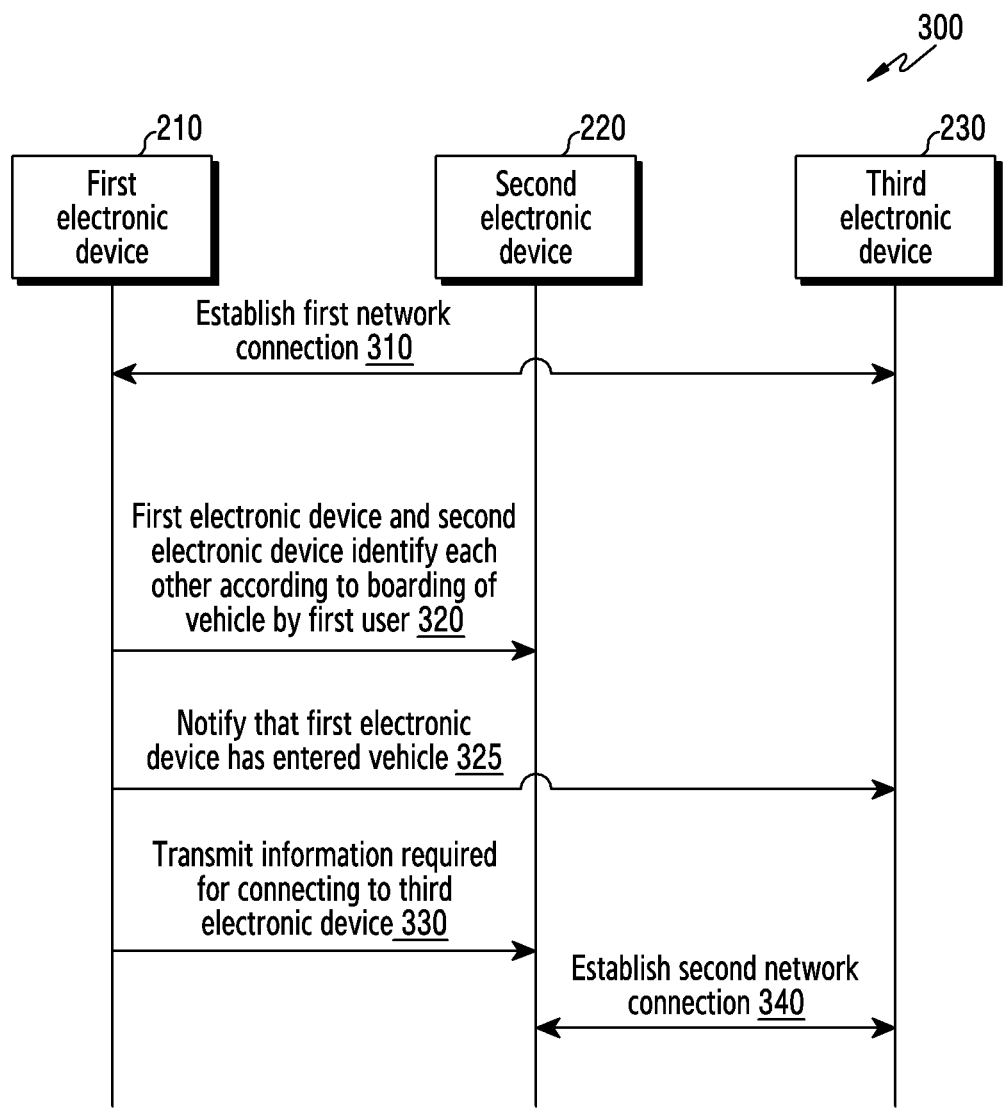
FIG. 3 is a signal flow diagram illustrating an operation of an example first electronic device, a second electronic device, and a third electronic device according to various embodiments.

FIG. 3 is a signal flow diagram 300 of a first electronic device 210, a second electronic device 220, and a third electronic device 230 according to various embodiments. The first electronic device 210 to the third electronic device 230 in FIG. 3 may correspond to the first electronic device 210 to the third electronic device 230 in FIG. 2, respectively. An operation in FIG. 3 may be performed by the first electronic device 210 to the third electronic device 230, and/or the processor 120, 120-1, or 120-2 in FIGS. 1 and 2.

Referring to FIG. 3, in operation 310, a first network connection between a first electronic device 210 of a first user and a third electronic device 230 of a second user may be established. The first network connection may correspond to the first network connection 240 in FIG. 2. For example, if the first user executes a video call application of the first electronic device 210 and inputs a phone number (e.g. phone number assigned to the third electronic device 230) of the second user, the first network connection may be established. The first network connection may correspond to a session between the first electronic device 210 and the third electronic device 230. The first electronic device 210 and the third electronic device 230 may display a UI relating to the first network connection.

Referring to FIG. 3, in operation 320, as the first user boards a vehicle, the first electronic device 210 and the second electronic device 220 may identify each other. In an embodiment, as the first user boards the vehicle, the first electronic device 210 may identify the state of the first electronic device 210 entering inside the vehicle. For example, in a state where the first user is carrying the first electronic device 210, a mobile terminal for example, when the first user boards the vehicle including the second electronic device 220, the first electronic device 210 and the second electronic device 220 may identify each other based on at least one sensor and/or a short-range wireless network (e.g. short-range wireless network based on Bluetooth, Bluetooth low energy (BLE), near field communication (NFC), wireless fidelity (WiFi), Zigbee, ultra-wide band (UWB), and/or wireless gigabit alliance (WiGig). As the user connects the first electronic device 210 and the second electronic device 220, based on a wired connection such as a USB and/or a wireless connection such as WiFi, the first electronic device 210 and the second electronic device 220 may identify each other based on the wired connection and/or the wireless connection. As the user starts a connected car service based on MirrorLink, Android Auto, and/or Car Play by controlling the first electronic device 210 and the second electronic device 220, the first electronic device 210 and the second electronic device 220 may identify each other.

In various example embodiments, as the first electronic device 210 and the second electronic device 220 may identify each other, a network connection (e.g. third network connection 260 in FIG. 2) based on the short-range wireless network may be established between the first electronic device 210 and the second electronic device 220. Various methods in which the first electronic device 210 and the second electronic device 220 identify each other will be described in greater detail below with reference to FIG. 5.

Referring to FIG. 3, in operation 325, the first electronic device 210 according to an embodiment may notify the third electronic device 230 that the first electronic device 210 and/or the first user of the first electronic device 210 has entered inside the vehicle including the second electronic device 220. In an embodiment, if the first electronic device 210 has identified the second electronic device 220, based on operation 320, the first electronic device 210 may transmit information notifying that the first user has boarded the vehicle including the second electronic device 220, to the third electronic device 230 through the first network connection, in operation 325.

The information may be used to change an indication of a UI of the first electronic device 210. For example, the first electronic device 210 may display a visual element for switching a communication service (e.g. video call service) based on the first network connection, to a communication service based on a second network connection between the second electronic device 220 and the third electronic device 230. The visual element may include at least one of a button, a dialog window, a text box, or an icon. A UI displayed based on the information by the first electronic device 210 will be described in greater detail below with reference to FIGS. 6A and 6B.

In response to reception of the information, the third electronic device 230 according to an embodiment may display a visual element for switching a communication service based on the first network connection to a communication service based on the second network connection. A UI displayed based on the information by the third electronic device 230 will be described in greater detail below with reference to FIGS. 12A and 12B.

In response to an identification of a user input for switching of the communication service, which is received from the first user and/or the second user, the first electronic device 210 according to various embodiments may transmit, to the second electronic device 220, information (e.g. resource information) required for the second electronic device 220 to connect to the third electronic device 230, in operation 330. The information may include, for example, information relating an identifier of the third electronic device 230, information (e.g. session ID) relating to a session of the first network connection, and information relating to data transferred through the first network connection.

In response to reception, from the first electronic device 210, of information required for connecting to the third electronic device 230, the second electronic device 220 according to various embodiments may establish a second network connection with the third electronic device 230, in operation 340. The second network connection may correspond to the second network connection 250 in FIG. 2. The second network connection may be at least partially based on the session of the first network connection. The first network connection between the first electronic device 210 and the third electronic device 230 may be stopped or maintained by the establishment of the second network connection.

In response to the establishment of the second network connection, the second electronic device 220 and the third electronic device 230 may display a UI relating to the second network connection. A UI relating to the second network connection, which is displayed by the second electronic device 220 will be described in detail with reference to FIGS. 10A and 10B. A UI relating to the second network connection, which is displayed by the third electronic device 230 will be described in greater detail below with reference to FIGS. 14A and 14B.

According to various embodiments, the second network connection between the second electronic device 220 and the third electronic device 230 may not stop a communication service based on the first network connection between the first electronic device 210 and the third electronic device 230. For example, the second network connection may be used to continuously provide a communication service based on the first network connection to the first user, based on the second electronic device 220. If the communication service is a voice call, the continuity (voice call to voice call continuity) of the voice call between the first user and the second user may be ensured based on the first network connection and the second network connection. If the communication service is a video call, the continuity (video call to video call continuity) of the video call between the first user and the second user may be ensured based on the first network connection and the second network connection.

For example, if the first user having a phone call (e.g. video call) with the second user of the third electronic device 230 using the first electronic device 210 boards a vehicle including the second electronic device 220, the first user may continuously perform the phone call, based on the second electronic device 220. The switch of the phone call between the first electronic device 210 and the second electronic device 220 may be automatically performed according to whether the user has boarded the vehicle, or may be performed by a user input of the first user and/or the second user on at least one of the first electronic device 210 to the third electronic device 230.

According to various embodiments, if a communication service provided between the first user and the second user is switched from the first network connection to the second network connection, the type of the communication service may be changed based on the second electronic device 220. For example, in a state where the first user and the second user performs a voice call, based on the first electronic device 210 and the third electronic device 230, if the first user boards a vehicle including the second electronic device 220, the voice call may be converted to a video call using a camera included in the vehicle and/or the second electronic device 220. In this case, the first electronic device 210 to the third electronic device 230 may ensure the continuity (voice call to video call continuity) between the voice call and the video call, based on the first network connection and the second network connection. Hereinafter, an operation performed by the first electronic device 210 in FIG. 3 to ensure the continuity of a communication service will be described in greater detail below with reference to FIG. 4.

Figure 4:
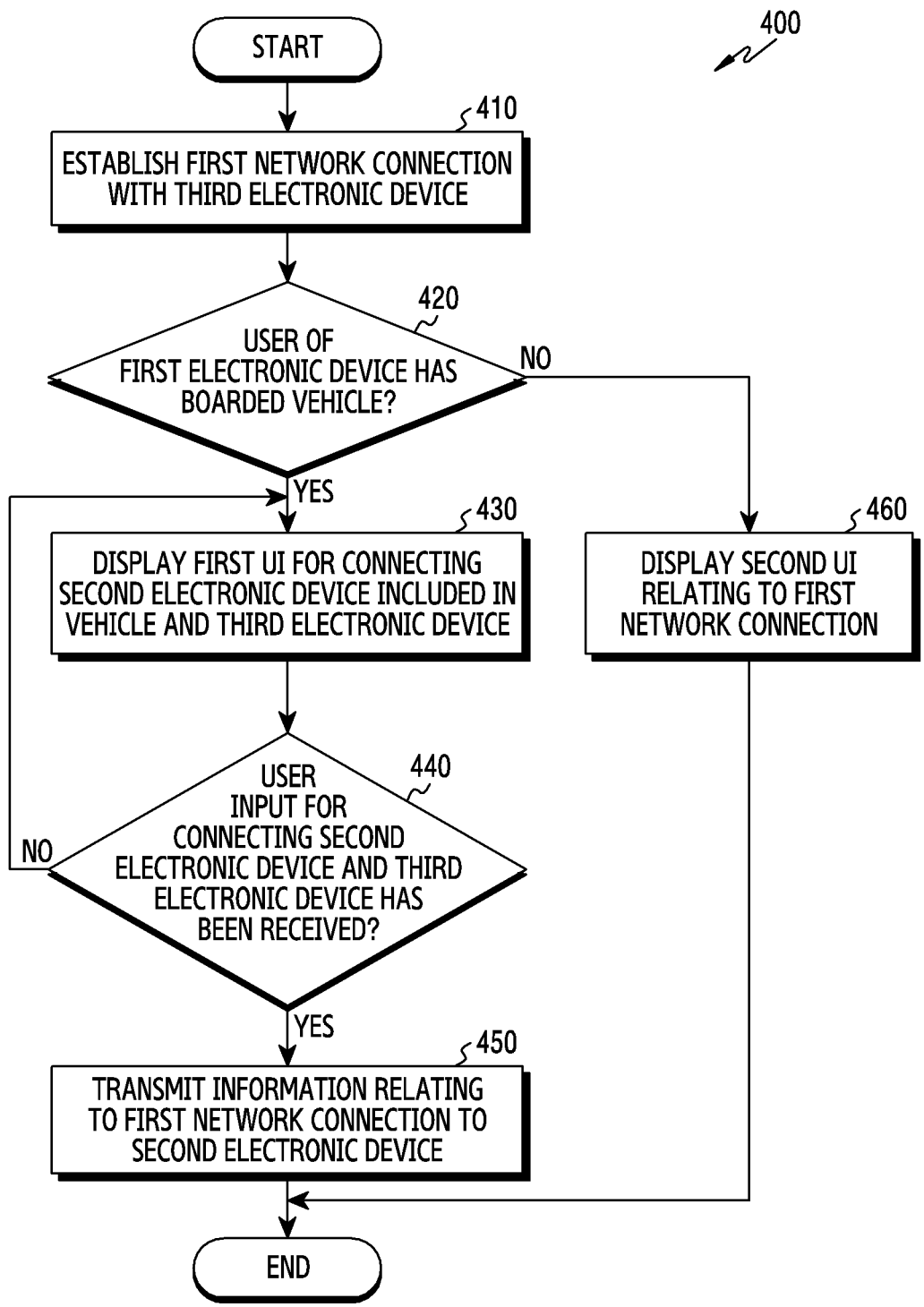
FIG. 4 is a flowchart illustrating an example operation of a first electronic device according to various embodiments.

FIG. 4 is a flowchart 400 illustrating an example operation of a first electronic device according to various embodiments. A first electronic device 210 in FIG. 4 may correspond to the first electronic device 210 in FIGS. 2 and 3. At least one of operations in FIG. 4 may be performed by the first electronic device 210 in FIGS. 2 and 3, and/or the processor 120 of the first electronic device 210 in FIG. 2. At least one of operations in FIG. 4 may be performed similar to at least one of the operations in FIG. 3.

Referring to FIG. 4, in operation 410, a first electronic device according to various embodiments may establish a first network connection with a third electronic device. The third electronic device may correspond to the third electronic device 230 in FIGS. 2 and 3. The first network connection may be related to a video call between a first user of the first electronic device and a second user of the third electronic device. The first network connection may correspond to the first network connection 240 in FIG. 2. The first network connection may be based on a 5G mobile communication network. Through the first network connection, voice and an image of the first user, obtained from the first electronic device and voice and an image of the second user, obtained from the third electronic device may be shared.

Referring to FIG. 4, in operation 420, the first electronic device according to various embodiments may determine whether the user of the first electronic device has boarded a vehicle. In an embodiment, a first electronic device may determine whether a user of a first electronic device and/or the first electronic device enters inside the vehicle. For example, the first user of the first electronic device may board a vehicle while the first user is performing a video call with the second user using the first electronic device. For example, in a state where the first network connection of operation 410 is maintained, the first user of the first electronic device may board a vehicle. For example, a user of the first electronic device may perform a video call with the second user using the first electronic device in a state where the user has boarded a vehicle. The first electronic device may determine whether the first user has boarded a vehicle, based on at least one sensor and/or a short-range wireless network (e.g. the third network connection 260 in FIG. 2). For example, if the first electronic device is connected to (e.g. pairing) a second electronic device included in a vehicle, based on a Bluetooth network, the first electronic device may determine whether the first user has boarded the vehicle. The second electronic device may correspond to the second electronic device 220 in FIGS. 2 and 3. An operation in which the first electronic device identifies the first user having boarded a vehicle will be described in greater detail below with reference to FIG. 5.

The first electronic device and the third electronic device according to various embodiments may display different UIs to the first user and the second user according to whether the first user has boarded a vehicle. For example, if the first user attempts to perform a video call with the first electronic device in a vehicle, the first electronic device may display a UI based on a result of identification of the vehicle and/or the second electronic device. As another example, the third electronic device receiving the video call may display a UI based on a result of identification, by the first electronic device, of the vehicle and/or the second electronic device.

If the user of the first electronic device has boarded a vehicle (operation 420—Yes), the first electronic device according to various embodiments may display a first UI for connecting a second electronic device included in the vehicle and the third electronic device, in operation 430. In an embodiment, the first electronic device may notify the third electronic device that the user of the first electronic device has boarded a vehicle (or the first electronic device has entered inside the vehicle). In an embodiment, the first electronic device may request the third electronic device to display a UI for connecting the second electronic device and the third electronic device. If the user of the first electronic device has not boarded a vehicle (operation 420—No), the first electronic device according to various embodiments may display a second UI relating to the first network connection, in operation 460. The first UI and the second UI may have different layouts. For example, the second UI may be designed for performing a video call using the first electronic device and the third electronic device, and the first UI may be designed for receiving a user input for connecting the second electronic device and the third electronic device while performing a video call between the first electronic device and the third electronic device. The first UI displayed according to the entering, into a vehicle, of the first electronic device according to an embodiment will be described in greater detail below with reference to FIGS. 6A and 6B.

In a state of displaying the first UI, the first electronic device according to various embodiments may determine whether a user input for connecting the second electronic device and the third electronic device has been received, in operation 440. The user input may be received from the first UI by the first user. In an embodiment, if a UI for connecting the second electronic device and the third electronic device is displayed to the second user through the third electronic device, the user input may be received from the UI displayed through the third electronic device by the second user.

If the user input has failed to be received (operation 440-NO), the first electronic device according to various embodiments may display the first UI while maintaining the first network connection between the first electronic device and the third electronic device. In an embodiment, if it is identified that a user does not connect the second electronic device and the third electronic device using the first UI (e.g. a user input in operation 440 is not performed during a designated time interval), the first electronic device may operate based on, for example, operation 430.

If a user input for connecting the second electronic device and the third electronic device is received (operation 440—Yes), the first electronic device according to various embodiments may transmit information relating to the first network connection to the second electronic device, in operation 450.

The information relating to the first network connection may include an identifier (e.g. session ID) assigned to the first network connection, and information (e.g. identifier assigned to the third electronic device, such as IP address, MAC address, and/or phone number, and security information relating to the first network connection) required for connecting to the third electronic device. The information may be transmitted through a third network connection (e.g. the third network connection 260 in FIG. 2) established between the first electronic device and the second electronic device.

After the transmission of the information, the second electronic device may be connected to the third electronic device, based on the information. For example, a second network connection (e.g. the second network connection 250 in FIG. 2) at least partially based on the first network connection of operation 410 may be established between the second electronic device and the third electronic device. The second network connection may be used to switch a video call between the first electronic device and the third electronic device to a video call between the second electronic device and the third electronic device.

Figure 5:
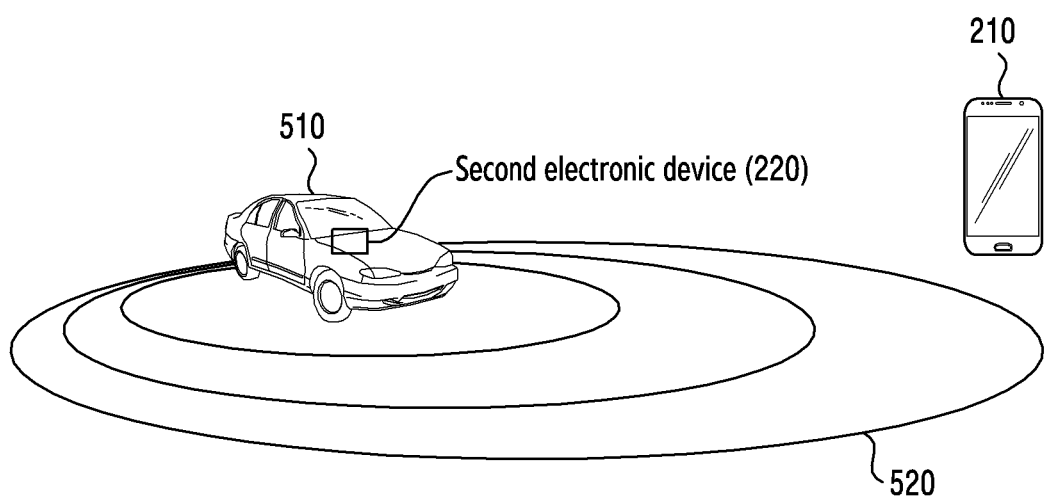
FIG. 5 is a diagram illustrating an example operation in which a first electronic device and a second electronic device identify each other according to various embodiments.

FIG. 5 is a diagram illustrating an example operation in which a first electronic device 210 and a second electronic device 220 according to various embodiments identify each other. The first electronic device 210 and the second electronic device 220 in FIG. 5 may correspond to the first electronic device 210 and the second electronic device 220 in FIGS. 2 and 3, respectively. An operation of the first electronic device 210 and the second electronic device 220 in FIG. 5 may be related to at least one of the operations (e.g. operation 310 in FIG. 3) in FIG. 3, and the operations (e.g. operation 420 in FIG. 4) in FIG. 4.

Referring to FIG. 5, a situation in which a first user (not illustrated) carrying a first electronic device 210 such as a mobile terminal approaches a vehicle 510 including a second electronic device 220 is illustrated. As the first user approaches the vehicle 510, a distance between the first electronic device 210, the second electronic device 220, and the vehicle 510 may be reduced.

According to an embodiment, the first electronic device 210 and the second electronic device 220 may identify each other, based on a beacon. For example, the first electronic device 210 may transmit a wireless signal based on a beacon at designated periods. The wireless signal may be based on ultra-wide band (UWB) and/or BLE. As the first user approaches the vehicle 510, if the distance between the first electronic device 210 and the second electronic device 220 is less than a designated distance, the second electronic device 220 may receive the wireless signal transmitted from the first electronic device 210. The second electronic device 220 may transmit a response signal of the received wireless signal to the first electronic device 210.

According to an embodiment, the wireless signal may be transmitted from the second electronic device 220. Referring to FIG. 5, the second electronic device 220 may transmit a wireless signal based on a beacon to the outside of the vehicle 510. If the first electronic device 210 enters inside a space 520 adjacent to the second electronic device 220 and/or the vehicle 510, the first electronic device 210 may receive a wireless signal transmitted from the second electronic device 220. The first electronic device 210 may transmit a response signal of the received wireless signal to the second electronic device 220.

The first electronic device 210 or the second electronic device 220 receiving the response signal may identify, based on the response signal, whether the first user has approached the second electronic device 220 and/or the vehicle 510 and/or whether the first user has boarded the vehicle 510. In an embodiment, the first electronic device 210 and/or the second electronic device 220 may more accurately identify a position relationship therebetween, based on at least one of the bandwidth, the strength, the direction, or the angle of arrival (AoA) of the wireless signal and/or the response signal.

In an embodiment, whether the first user has boarded the vehicle 510 may be identified based on periodic communication between the first electronic device 210 and the second electronic device 220 and/or at least one sensor included in the vehicle 510. The periodic communication may be based on vehicle to pedestrian (V2P) and/or vehicle to everything (V2X). In an embodiment, the first electronic device 210 may transmit a wireless signal based on a personal safety message (PSM) of V2X to the second electronic device 220. A wireless signal based on a PSM may include a plurality of parameters illustrated by way of example in Table 1.

TABLE 1

| Personal Safety Message | | Description | Note |
| --- | --- | --- | --- |
| basicType | | Designating purpose of using user terminal | Pedestrian Bicycle (Pedal_Cyclist) Public employee (Public Safety Worker) Animal |
| secMark | | Dsecond | |
| msgCnt | | Message order number | |
| Id | | Temporary ID | Random |
| Position | Latitude Longitude Elevation | Latitude, longitude, elevation | |
| Accuracy | | Accuracy | |
| Speed | | Speed | |
| heading | | Direction | |

Referring to Table 1, the first electronic device 210 may transmit a wireless signal including the type, the location, and the direction of the first user. The wireless signal may include information (e.g. information indicating speed and direction) relating to the movement of the first user and location information of the first user. The first electronic device 210 may transmit a wireless signal including the plurality of parameters in table 1 periodically, or based on a pre-configured condition. The second electronic device 220 may transmit a response signal to the first electronic device 210 in response to reception of the wireless signal, and identify the state (e.g. a state of approaching the vehicle 510 and/or a state of entering inside the vehicle 510) of the first user, based on the wireless signal.

In an embodiment, the first electronic device 210 and the second electronic device 220 may be paired to each other, based on Bluetooth. In this case, the first electronic device 210 and the second electronic device 220 may identify whether the first user has boarded the vehicle 510, based on the pairing. For example, if the first user boards and starts the vehicle 510 (or the first user opens a door of the vehicle 510), the first electronic device 210 and the second electronic device 220 may be paired to each other automatically. Based on the pairing, the first electronic device 210 and the second electronic device 220 may identify the first user having boarded the vehicle 510.

In an embodiment, the second electronic device 220 may identify the first user having boarded the vehicle 510, based on a plurality of sensors included in the vehicle 510. For example, the second electronic device 220 may identify the first user having been seated on a seat of the vehicle 510, based on a weight sensor disposed at the seat. For example, the second electronic device 220 may identify the first user having boarded the vehicle 510, based on a communication scheme (e.g. 5G and/or WiGig) having directivity.

In response to the identification of the first user boarding the vehicle 510, the first electronic device 210 may provide, to the second electronic device 220, a UI for switching a communication service based on a network connection between an external electronic device (e.g. the third electronic device 230 in FIG. 2) and the first electronic device 210. The UI may be output based on user authentication between the first electronic device 210 and the second electronic device 220. For example, in response to the identification of the first user boarding the vehicle 510, the first electronic device 210 and the second electronic device 220 may display the UI relating to the network connection between the external electronic device and the first electronic device 210, at least partially based on a result of authentication of the first user.

Figure 6A:
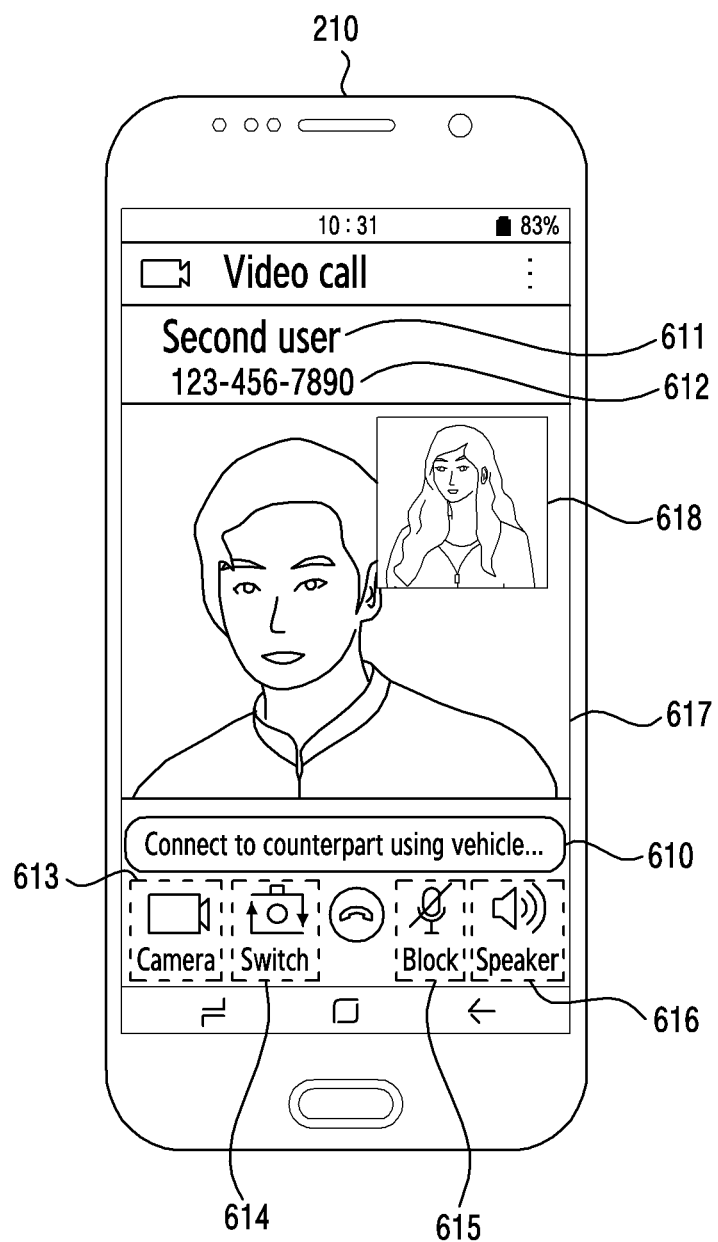
FIG. 6A is a diagram illustrating an example UI displayed to a user of a first electronic device by the first electronic device in a state where the user has boarded a vehicle according to various embodiments.
Figure 6B:
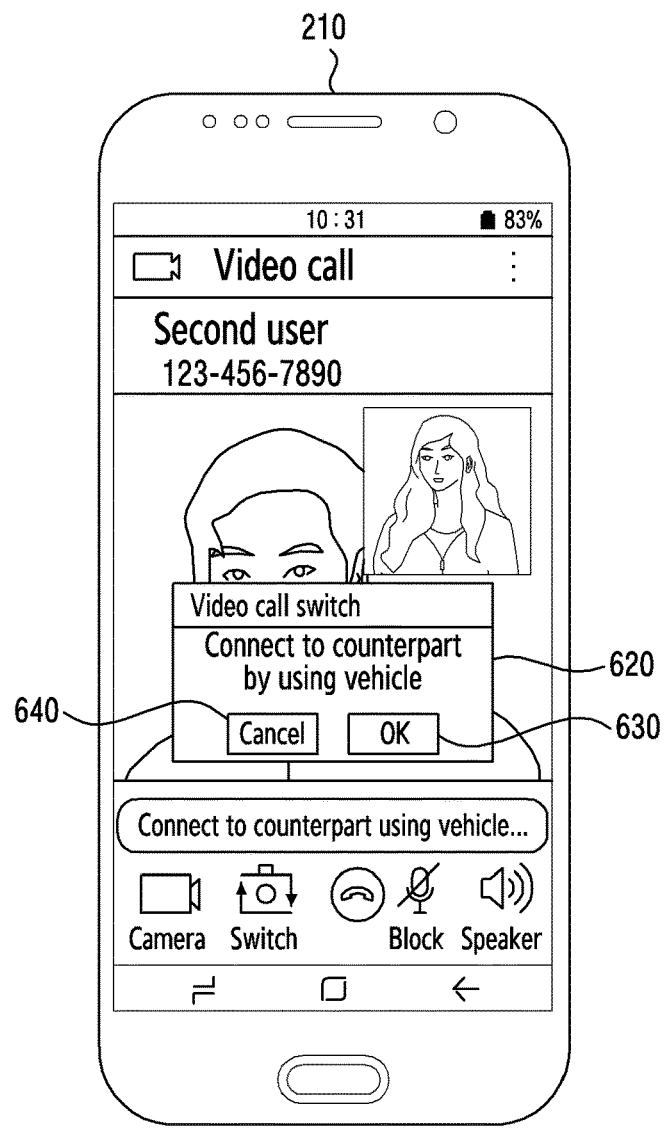
FIG. 6B is a diagram illustrating an example UI displayed to a user of a first electronic device by the first electronic device in a state where the user has boarded a vehicle according to various embodiments.

FIG. 6A is a diagram illustrating an example UI displayed to a user of a first electronic device 210 by the first electronic device 210 according to various embodiments in a state where the user has boarded a vehicle, and FIG. 6B is a diagram illustrating an example UI displayed to a user of a first electronic device 210 by the first electronic device 210 according to various embodiments in a state where the user has boarded a vehicle. A first electronic device 210 in FIGS. 6A and 6B may correspond to the first electronic device 210 in FIGS. 2 and 3. An operation of the first electronic device 210 illustrated in FIGS. 6A and 6B may be related to, for example, at least one of the operations in FIG. 3, and/or the operations (e.g. operation 430 and/or operation 440 in FIG. 4) in FIG. 4.

Referring to FIG. 6A, an example of a UI displayed on a display of the first electronic device 210 in a state where a first user of the first electronic device 210 has boarded a vehicle (e.g. the vehicle 510 including the second electronic device 220 in FIG. 5) including a second electronic device is illustrated. The UI may be display in a state where the first electronic device 210 and a third electronic device (e.g. the third electronic device 230 in FIGS. 2 and 3) distinguished from the second electronic device are connected to each other through a first network connection related to a video call.

In an embodiment, the first electronic device 210 may display, in a UI, information (e.g. the name 611 and/or phone number 612 of a second user of the third electronic device) relating to a video call. In an embodiment, the first electronic device 210 may display, in a UI, icons 613, 615, and/or 616 for controlling a plurality of hardware components (e.g. a camera, a microphone, and/or a speaker of the first electronic device 210) related to a video call, respectively. In an embodiment, if the first electronic device 210 includes a front camera and a rear camera, the first electronic device 210 may display an icon 614 for switching between the front camera and the rear camera in a UI. In an embodiment, the first electronic device 210 may display, in a UI, at least one video (e.g. an image 617 of the first user, obtained through a camera of the first electronic device 210 and an image 618 of a second user, obtained through a camera of the third electronic device) relating to a video call.

The first electronic device 210 may receive a user input relating to a video call based on the vehicle in a UI displayed on a display of the first electronic device 210. For example, if the first user performs the video call in the vehicle, the first electronic device 210 may display a visual element 610 for initiating a video call based on the vehicle on the display. The visual element 610 may be the type of a button, and may include text (e.g. connect to the counterpart using the vehicle) indicating that the video call based on the vehicle is started by selection of the button. In an embodiment, if the first user moves out of the vehicle, or has not entered the vehicle, the first electronic device 210 may restrict the visual element 610 from being displayed.

If the first user of the first electronic device 210 has boarded the vehicle, the third electronic device of the second user, related to a video call, as well as the first electronic device 210 displaying the visual element 610 may also display a visual element and/or UI for receiving a user input relating to a video call based on the vehicle. The visual element and/or UI displayed by the third electronic device will be described in greater detail below with reference to FIGS. 12A and 12B.

If the first user selects the visual element 610, referring to FIG. 6B, the first electronic device 210 according to an embodiment may display a window 620 for confirming a generation of a video call based on the second electronic device included in the vehicle. If the first user touches a cancel button 640 in the window 620, the first electronic device 210 may maintain a network connection between the first electronic device 210 and the third electronic device, based on the UI in FIG. 6A. In an embodiment, if the first user touches the cancel button 640, the first electronic device 210 may stop displaying a visual element 610 for initiating a video call based on the vehicle in the UI FIG. 6A. If the first user touches a confirm button 630 in the window 620, the first electronic device 210 may generate a network connection (e.g. the second network connection 250 in FIG. 2) between the second electronic device and the third electronic device, based on, for example, operation 450 in FIG. 4.

In an embodiment, the first electronic device 210 may display information relating to the position of the first user in the vehicle on the display. The information may be different according to a position in the vehicle, at which the first user of the first electronic device 210 has boarded. In an embodiment, the first electronic device 210 may display information relating to the type of the vehicle on the display. For example, according to whether the vehicle that the first user has boarded is a vehicle owned by the first user or a vehicle (e.g. taxi) not owned by the first user, the first electronic device 210 may display different information on the display. For example, if the first user has boarded a vehicle, such as a taxi, which is not owned by the first user, the first electronic device 210 may display information relating to a security problem which may occur by a video call through the vehicle, in response to a selection of a visual element 610 by the first user.

Hereinafter, an operation in which, after the first user has selected the confirm button 630 in FIG. 6B, the second electronic device included in the vehicle establishes a second network connection based on the first network connection between the first electronic device and the third electronic device, and an operation in which the second electronic device continuously performs a service (e.g. video call service) related to the first network connection, based on the second network connection will be described in greater detail.

Figure 7:
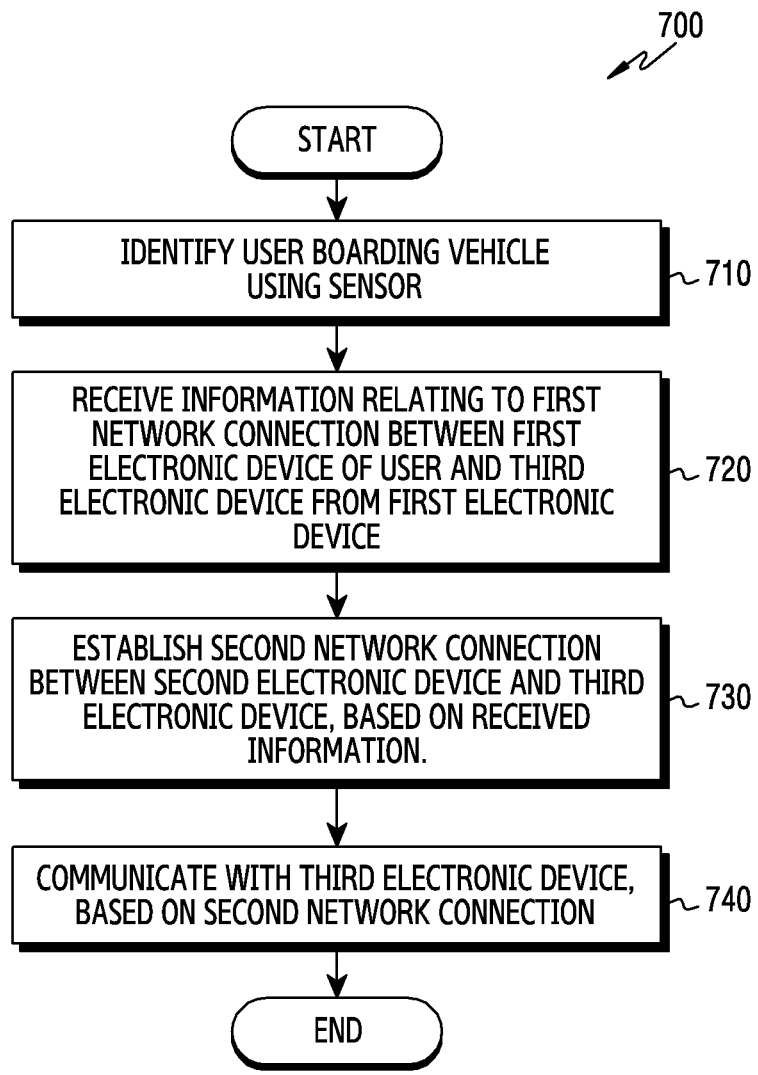
FIG. 7 is a flowchart illustrating an example operation of a second electronic device according to various embodiments.

FIG. 7 is a flowchart 700 illustrating an example operation of a second electronic device according to various embodiments. A second electronic device in FIG. 7 may correspond to the second electronic device 220 in FIGS. 2, 3, and 5. At least one of operations in FIG. 7 may be performed by the second electronic device 220 in FIGS. 2, 3, and 5, and/or the processor 120-1 of the second electronic device 220 in FIG. 2. At least one of operations in FIG. 7 may be performed similar to at least one of the operations in FIG. 3.

Referring to FIG. 7, in operation 710, a second electronic device according to various embodiments may identify a user boarding a vehicle using at least one sensor. The at least one sensor may be disposed at a seat to detect a user seating the seat, or may include a sensor configured to detect a movement in an internal space of the vehicle. The at least one sensor may include an image sensor configured to capture an image in the vehicle. In an embodiment, the second electronic device may identify a user boarding the vehicle by identifying a first electronic device (e.g. the first electronic device 210 in FIGS. 2 and 3), based on a short-range wireless network. An operation in which the second electronic device identifies a user boarding the vehicle using the at least one sensor included in the vehicle will be described in greater detail below with reference to FIGS. 8A and 8B.

In an embodiment, in response to the identification of a user boarding the vehicle, the second electronic device may authenticate the user boarded. An operation after operation 710 may be performed based on a result of the authentication of the user by the second electronic device. The authentication of a user by the second electronic device may be performed based on at least one sensor that is included in the first electronic device, the second electronic device, and/or the vehicle and is configured to obtain user biometric information (e.g. at least one of voice, fingerprint, iris, or face of the user).

Referring to FIG. 7, in operation 720, the second electronic device according to various embodiments may receive information relating to a first network connection between the first electronic device of the user and a third electronic device (e.g. the third electronic device 230 in FIGS. 2 and 3) from the first electronic device. The information may be transmitted to the second electronic device, based on a user input (e.g. a user input selecting the confirm button 630 in FIG. 6B) requesting a network connection between the second electronic device and the third electronic device. In an embodiment, operation 720 may be performed in a state where an authenticated user has boarded the vehicle.

The information may include at least one of information for identifying the first network connection, an identifier of the third electronic device, and information relating to a service provided to the user through the first network connection. For example, the information for identifying the first network connection may include a session ID assigned to the first network connection. For example, the identifier of the third electronic device may include an IP address, a MAC address, and/or a phone number of the third electronic device. For example, the information relating to a service provided to the user through the first network connection may include information indicating the type of the service, such as video calls, voice calls, or broadcasting. In an embodiment, the information relating to the first network connection, received by the second electronic device may be information for switching a service provided to the user, from the first network connection between the first electronic device and the third electronic device to a network connection to be established between the second electronic device and the third electronic device.

Referring to FIG. 7, in operation 730, the second electronic device according to various embodiments may establish a second network connection between the second electronic device and the third electronic device, based on the received information. In an embodiment, the second electronic device may establish the second network connection by connecting to the third electronic device, based on the information relating to the first network connection, received in operation 720. For example, the second electronic device may identify the third electronic device related to the first network connection, based on an identifier included in the information in a wireless network. In response to the identification of the third electronic device, the second electronic device may request the third electronic device to establish the second network connection.

Referring to FIG. 7, in operation 740, the second electronic device according to various embodiments may communicate with the third electronic device, based on the second network connection. A service provided to the user through the second network connection may correspond to a service provided to the user through the first network connection. For example, if the user uses a video call service through the first network connection between the first electronic device and the third electronic device, the second electronic device may provide the user with a video call service between the second electronic device and the third electronic device through the second network connection. An operation performed by the second electronic device while communicating with the third electronic device, based on the second network connection will be described in greater detail below with reference to FIG. 9, and FIGS. 10A and 10B.

Figure 8A:
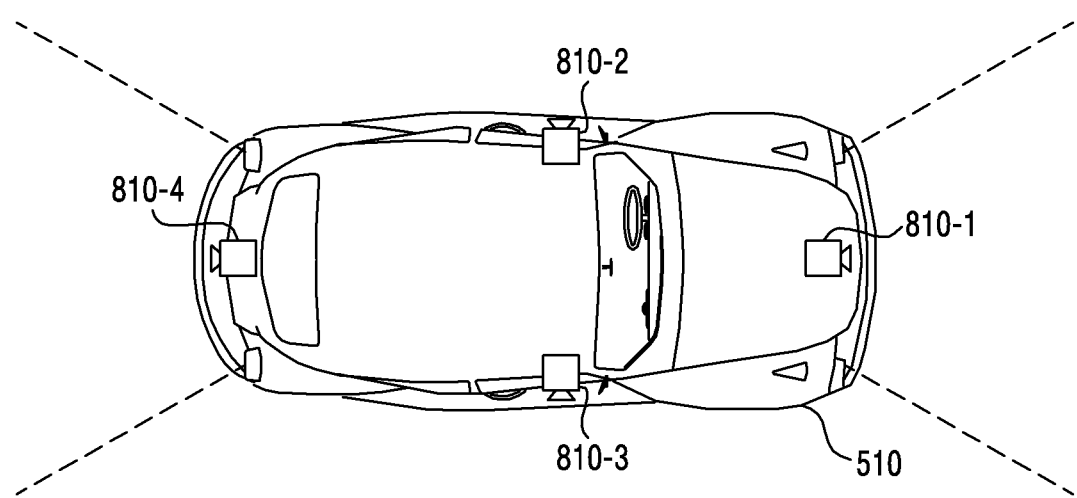
FIG. 8A is a diagram illustrating an example of a plurality of sensors included in a vehicle including a second electronic device according to various embodiments.
Figure 8B:
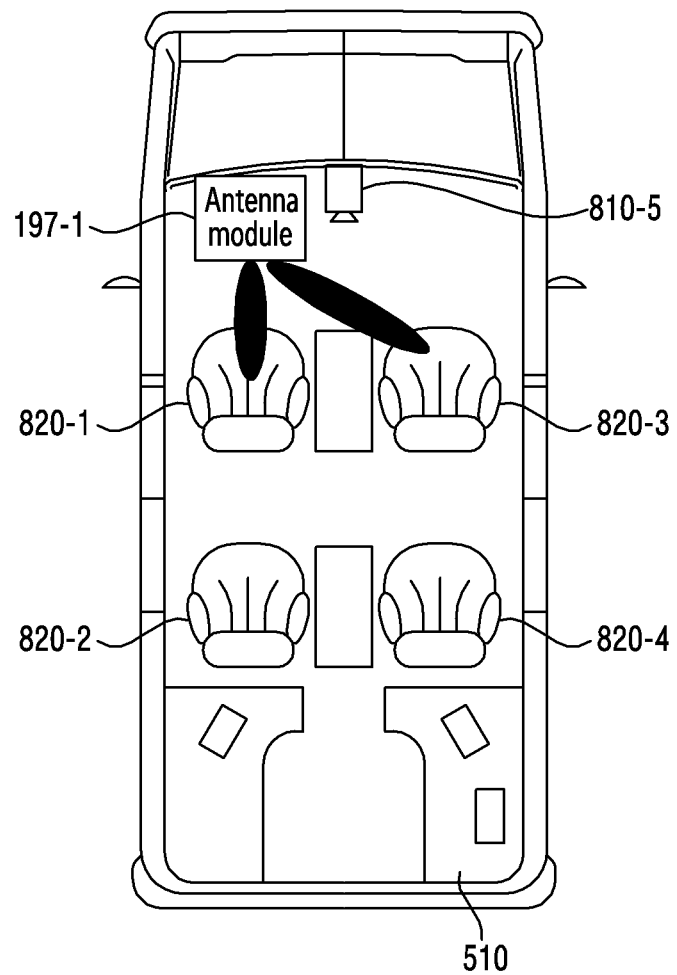
FIG. 8B is a diagram illustrating an example of a plurality of sensors included in a vehicle including a second electronic device according to various embodiments.

FIG. 8A is a diagram illustrating an example of a plurality of sensors included in a vehicle 510 including a second electronic device according to various embodiments, and FIG. 8B is a diagram illustrating an example of a plurality of sensors included in a vehicle 510 including a second electronic device according to various embodiments. The vehicle 510 in FIGS. 8A and 8B may correspond to the vehicle 510 in FIG. 5. The second electronic device may correspond to the second electronic device 220 in FIGS. 2, 3, and 5. The plurality of sensors illustrated in FIGS. 8A and 8B may be related to the sensor module 176-1 of the second electronic device 220 in FIG. 2, or may be included in the sensor module 176-1.

Referring to FIG. 8A, a plurality of cameras 810-1, 810-2, 810-3, or 810-4 oriented toward the outside of the vehicle 510 are illustrated. The plurality of cameras 810-1, 810-2, 810-3, or 810-4 may be arranged toward the front, the sides, and the rear of the vehicle 510, respectively. The plurality of cameras 810-1, 810-2, 810-3, or 810-4 may capture images of the front, the sides, and the rear respectively, from light having a visible wavelength band, an ultraviolet wavelength band, and/or an infrared wavelength band. In an embodiment, the vehicle 510 may include at least one sensor configured to detect information relating to the front, the sides, and the rear. The at least one sensor may detect illuminance and/or temperature or detect an obstacle.

Referring to FIG. 8B, at least one camera 810-5 and a plurality of sensors 820-1, 820-2, 820-3, or 820-4 arranged inside the vehicle 510 are illustrated. The camera 810-5 may be disposed inside the vehicle 510 to capture an image of a user (e.g. a user carrying a first electronic device) having boarded the vehicle 510. For example, the second electronic device may process an image captured by the camera 810-5, based on machine learning and/or image recognition to identify a user included in the image. In response to the identification of a user included in an image captured by the camera 810-5, the second electronic device may determine whether the user has boarded the vehicle, or may perform user authentication. The plurality of sensors 820-1, 820-2, 820-3, or 820-4 may be arranged at a plurality of seats of the vehicle 510, respectively. For example, the second electronic device may measure a change in the weight of each seat and/or a change of an electromagnetic field formed in a space adjacent to each seat using the plurality of sensors 820-1, 820-2, 820-3, or 820-4, to detect a seat on which a user seats among the plurality of seats.

The second electronic device according to an embodiment may detect a user boarding the vehicle 510 using a cradle included in the vehicle 510. For example, if a user places a first electronic device on the cradle, the second electronic device may identify the first electronic device and the user, based on a connection (e.g. NFC and/or connection related to wireless charging) between the cradle and the first electronic device.

Referring to FIG. 8B, the antenna module 197-1 of the second electronic device may be disposed to emit an electromagnetic field toward the inside of the vehicle 510. The second electronic device may emit an electromagnetic field (e.g. an electromagnetic field based on 5G standards, and/or an electromagnetic field based on WiGig standards) having directivity, based on the antenna module 197-1. Based on the electromagnetic field, the second electronic device may identify a user having entered inside the vehicle 510.

In an embodiment, hardware components (e.g. the plurality of cameras 810-1, 810-2, 810-3, 810-4, or 810-5, the plurality of sensors 820-1, 820-2, 820-3, or 820-4, the antenna module 197-1, and the second electronic device (not illustrated)) included in the vehicle 510 may be connected to each other based on an open connectivity foundation (OCF). At least one of the hardware components may be installed in the vehicle 510 by a manufacturer of the vehicle 510, or may be installed in the vehicle 510 by a user. In an embodiment, the second electronic device may store attributes related to the hardware components, for example, by a type of meta information. The attributes may include at least one of the capability, the type, the position in the vehicle 510, or the direction of a hardware component. At least a part of the meta information may be provided to a user together with information (e.g. information received from at least one of the plurality of cameras 810-1, 810-2, 810-3, 810-4, or 810-5) received from a corresponding hardware component.

In response to an identification of a user having entered inside the vehicle 510, the second electronic device according to an embodiment may activate at least one of the plurality of cameras 810-1, 810-2, 810-3, 810-4, or 810-5 in reference to the position of the user in the vehicle 510, based on the individual directions of the plurality of cameras 810-1, 810-2, 810-3, 810-4 or 810-5, indicated by meta information. For example, the second electronic device may identify a seat in the vehicle 510, on which a user has seated, based on the plurality of sensors 820-1, 820-2, 820-3, or 820-4 may activate a camera corresponding to the identified seat. An image obtained from the activated camera may be transmitted to another user (e.g. the second user of the third electronic device 230 in FIG. 3) distinguished from the user.

In an embodiment, the second electronic device disposed in the vehicle 510 may obtain data from the plurality of cameras 810-1, 810-2, 810-3, or 810-4 oriented toward the outside of the vehicle 510, the at least one camera 810-5 oriented toward the inside of the vehicle 510, and/or the plurality of sensors 820-1, 820-2, 820-3, or 820-4. The second electronic device may transmit the obtained data to a third electronic device, based on, for example, operation 740 in FIG. 7. In an embodiment, data obtained from the plurality of cameras 810-1, 810-2, 810-3, 810-4, or 810-5 and/or the plurality of sensors 820-1, 820-2, 820-3, or 820-4 that exist in the vehicle 510 may be used for a communication service (e.g. video call service and/or broadcasting service) performed between the second electronic device and the third electronic device. Hereinafter, an operation in which the second electronic device included in the vehicle 510 uses data obtained from the plurality of cameras 810-1, 810-2, 810-3, 810-4, or 810-5 for the communication service will be described in greater detail below with reference to FIG. 9.

Figure 9:
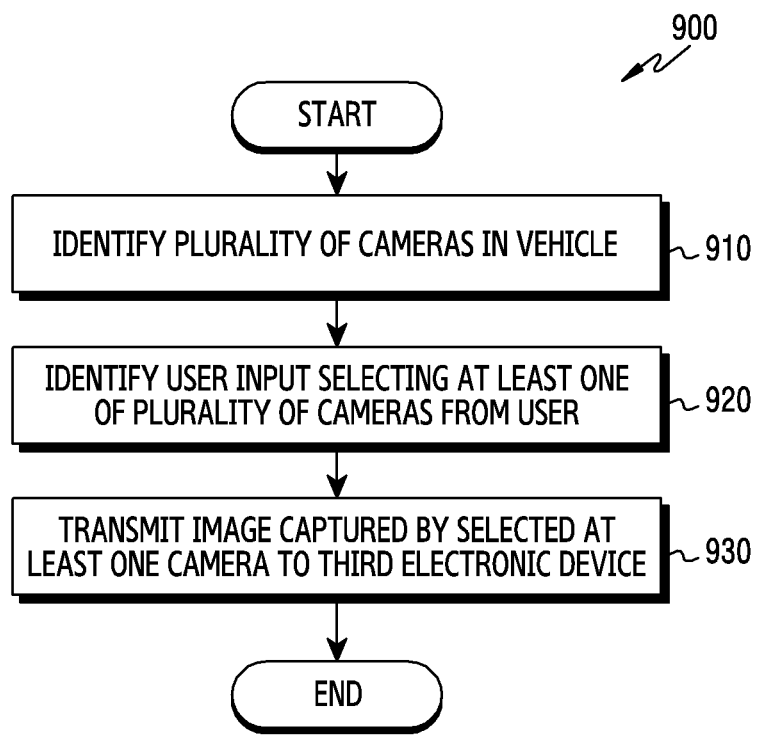
FIG. 9 is a flowchart illustrating an example operation in which a second electronic device communicates with a third electronic device based on information obtained from a plurality of sensors included in a vehicle according to various embodiments.

FIG. 9 is a flowchart 900 illustrating an example operation in which a second electronic device according to various embodiments communicates with a third electronic device, based on information obtained from a plurality of sensors included in a vehicle. A second electronic device in FIG. 9 may correspond to the second electronic device 220 in FIGS. 2, 3, and 5. At least one of operations in FIG. 9 may be performed by the second electronic device 220 in FIGS. 2, 3, and 5, and/or the processor 120 of the second electronic device 220 in FIG. 2. At least one of operations in FIG. 9 may be based on or performed similar to the operations in FIG. 3 and/or the operations (e.g. operation 740 in FIG. 7) in FIG. 7.

Referring to FIG. 9, in operation 910, a second electronic device according to various embodiments may identify a plurality of cameras in a vehicle. The second electronic device may be connected to at least one of hardware component (e.g. the plurality of cameras 810-1, 810-2, 810-3, 810-4, and/or 810-5 in FIGS. 8A and 8B) disposed in the vehicle, through an interface in the vehicle. The second electronic device may obtain information relating to an identifier, the position, and/or the field-of-view (FOV) of each of the plurality of cameras.

Referring to FIG. 9, in operation 920, the second electronic device according to various embodiments may identify a user input selecting at least one of the plurality of cameras from a user. The user is a user having boarded the vehicle, and may be a first user carrying a first electronic device (e.g. the first electronic device 210 in FIGS. 2 and 3), or a second user of a third electronic device (e.g. the third electronic device 230 in FIGS. 2 and 3) connected to the second electronic device through a wireless network. In an embodiment, the second electronic device may display information relating to the identified plurality of cameras on a display included in the vehicle. The first user having boarded the vehicle may select at least one of the plurality of cameras by touching the display or pushing a button disposed in the vehicle. An operation in which the second electronic device identifies the user input using the display included in the vehicle will be described in detail with reference to FIGS. 10A and 10B.

In an embodiment, the second electronic device may transmit information relating to the identified plurality of cameras to a third electronic device connected through a wireless network. A second user of the third electronic device may select at least one of the plurality of cameras using the third electronic device. In response to identification of the second user selecting the at least one of the plurality of cameras, the third electronic device may request the second electronic device to transmit an image captured by the selected at least one camera. Based on the request, the second electronic device may identify a user input selecting the at least one of the plurality of cameras from the second user. An operation in which the third electronic device identifies the user input from the second user will be described in greater detail below with reference to FIGS. 12A and 12B.

The second electronic device according to an embodiment may select at least one of the plurality of cameras without a user input in a state where the user input selecting at least one of the plurality of cameras has not been received. For example, if a state of the second electronic device and/or the vehicle satisfies a designated state, the second electronic device may select at least one of the plurality of cameras, based on the state of the second electronic device and/or the state of the vehicle. For example, the designated state may include the occurrence of an accident and/or a collision related to a user and/or the vehicle, and on-boarding and/or off-boarding of a user.

Referring to FIG. 9, in operation 930, the second electronic device according to various embodiments may transmit an image captured by the at least one camera selected by the user input to the third electronic device. In an embodiment, the second electronic device may extract an image captured by the at least one camera related to the user input identified based on operation 920, among a plurality of images that are being captured by the plurality of cameras included in the vehicle. The second electronic device may transmit the extracted image captured by the at least one camera to the third electronic device.

In an embodiment, the second electronic device may transmit, to the third electronic device, information for extracting or cropping an image captured by the at least one camera related to the identified user input, while merging a plurality of images that are being captured by the plurality of cameras, and transmitting the merged image to the third electronic device. In this case, the third electronic device may crop the merged image, based on the information, to extract the image captured by the at least one camera selected by the user input.

In an embodiment, the second electronic device included in the vehicle may perform an operation similar to an operation in FIG. 9 with respect to a plurality of sensors included in the vehicle. For example, the second electronic device may identify a user input of the first user and/or the second user selecting at least one of the plurality of sensors. In response to the identification of the user input, the second electronic device may transmit data of the selected at least one sensor to the third electronic device.

Figure 10A:
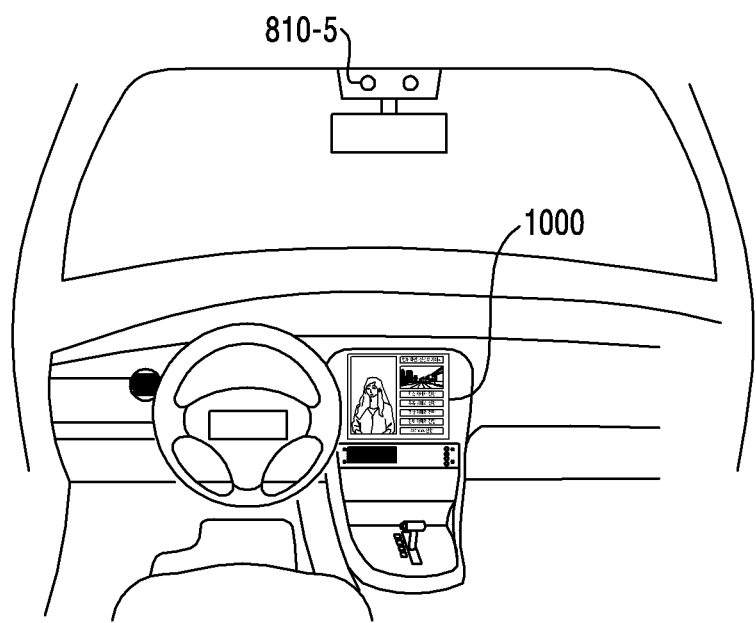
FIG. 10A is a diagram illustrating an example UI displayed through a display installed in a vehicle by a second electronic device according to various embodiments.
Figure 10B:
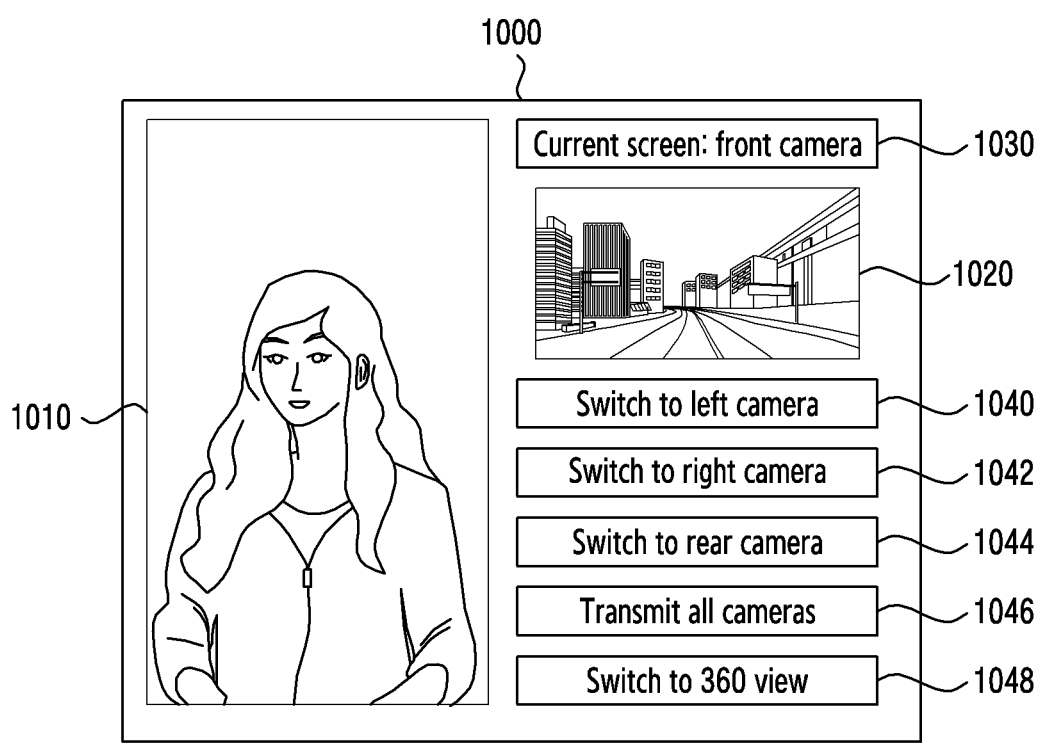
FIG. 10B is a diagram illustrating an example UI displayed through a display installed in a vehicle by a second electronic device according to various embodiments.
Figure 10C:
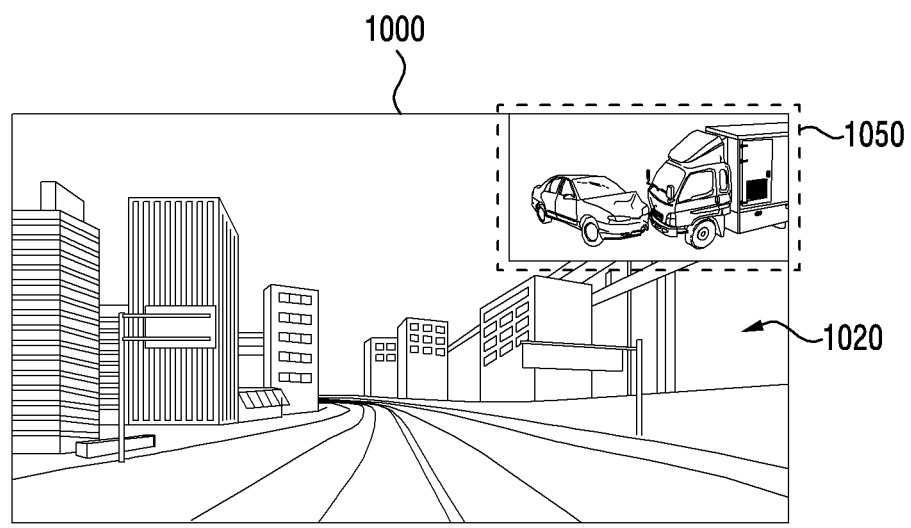
FIG. 10C is a diagram illustrating an example UI displayed through a display installed in a vehicle by a second electronic device according to various embodiments.
Figure 10D:
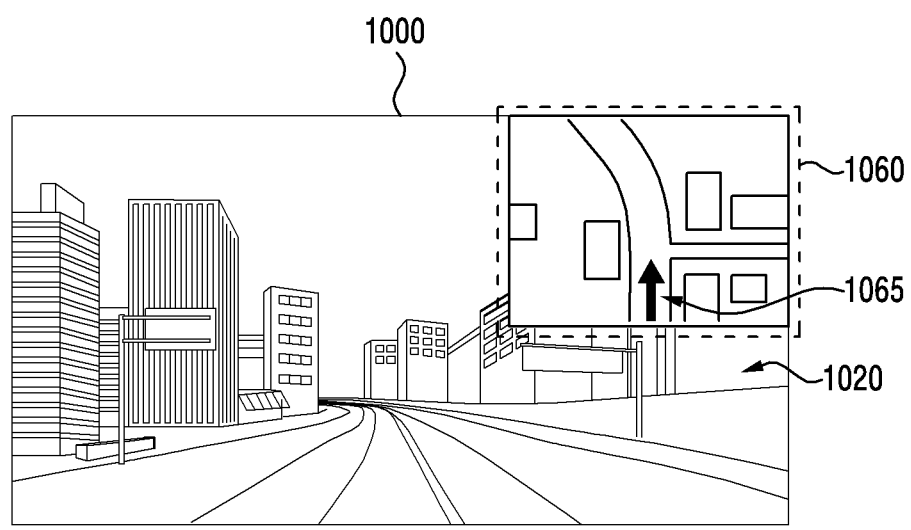
FIG. 10D is a diagram illustrating an example UI displayed through a display installed in a vehicle by a second electronic device according to various embodiments.
Figure 10E:
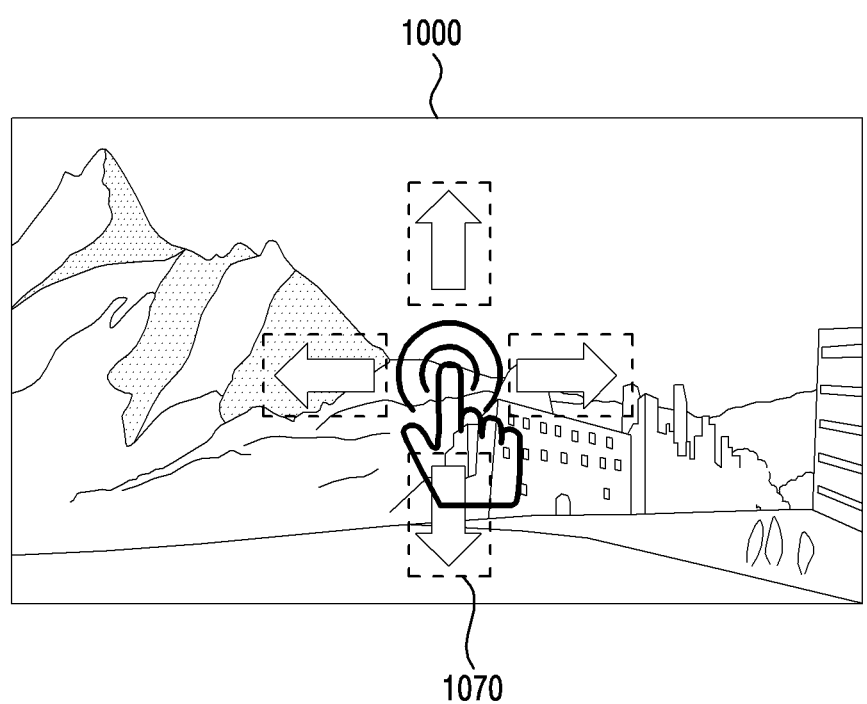
FIG. 10E is a diagram illustrating an example UI displayed through a display installed in a vehicle by a second electronic device according to various embodiments.
Figure 10F:
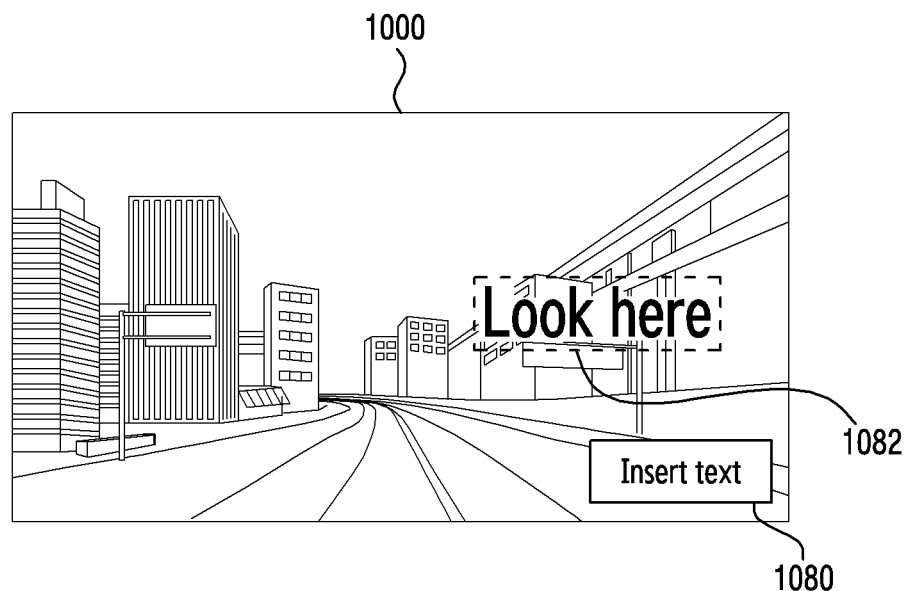
FIG. 10F is a diagram illustrating an example UI displayed through a display installed in a vehicle by a second electronic device according to various embodiments.

FIG. 10A is a diagram illustrating an example UI displayed through a display 1000 installed in a vehicle by a second electronic device according to various embodiments, FIG. 10B is a diagram illustrating an example UI displayed through a display 1000 installed in a vehicle by a second electronic device according to various embodiments, FIG. 10C is a diagram illustrating an example UI displayed through a display 1000 installed in a vehicle by a second electronic device according to various embodiments, FIG. 10D is a diagram illustrating an example UI displayed through a display 1000 installed in a vehicle by a second electronic device according to various embodiments, FIG. 10E is a diagram illustrating an example UI displayed through a display 1000 installed in a vehicle by a second electronic device according to various embodiments, and FIG. 10F is a diagram illustrating an example UI displayed through a display 1000 installed in a vehicle by a second electronic device according to various embodiments. A second electronic device in FIGS. 10A, 10B, 10C, 10D, 10E and 10F (which may be referred to hereinafter as FIGS. 10A to 10F) may correspond to the second electronic device 220 in FIGS. 2, 3, and 5. At least one of operations in FIGS. 10A to 10F may be performed by the second electronic device 220 in FIGS. 2, 3, and 5, and/or the processor 120 of the second electronic device 220 in FIG. 2. A UI in FIGS. 10A to 10F may be displayed based on the operations in FIG. 3, the operations (e.g. operation 740 in FIG. 7) in FIG. 7, and/or the operations in FIG. 9.

Referring to FIG. 10A, a dashboard of a vehicle including a second electronic device is illustrated. A camera 810-5 oriented toward the inside of the vehicle may be disposed at a rear view mirror and/or an overhead console. The second electronic device may be connected to a display 1000 disposed in the dashboard. In a state where the second electronic device and a third electronic device are connected to each other by a second network connection based on a first network connection between a first electronic device and the third electronic device, the second electronic device according to various embodiments may display a UI for identifying data to be transmitted to the third electronic device through the second network connection on the display 1000. The data may be obtained from at least one camera and/or sensor disposed in the vehicle, such as the plurality of cameras 810-1, 810-2, 810-3, 810-4, or 810-5 and the plurality of sensors 820-1, 820-2, 820-3, or 820-4 in FIGS. 8A and 8B.

Referring to FIG. 10B, the display 1000 included in the vehicle is illustrated in more detail. According to an embodiment, the second electronic device may display an image 1010 (e.g. a captured image of a second user of the third electronic device) received from the third electronic device connected to the second electronic device through the second network connection in a UI of the display 1000. According to an embodiment, the second electronic device may display an image 1020 which is being transmitted currently to the third electronic device through the second network connection, in a UI of the display 1000. The image 1020 may be an image obtained from the camera 810-1 toward the front of the vehicle in FIG. 8A. In a state of transmitting the image 1020 to the third electronic device, the second electronic device may display, in a UI of the display 1000, a visual element (e.g. text message 1030) indicating a camera (e.g. the camera 810-1 oriented toward the front of the vehicle in FIG. 8A) from which the image 1020 being transmitted is being obtained among the plurality of cameras included in the vehicle.

According to an embodiment, the second electronic device may display at least one visual element for controlling an image to be transmitted to the third electronic device, in a UI of the display 1000. The at least one visual element may include buttons 1040, 1042, 1044, 1046, or 1048 for selecting an image to be transmitted to the third electronic device among the plurality of cameras included in the vehicle. Referring to FIG. 10B, the buttons 1040, 1042, or 1044 may correspond to the remaining cameras, respectively, except a camera (e.g. a camera oriented toward the front of the vehicle) being currently transmitted to the third electronic device among the plurality of cameras included in the vehicle. For example, if a user having boarded the vehicle selects the button 1040 related to a camera oriented toward the left of the vehicle by touching the display 1000 or based on a button and/or a dial of the dashboard, the second electronic device may stop transmitting an image being captured by a camera oriented toward the front of the vehicle to the third electronic device, and transmit an image being captured by the camera (e.g. the camera 810-2 in FIG. 8A) toward the left of the vehicle to the third electronic device.

According to an embodiment, the second electronic device may display the buttons 1046 or 1048 for transmitting an image obtained through merging of images captured by at least two cameras among the plurality of cameras included in the vehicle, in a UI of the display 1000. For example, if a user selects the button 1046, the second electronic device may merge all the plurality of images being captured by the plurality of cameras included in the vehicle, to transmit a merged image to the third electronic device. For example, if a user selects the button 1048, the second electronic device may stitch images captured by a plurality of cameras (e.g. the plurality of cameras 810-1, 810-2, 810-3, or 810-4 in FIG. 8A) oriented toward the outside of the vehicle, to transmit a stitched image to the third electronic device.

Referring to FIG. 10C, an example of a UI displayed on the display 1000 by the second electronic device in response to a designated event such as an accident is illustrated. The second electronic device may detect an accident of the vehicle including the second electronic device and/or an accident of another vehicle around the vehicle in a state where an image 1020 being currently transmitted to the third electronic device is displayed on the display 1000. Detecting of an accident by the second electronic device may be performed based on image recognition (e.g. image recognition based on an image received from the plurality of cameras 810-1, 810-2, 810-3, 810-4, or 810-5 in FIGS. 8A and 8B), or a sensor (e.g. an acceleration sensor, a geomagnetic sensor, and/or a gravity sensor) included in the second electronic device. The image recognition may be performed based on, for example, a machine learning engine of the second electronic device, a control module of a multi-cell coordination entity (MCE), or a control module of a mobile edge computing (MEC) device.

In response to the detection of an accident of the vehicle including the second electronic device and/or an accident of another vehicle around the vehicle, the second electronic device may display an image 1050 relating to a detected accident on the display 1000. For example, the image 1050 may be received from a camera corresponding to a direction in which the accident has occurred among the plurality of cameras of the vehicle. In an embodiment, the second electronic device may transmit the image 1050 relating to the accident to the third electronic device connected through the second network connection. For example, the second electronic device may combine the image 1020 and the image 1050 and transmit a combined image to the third electronic device.

Referring to FIG. 10D, an example of a UI that is displayed on the display 1000 by the second electronic device and includes information relating to the vehicle and/or the second electronic device is illustrated. The second electronic device may visualize and display information (e.g. the current location of the vehicle) relating to the vehicle and/or the second electronic device on the display 1000 in a state where an image 1020 being currently transmitted to the third electronic device is displayed. Referring to FIG. 10D, the second electronic device may display the current location of the vehicle, based on a figure and/or an icon 1065, in at least one portion of a map in at least one portion 1060 of the display 1000.

The second electronic device may simultaneously transmit the image 1020 to the third electronic device and transmit information (e.g. the current location of the vehicle) relating to the vehicle and/or the second electronic device to the third electronic device. Transmitting, by the second electronic device, of information relating to the vehicle and/or the second electronic device to the third electronic device may be performed in response to the occurrence of a designated event such as an accident. In an embodiment, in response to detection of an accident, the second electronic device may transmit, to the third electronic device, information relating to the vehicle and/or the second electronic device together with an image (e.g. the image 1050 in FIG. 10C) received from a camera corresponding to a direction in which the accident has occurred.

Referring to FIG. 10E, an example of a UI displayed on the display 1000 by the second electronic device is illustrated. The second electronic device according to an embodiment may synthesize images captured by a plurality of cameras (e.g. the plurality of cameras 810-1, 810-2, 810-3, or 810-4 arranged on the outside of the vehicle in FIG. 8A) included in the vehicle. The second electronic device may transmit a synthesized image to the third electronic device. The synthesized image may be, for example, a 360° image and/or a panorama image obtained by capturing an image of the periphery of the vehicle.

In an embodiment, the processing of the images may be performed by a mobile edge computing (MEC) device (or MEC server) connected to a base station connected to the second electronic device, rather than the second electronic device. For example, the second electronic device may transmit information relating to a plurality of images obtained using the plurality of cameras 810-1 to 810-4 through the base station to the MEC device. The information relating to the plurality of images may be stored in the MEC device. According to embodiments, the information relating to the plurality of images may be transferred from the MEC device to an external server (e.g. a cloud server or a service providing server configured to provide a service related to the plurality of images). Each of a plurality of electronic devices (e.g. third electronic device) receiving a service related to the plurality of images may receive an input for selecting at least one image among the plurality of images, and transmit, based on the received input, a signal requesting the at least one image to the MEC device through another base station connected to the each of the plurality of electronic devices. The MEC device may obtain, in response to reception of the signal, the at least one image selected by the each of the plurality of electronic devices among the plurality of images, and transmit information relating to the obtained at least one image to the each of the plurality of electronic devices through the different base stations in response to the signal.

According to embodiments, each of the plurality of electronic devices may transmit information relating to the received input through the another base station to the external server distinguished from the MEC device. In this case, the external server may request, based on the information relating to the received input, the MEC device to transmit information relating to the at least one image among the plurality of images, receives the information relating to the at least one image from the MEC device in response to the request, and transmit the received information relating to the at least one image to the each of the plurality of electronic devices.

In an embodiment, if the at least one image includes an integrated image (e.g. a 360-degree image and a panorama image relating to the vehicle or a surrounding environment of the vehicle) in which some of the plurality of images are synthesized, the MEC device may synthesize or stitch the some of the plurality of images to obtain the integrated image, and may transmit information relating to the at least one image including the obtained integrated image through the another base station to the each of the plurality of electronic devices.

According to an embodiment, if the information relating to the plurality of images is stored in both the MEC device and the external server distinguished from the MEC device, a device, among the MEC device and the external server, providing the information relating to the at least one image to the each of the plurality of electronic devices may be changed according to the amount of communication resources which the each of the plurality of electronic devices uses to access the MEC device, and the amount of communication resources which the each of the plurality of electronic devices uses to access the external server. For example, if the amount of communication resource which a third electronic device among the plurality of electronic devices uses to access the MEC device is less than the amount of communication resources which the third electronic device uses to access the external server, the third electronic device may request information relating to the at least one image from the MEC device, and obtain the information relating to the at least one image from the MEC device. As another example, if the amount of communication resource which a fourth electronic device among the plurality of electronic devices uses to access the MEC device is greater than the amount of communication resources which the fourth electronic device uses to access the external server, the fourth electronic device may request information relating to the at least one image from the external server rather than requesting the information relating to the at least one image from the MEC device, and obtain the information relating to the at least one image from the external server. However, the disclosure is not limited thereto.

Referring again to FIG. 10E, the second electronic device may display buttons 1070 for scrolling the synthesized image on the display 1000. A user having boarded the vehicle may scan the synthesized image, based on the buttons 1070. The synthesized image may be transmitted to a third electronic device, and a second user of the third electronic device may receive the synthesized image using the third electronic device corresponding to, for example, a virtual reality (VR) device.

Referring to FIG. 10F, an example of a UI displayed on the display 1000 by the second electronic device to add a visual element based on a user input in an image to be transmitted to the third electronic device is illustrated. Based on the UI in FIG. 10F, a user may further combine information such as a caption, a tag, and a comment 1082, with an image, and transmit a combined image to the third electronic device. For example, a user may combine text (e.g. "Look here") in at least one portion of an image by touching a button 1080 displayed on the display 1000. The inputting of the text by the user may be performed by a voice input (e.g. voice input based on speech-to-text (STT)) including a user's speech as well as the display 1000, and a keypad included in the vehicle.

Information which a user may combine with an image, based on a UI may include an emoticon, an icon, an animation (e.g. GIF animation), a voice message, or a video clip, as well as the text. The combining of information based on a user input with an image may be performed by the second electronic device or may be performed by another electronic device (e.g. MEC) in a network connecting the second electronic device and the third electronic device. Referring to FIGS. 10A to 10F, if a user uses a video call service and/or broadcasting service based on the vehicle, a UI distinguished from that of a case where the user uses a video call service and/or a broadcasting service based on a mobile terminal may be provided. Based on a request from at least one of a plurality of users (e.g. a caller and receiver of a video call) using a video call service and/or a broadcasting service, the second electronic device may transmit data obtained from at least one among the plurality of cameras and/or the plurality of sensors included in the vehicle. The data may be directly transmitted from the second electronic device to the third electronic device, or may be transmitted by MEC of a network (e.g. 5G mobile communication network) between the second electronic device and the third electronic device.

According to an embodiment, based on a user's selection relating to the display 1000, the second electronic device may transmit, to the third electronic device, information (e.g. information relating to a video call) relating to a network connection between the second electronic device and the third electronic device, and/or camera information obtained from at least one of the plurality of cameras of the vehicle.

According to an embodiment, the second electronic device may provide a user with a virtual presence service, based on an augmented reality, audio beamforming, and/or a hologram. In this case, the second electronic device may provide a user having boarded the vehicle with the virtual presence service using a windshield of the vehicle and/or an indoor medium of the vehicle, as well as the display 100 of the dashboard. Hereinafter, an example operation which a third electronic device connected to a second electronic device of a vehicle performs in a state where a first user having boarded the vehicle uses the second electronic device, as illustrated in FIGS. 10A to 10F will be described in greater detail.

Figure 11:
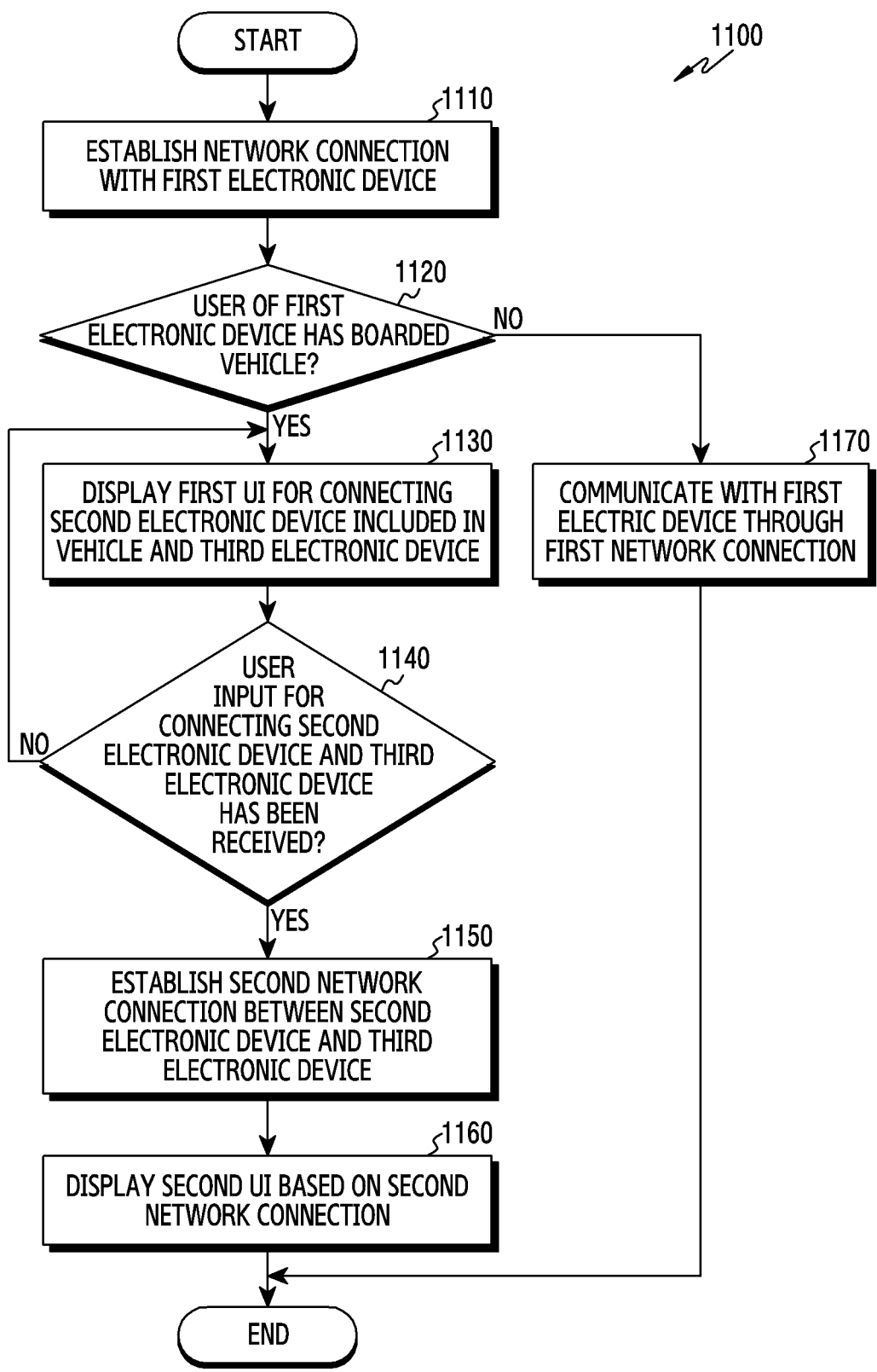
FIG. 11 is a flowchart illustrating an example operation performed by a third electronic device in a state where a user of a first electronic device connected based on a first network connection boards a vehicle according to various embodiments.

FIG. 11 is a flowchart 1100 illustrating an operation performed by a third electronic device according to various embodiments in a state where a user of a first electronic device connected based on a first network connection boards a vehicle. A third electronic device in FIG. 11 may correspond to the third electronic device 230 in FIG. 2 and/or FIG. 3. At least one of operations in FIG. 11 may be performed by the third electronic device 230 in FIG. 2 and/or FIG. 3, and/or the processor 120 of the third electronic device 230. At least one of operations in FIG. 11 may be at least partially related to the operations (e.g. operation 330 and/or 340 in FIG. 3) in FIG. 3, the operations (e.g. operation 740 in FIG. 7) in FIG. 7, and/or the operations in FIG. 9.

Referring to FIG. 11, in operation 1110, a third electronic device according to various embodiments may establish a first network connection with a first electronic device. The first electronic device may correspond to the first electronic device 210 in FIGS. 2 and 3. The first network connection may correspond to the first network connection 240 in FIG. 2. For example, the first network connection may be a network connection for providing a video call service to a first user of the first electronic device and a second user of the third electronic device.

Referring to FIG. 11, in operation 1120, the third electronic device according to various embodiments may determine whether the first user of the first electronic device has boarded a vehicle. In an embodiment, the third electronic device may identify whether the first user of the first electronic device has boarded a vehicle, through the first network connection. For example, the first electronic device may identify the state of the first user having boarded a vehicle, based on operation 420 in FIG. 4. In response to the identification of the state of the first user having boarded a vehicle, the first electronic device may transmit a signal notifying that the first user has boarded the vehicle, to the third electronic device. Based on the signal, the third electronic device may identify the state of the first user having boarded a vehicle.

If the user of the first electronic device has not boarded a vehicle (operation 1120—No), the third electronic device according to various embodiments may communicate with the first electric device through the first network connection, in operation 1170. In an embodiment, the third electronic device may maintain communication with the first electronic device, based on the first network connection.

If the user of the first electronic device has boarded a vehicle (operation 1120—Yes), the third electronic device according to various embodiments may display a first UI for connecting a second electronic device included in the vehicle and the third electronic device, in operation 1130. The first UI may not be displayed in a state where the third electronic device communicates with the first electronic device, based on operation 1170. The first UI may display a message notifying the second user of the third electronic device that the first user has boarded the vehicle. The first UI may be a UI for identifying, from a user, whether to provide a communication service based on a new network connection between the second electronic device of the vehicle and the third electronic device. In an embodiment, if the user of the first electronic device has boarded the vehicle, the first electronic device and/or the second electronic device of the vehicle as well as the third electronic device may also display a UI for connecting the second electronic device and the third electronic device.

Referring to FIG. 11, in operation 1140, the third electronic device according to various embodiments may determine whether a user input for connecting the second electronic device and the third electronic device has been received. The user input may be received from the first UI displayed based on operation 1130. For example, the second user of the third electronic device may input a command connecting the second electronic device and the third electronic device, through the first UI. The first UI displayed by the third electronic device will be described in greater detail below with reference to FIGS. 12A and 12B. The user input may be received from the first electronic device and/or the second electronic device. For example, the first user of the first electronic device may input a command connecting the second electronic device and the third electronic device, to the first electronic device in a manner similar to the description with FIGS. 6A and 6B. For example, the first user having boarded the vehicle may input a command connecting the second electronic device and the third electronic device, to the second electronic device.

If a user input for connecting the second electronic device and the third electronic device has not been received (operation 1140—No), the third electronic device according to various embodiments may maintain the display of the first UI based on operation 1130. In an embodiment, if it is identified that a user does not connect the second electronic device and the third electronic device using the first UI (e.g. a user input in operation 1140 is not performed during a designated time interval), the third electronic device may operate based on, for example, operation 1170.

If a user input for connecting the second electronic device and the third electronic device has been received (operation 1140—Yes), the third electronic device according to various embodiments may establish a second network connection between the second electronic device and the third electronic device, in operation 1150. For example, the second electronic device having received information relating to the first network connection, based on operation 330 in FIG. 3, may request, based on the information relating to the first network connection, the third electronic device to establish the second network connection. In response to the request, the third electronic device may establish a second network connection between the second electronic device and the third electronic device. The second network connection may be at least partially based on the first network connection between the first electronic device and the third electronic device. For example, the types of communication services and/or session IDs assigned to a second network connection and a first network connection may correspond to each other. For example, a session ID of a second network connection may be generated based on a session ID of a first network connection and/or information relating to the first network connection.

Referring to FIG. 11, in operation 1160, the third electronic device according to various embodiments may display a second UI based on the second network connection. In an embodiment, in response to the establishment of the second network connection, the third electronic device may display a second UI based on the second network connection. The second UI may be used for selecting the type of information to be received from the second electronic device included in the vehicle. The third electronic device may display the state (e.g. information relating to emergency situations of the vehicle, location information of the vehicle, and or sensor data relating to a surrounding circumstance of the vehicle) of the vehicle, obtained from the second electronic device in the second UI. The third electronic device may display an image (e.g. a surrounding scenery of the vehicle) obtained from the second electronic device in the second UI. An operation performed by the third electronic device, based on the second UI will be described in greater detail below with reference to FIG. 13, and FIGS. 14A and 14B.

Referring to FIG. 11, in a state where a first user of a first electronic device and a second user of a third electronic device are connected through a service based on a video call and/or personal broadcasting, if the first user has boarded a vehicle, the third electronic device as well as at least one electronic device (e.g. the first electronic device and a second electronic device included in the vehicle) corresponding to the first user may also provide the second user with a user experience (UX) (e.g. the display of the first UI and/or the second UI) based on the boarding of the first user on the vehicle. For example, based on the user experience, the second user may select a camera through which an image is to be received, among cameras included in the vehicle.

Figure 12A:
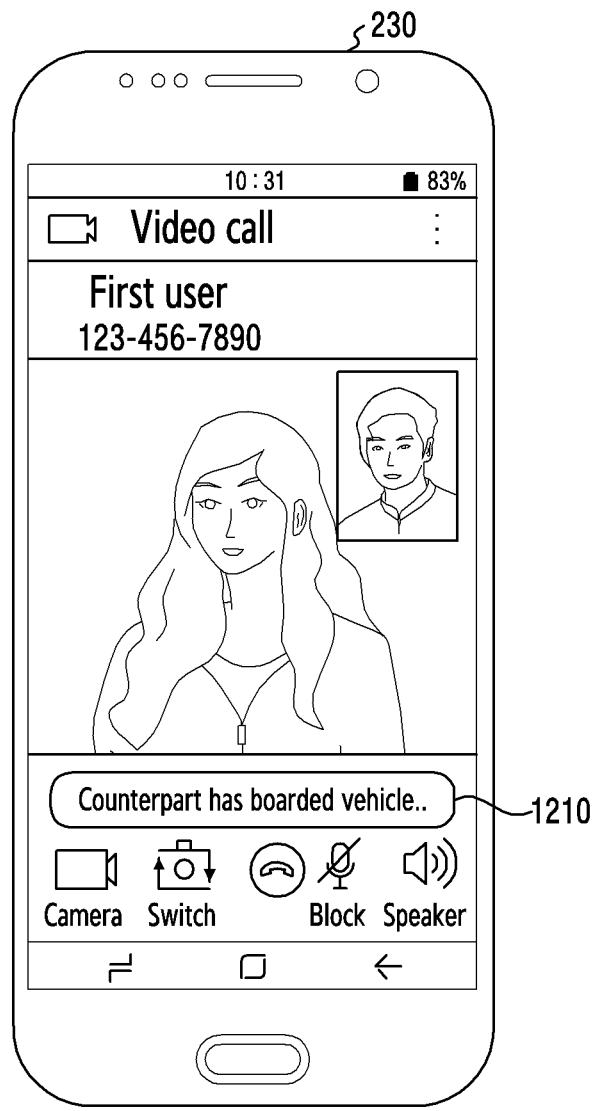
FIG. 12A is a diagram illustrating an example UI displayed to a user by a third electronic device to connect to a second electronic device included in a vehicle according to various embodiments.
Figure 12B:
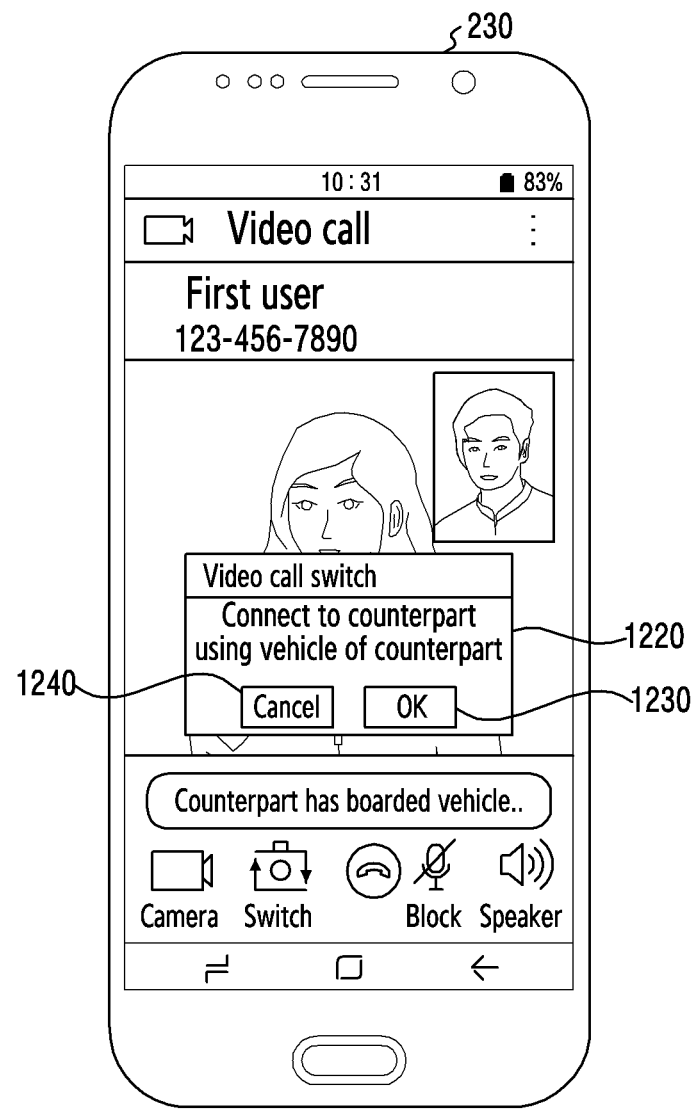
FIG. 12B is a diagram illustrating an example UI displayed to a user by a third electronic device to connect to a second electronic device included in a vehicle according to various embodiments.

FIG. 12A is a diagram illustrating an example UI displayed to a user by a third electronic device 230 according to various embodiments to connect to a second electronic device included in a vehicle, and FIG. 12B is a diagram illustrating an example UI displayed to a user by a third electronic device 230 according to various embodiments to connect to a second electronic device included in a vehicle. The third electronic device 230 in FIGS. 12A and 12B may correspond to the third electronic device 230 in FIG. 2 and/or FIG. 3. A UI illustrated in FIGS. 12A and 12B may be at least partially related to the operations (e.g. operation 320 in FIG. 3) in FIG. 3, the operations (e.g. operation 440 in FIG. 4) in FIG. 4, and/or the operations (e.g. operation 1130 in FIG. 11) in FIG. 11.

Referring to FIG. 12A, an example of a UI displayed in a display of the third electronic device 230 in a state where the third electronic device 230 has been connected to a first electronic device is illustrated. The first electronic device and the third electronic device 230 may be connected based on a first network connection. For example, the first electronic device may correspond to the first electronic device 210 in FIG. 2 and FIG. 3. A first user of the first electronic device and a second user of the third electronic device 230 may use a video call service, based on the first network connection. In this case, a UI displayed by the third electronic device 230 may at least partially relate to the video call service. A UI displayed by the third electronic device 230 may be at least partially similar to the UI illustrated in FIGS. 6A and 6B.

In a state where the first electronic device and the third electronic device 230 communicates with each other based on the first network connection, the third electronic device 230 according to various embodiments may identify whether the first user of the first electronic device has boarded a vehicle. For example, the third electronic device 230 may identify the first user having boarded a vehicle through the first network connection, based on operation 1120 in FIG. 11.

In response to the identification of the boarding of the first user on the vehicle, the third electronic device 230 may display a visual element 1210 for establishing a network connection based on the vehicle, on the display. The visual element 1210 may be the type of a button and/or icon, and may include text (e.g. the counterpart has boarded a vehicle) indicating that the first user of the first electronic device has boarded a vehicle. While the third electronic device 230 is displaying a UI based on FIG. 12A, the first electronic device connected to the third electronic device 230 may also display, for example, a visual element for establishing a network connection based on the vehicle, as illustrated in the UI in FIG. 6A.

If the second user of the third electronic device 230 selects the visual element 1210, referring to FIG. 12B, the third electronic device 230 according to an embodiment may display a window 1220 for confirming a connection to a second electronic device included in the vehicle. If the second user touches a cancel button 1240 in the window 1220, the third electronic device 230 may maintain the first network connection between the first electronic device and the third electronic device 230, based on the UI in FIG. 12A. In an embodiment, if the second user touches the cancel button 1240, the third electronic device 230 may stop (cease) displaying the visual element 1210 for connecting to the second electronic device in the UI FIG. 12A. If the second user touches a confirm button 1230 in the window 1220, the third electronic device 230 may establish a second network connection between the third electronic device 230 and the second electronic device, based on, for example, operation 1140 in FIG. 11. For example, the second electronic device may correspond to the second electronic device 220 in FIG. 2 and FIG. 3.

In response to the establishment of the second network connection, the third electronic device 230 may display another UI (e.g. the second UI in FIG. 11 and/or the UI in FIGS. 14A and 14B) distinguished from the UI in FIGS. 12A and 12B. Hereinafter, an operation which the third electronic device 230 performs in response to the establishment of the second network connection will be described in greater detail below with reference to FIG. 13.

Figure 13:
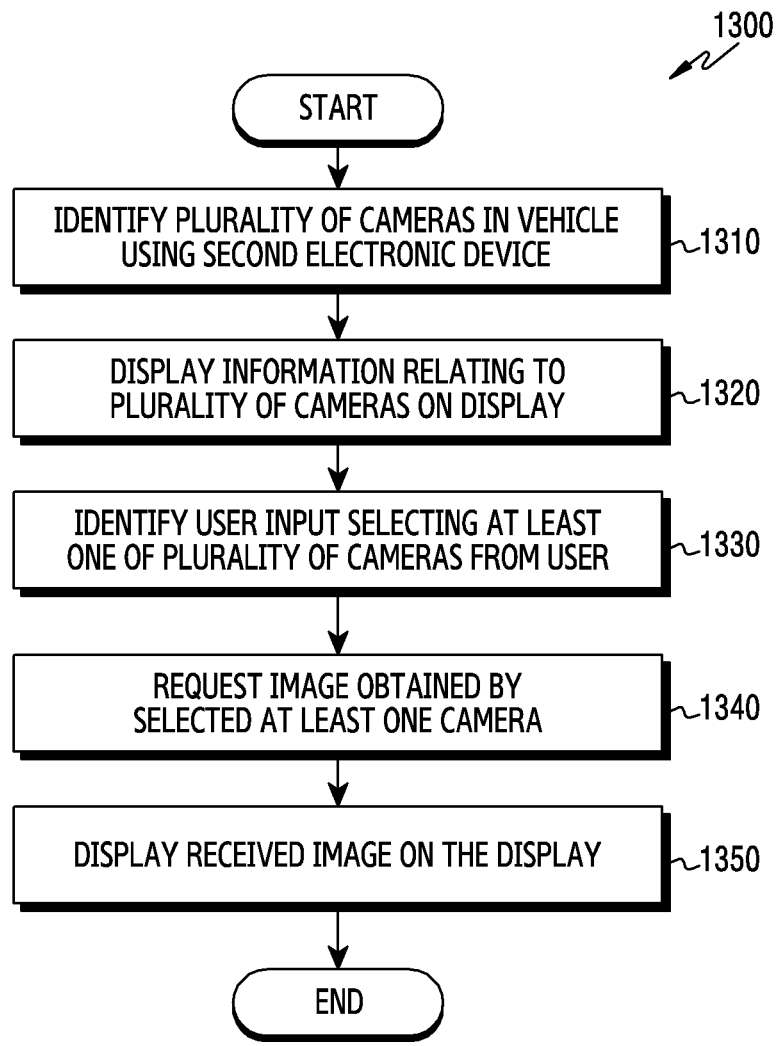
FIG. 13 is a flowchart illustrating an example operation performed by a third electronic device in a state where the third electronic device is connected to a second electronic device included in a vehicle according to various embodiments.

FIG. 13 is a flowchart 1300 illustrating an example operation performed by a third electronic device according to various embodiments in a state where the third electronic device is connected to a second electronic device included in a vehicle. A third electronic device in FIG. 13 may correspond to the third electronic device 230 in FIG. 2 and/or FIG. 3. At least one of operations in FIG. 13 may be performed by the third electronic device 230 in FIG. 2 and/or FIG. 3, and/or the processor 120 of the third electronic device 230. At least one of operations in FIG. 13 may be at least partially related to the operations (e.g. operation 340 in FIG. 3) in FIG. 3, the operations in FIG. 9, and/or the operations (e.g. operation 1160 in FIG. 11) in FIG. 11.

Referring to FIG. 13, in operation 1310, a third electronic device according to various embodiments may identify a plurality of cameras in a vehicle using a second electronic device. For example, the second electronic device may correspond to the second electronic device 220 in FIG. 2 and FIG. 3. The third electronic device may identify the plurality of cameras in the vehicle by communicating (e.g. based on the second network connection 250 in FIG. 2) with the second electronic device. For example, the second electronic device may identify the plurality of cameras in the vehicle, based on operation 910 in FIG. 9. The second electronic device may transmit a result of the identification of the plurality of cameras in the vehicle to the third electronic device. The third electronic device may identify the plurality of cameras in the vehicle including the second electronic device, based on the result.

Referring to FIG. 13, in operation 1320, the third electronic device according to various embodiments may display information relating to the plurality of cameras on a display. For example, the third electronic device may display the position, in the vehicle, of each of the plurality of cameras. In an embodiment, the third electronic device may display a UI for identifying, from a user, a camera, of which an image is to be displayed among the plurality of cameras, together with the information on the display.

Referring to FIG. 13, in operation 1330, the third electronic device according to various embodiments may identify a user input selecting at least one of the plurality of cameras from a user. The user input may be identified from a UI displayed in the display of the third electronic device. For example, a second user of the third electronic device may select at least one of the plurality of cameras included in the vehicle, based on a UI.

Referring to FIG. 13, in operation 1340, the third electronic device according to various embodiments may request an image obtained by the selected at least one camera from the second electronic device. For example, in response to a user input identified based on operation 1330, the third electronic device according to an embodiment may request an image obtained by at least one camera selected by the user input from the second electronic device. In response to the request, the second electronic device may transmit an image being captured by the at least one camera among the plurality of cameras in the vehicle.

In an embodiment, the second electronic device may determine, based on a selection of a user of the second electronic device, whether to transmit an image obtained by the at least one camera, based on the request. For example, if the user of the second electronic device has agreed to the request, the second electronic device may transmit the image to the third electronic device. For example, if the user of the second electronic device does not agree to the request, the second electronic device may not transmit the image to the third electronic device. The second electronic device may identify whether the user of the second electronic device agrees to the request, at least partially based on a UI displayed on a display in the vehicle and/or a user's voice input.

Referring to FIG. 13, in operation 1350, the third electronic device according to various embodiments may display an image received from the second electronic device on the display. For example, in response to reception of an image transmitted by the second electronic device, the third electronic device may display the image on the display. According to an embodiment, the second electronic device may transmit data obtained from at least one sensor included in the vehicle. The third electronic device may display the received data on the display in response to the reception of the data. Hereinafter, a UI displayed by the third electronic device while performing at least one of the operations in FIG. 13 will be described in greater detail below with reference to FIGS. 14A and 14B.

Figure 14A:
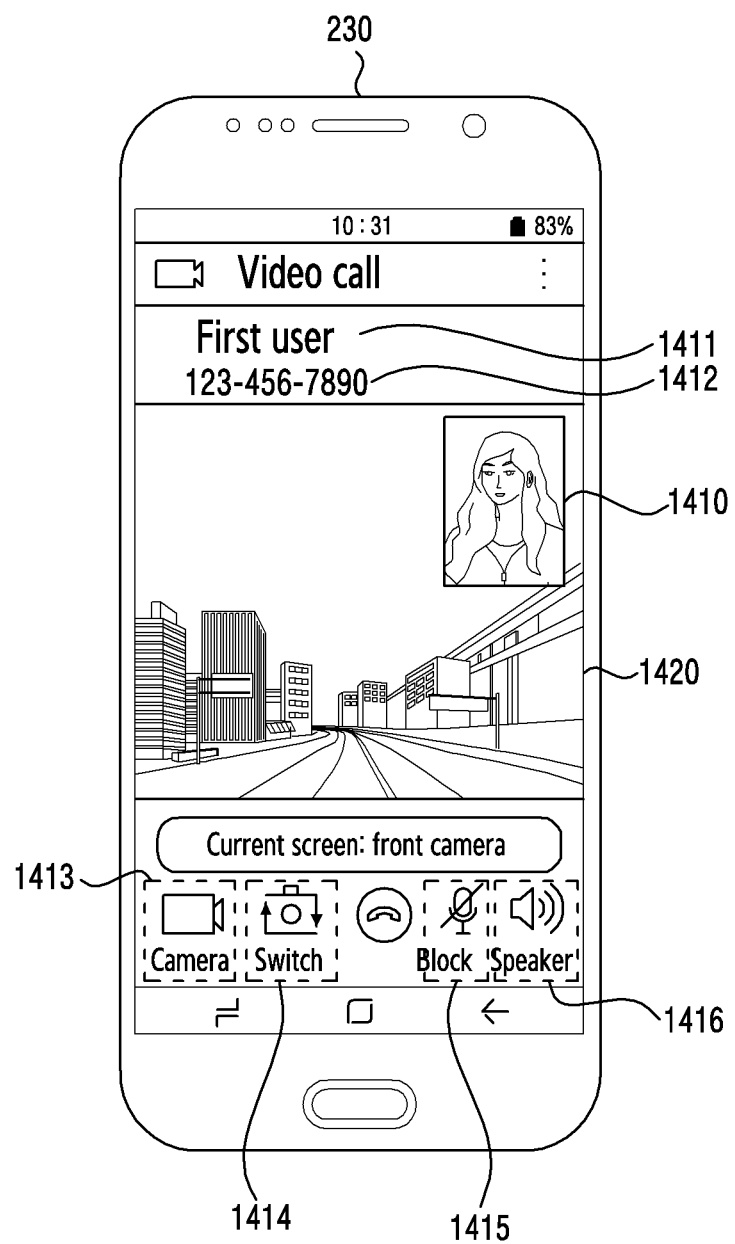
FIG. 14A is a diagram illustrating an example UI displayed to a user by a third electronic device in a state where the third electronic device is connected to a second electronic device included in a vehicle according to various embodiments.
Figure 14B:
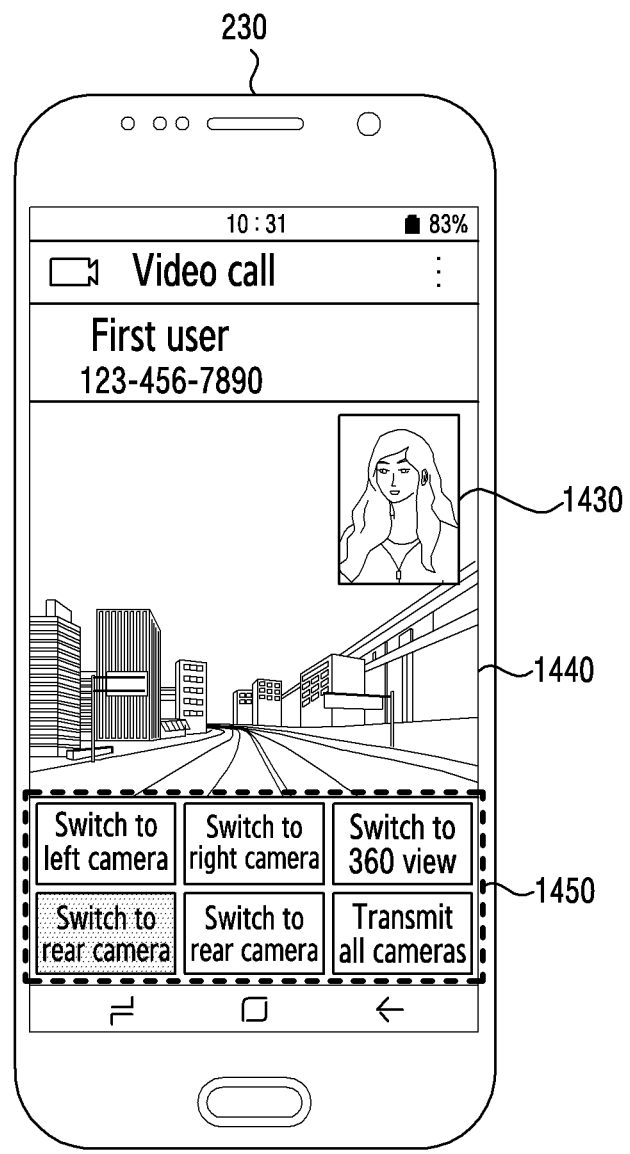
FIG. 14B is a diagram illustrating an example UI displayed to a user by a third electronic device in a state where the third electronic device is connected to a second electronic device included in a vehicle according to various embodiments.

FIG. 14A is a diagram illustrating an example UI displayed to a user by a third electronic device 230 according to various embodiments in a state where the third electronic device is connected to a second electronic device included in a vehicle, and FIG. 14B is a diagram illustrating an example UI displayed to a user by a third electronic device 230 according to various embodiments in a state where the third electronic device is connected to a second electronic device included in a vehicle. The third electronic device 230 in FIGS. 14A and 14B may correspond to the third electronic device 230 in FIG. 2 and/or FIG. 3. A UI illustrated in FIGS. 14A and 14B may at least partially relate to the operations (e.g. operation 340 in FIG. 3) in FIG. 3, the operations (e.g. operation 1160 in FIG. 11) in FIG. 11, and/or the operations in FIG. 13.

Referring to FIG. 14A, an example of a UI displayed in a display of a third electronic device 230 in a state where a second electronic device and the third electronic device 230 have been connected to each other is illustrated. For example, the second electronic device may correspond to the second electronic device 220 in FIG. 2 and FIG. 3. The UI may be displayed in a state where the second electronic device and the third electronic device 230 have been connected to each other through a network connection (e.g. the second network connection 250 in FIG. 2) related to a video call.

In an embodiment, the third electronic device 230 may display information (e.g. the name 1411 and/or phone number 1412 of a first user of the second electronic device) relating to a video call in a UI. In an embodiment, the third electronic device 230 may display, in a UI, icons 1413, 1415, or 1416 for controlling a plurality of hardware components (e.g. a camera, a microphone, and/or a speaker of the third electronic device 230) related to a video call, respectively. In an embodiment, if the third electronic device 230 includes a front camera and a rear camera, the third electronic device 230 may display an icon 1414 for switching between the front camera and the rear camera in a UI.

In an embodiment, the third electronic device 230 may display at least one video relating to a video call in a UI. Referring to FIG. 14A, the third electronic device 230 may display an image of a second user, captured through a camera of the third electronic device 230 in a portion 1410 of a UI. The captured image of the second user may be transmitted to the second electronic device. In a portion 1420 of the UI, the third electronic device 230 may display an image (e.g. an image obtained by at least one of a plurality of cameras in a vehicle including the second electronic device) received from the second electronic device. The third electronic device 230 may display a camera (e.g. front camera capturing an image of the front of a vehicle) from which an image being received from the second electronic device is obtained among a plurality of cameras of a vehicle, in a UI using the type of text and/or an icon.

In an embodiment, the second user of the third electronic device 230 may select an image to be received through the second electronic device, using the UI. For example, if the second user touches the portion 1420 in the UI, in which an image received from the second electronic device is displayed, the third electronic device 230 may display a UI for selecting an image to be received through the second electronic device as illustrated in FIG. 14B.

Referring to FIG. 14B, the third electronic device 230 may display an captured image of the second user, which is obtained through a camera of the third electronic device 230 in a portion 1430 of a UI. The third electronic device 230 may display an image received from the second electronic device in a portion 1440 of the UI. The third electronic device 230 may display buttons corresponding to a plurality of cameras in the vehicle including the second electronic device in a portion 1450 of the UI, respectively. The second user may select at least one of the plurality of cameras included in the vehicle by selecting at least one of the buttons. In response to identification of the selection of the second user, for example, based on operation 1340 in FIG. 13, the third electronic device 230 may request the second electronic device to transmit an image obtained by the selected at least one camera. In response that the image obtained by the at least one camera is received from the second electronic device in response to the request, for example, based on operation 1350 in FIG. 13, the third electronic device 230 may display the received image in the portion 1440 of the UI.

Figure 15:
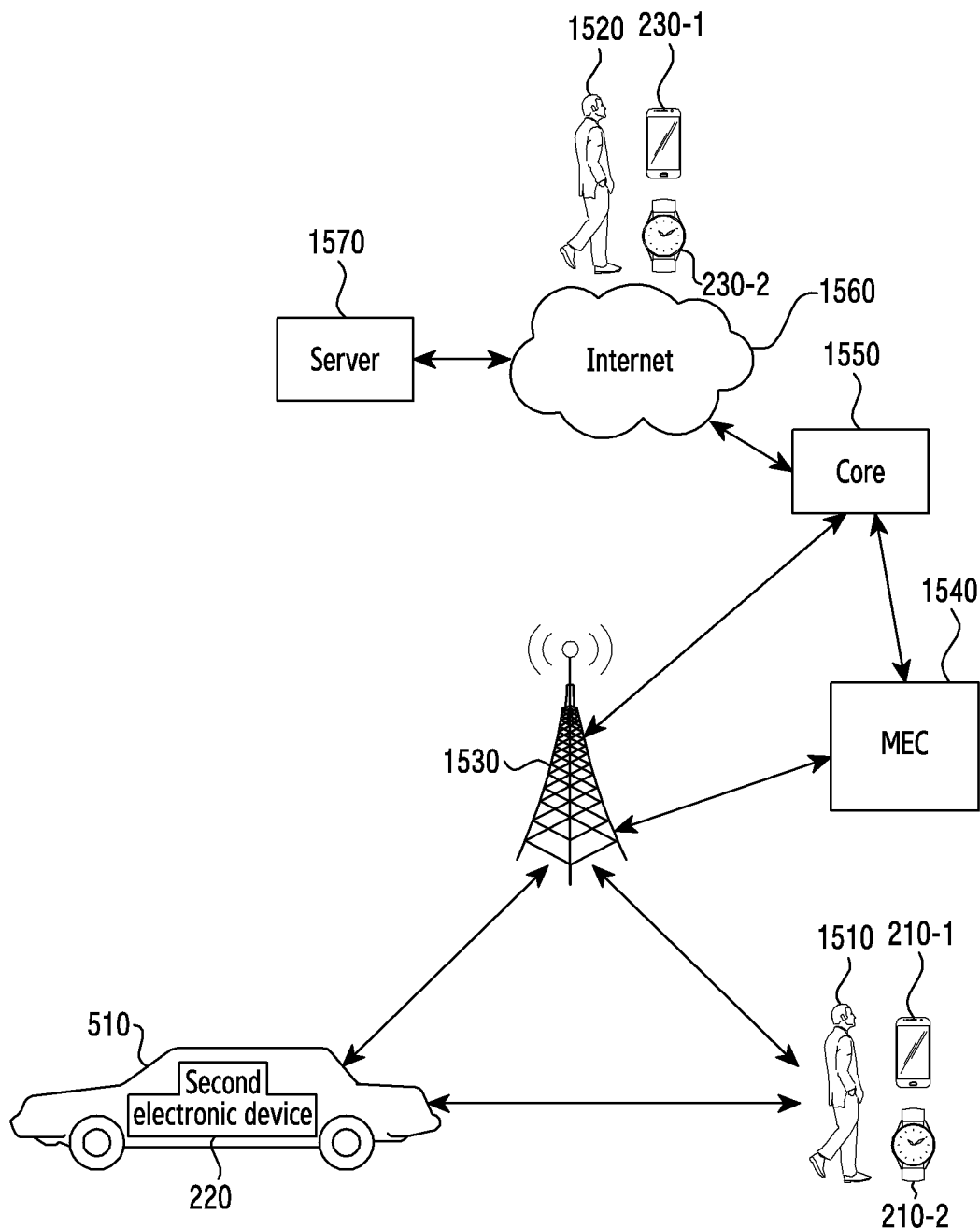
FIG. 15 is a diagram illustrating an example operation in which a first electronic device, a second electronic device, and a third electronic device are connected to each other in a 5G network environment according to various embodiments.

FIG. 15 is a diagram illustrating an example operation in which a first electronic device 210-1 and/or 210-2, a second electronic device 220, and a third electronic device 230-1 and/or 230-2 according to various embodiments are connected to each other in a 5G network environment. First electronic devices 210-1 and 210-2 to third electronic devices 230-1 and 230-2 in FIG. 15 may correspond to the first electronic device 210 to the third electronic device 230 in FIGS. 2 and 3, respectively. The first electronic device 210-1 and/or 210-2 to the third electronic device 230-1 and/or 230-2 may be connected to each other in a 5G network environment in FIG. 15, based on, for example, at least one of the operations in FIG. 3.

Referring to FIG. 15, the 5G network environment may be a wireless network environment connected to Internet 1560, based on at least one base station 1530, MEC 1540, and/or core 1550. A server 1570 of a service provider may provide a plurality of users with a communication service (e.g. video call service and broadcasting service) based on the 5G network environment through the Internet 1560.

Referring to FIG. 15, a first user 1510 may perform a video call, a voice call, and/or broadcasting (e.g. personal broadcasting) using the first electronic device 210-1 and/or 210-2 connected to the 5G network environment. The first electronic device 210-1 may be the type of a mobile terminal, or may be wearable on the first user 1510 such as a smart watch 210-2. A second user 1520 may perform the video call, the voice call, and/or the broadcasting using the third electronic device 230-1 and/or 230-2 connected to the 5G network environment. The third electronic device 230-1 may be the type of a mobile terminal, or may be wearable on the second user 1520 such as a smart watch 230-2.

If the first user 1510 boards a vehicle 510, the first user 1510 may perform a video call, a voice call, and/or broadcasting using a second electronic device 220 included in the vehicle 510. The server 1570 may connect a plurality of users (e.g. the first user 1510 and the second user 1520) using a video call, a voice call, and/or broadcasting. The connection of the plurality of users may correspond to 1:N connection (wherein N is a natural number equal to or greater than 1) and/or peer-to-peer (P2P) connection.

Figure 16:
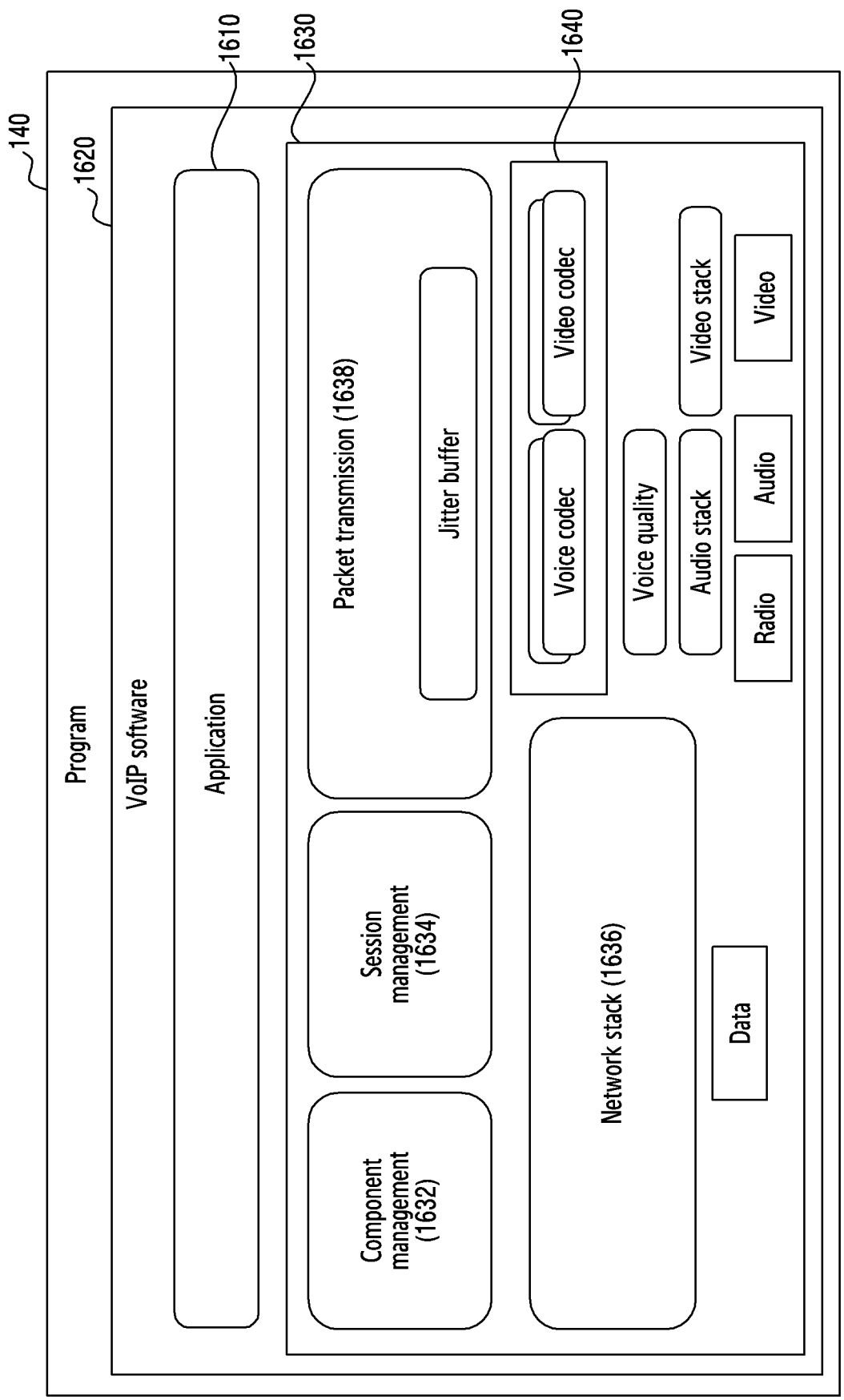
FIG. 16 is a diagram illustrating an example program installed in an electronic device according to various embodiments.

FIG. 16 is a diagram illustrating an example program 140 installed in an electronic device according to various embodiments. An electronic device in FIG. 16 may correspond to the electronic device 101 in FIG. 1 and the first electronic device 210 to the third electronic device 230 in FIG. 2 and FIG. 3. A program 140 in FIG. 16 may correspond to a program 140 included in the memory 130 in FIG. 1.

In an embodiment, the program 140 may include an application 1610 for performing a voice call and/or a video call between an electronic device (e.g. the first electronic device 210 in FIG. 2) and an external electronic device (e.g. the second electronic device 220 and/or the third electronic device 230 in FIG. 2). In an embodiment, the program 140 may include an application 1610 for providing a multimedia service, such as personal broadcasting, between an electronic device and an external electronic device. The application 1610 may be included in, for example, VoIP software 1620 based on VoIP.

In an embodiment, the program 140 may include middleware 1630 for establishing a network connection between an electronic device and a external electronic device. Referring to FIG. 16, the program 140 may include middleware related to, for example, component management 1632, session management 1634, a network stack 1636, and packet transmission 1638. The network connection may be based on, for example, a 5G mobile communication network.

In an embodiment, the program 140 may include a codec 1640 (e.g. video codec and/or audio codec) for processing multimedia data relating to a voice call, a video call, and/or personal broadcasting.

Figure 17:
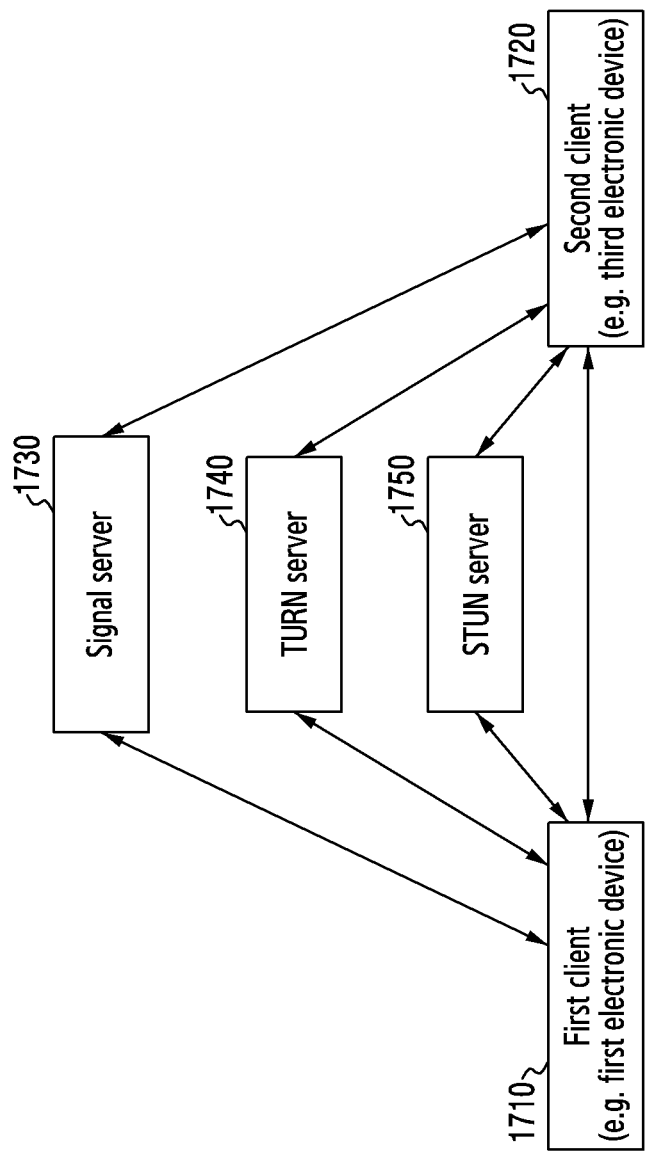
FIG. 17 is a diagram illustrating one or more external servers connected to electronic devices in a 5G network environment according to various embodiments.

FIG. 17 is a diagram illustrating one or more external servers connected to electronic devices according to various embodiments in a 5G network environment.

Referring to FIG. 17, a first client 1710 and a second client 1720 may be connected to each other through a network connection. For example, the first client 1710 and the second client 1720 may correspond to the first electronic device 210 and the third electronic device 230 in FIG. 2 and FIG. 3, respectively. If the first client 1710 and the second client 1720 are connected to each other to perform a voice call and/or a video call (e.g. performing of call setup), the first client 1710 and the second client 1720 may be connected to each other using a signal server 1730, a traversal using relay network address translation (NAT) (TURN) server 1740, and/or a simple transversal of user datagram protocol (UDP) through NAT (STUN) server 1750 in a network.

For example, the signal server 1730 may perform call setup based on a session initiation protocol (SIP). For example, the TURN server 1740 and/or the STUN server 1750 may connect the first client 1710 and the second client 1720, based on network address translation (NAT). The first client 1710 and the second client 1720 connected to each other may directly transmit or receive data, based on a peer-to-peer (P2P) scheme.

Figure 18:
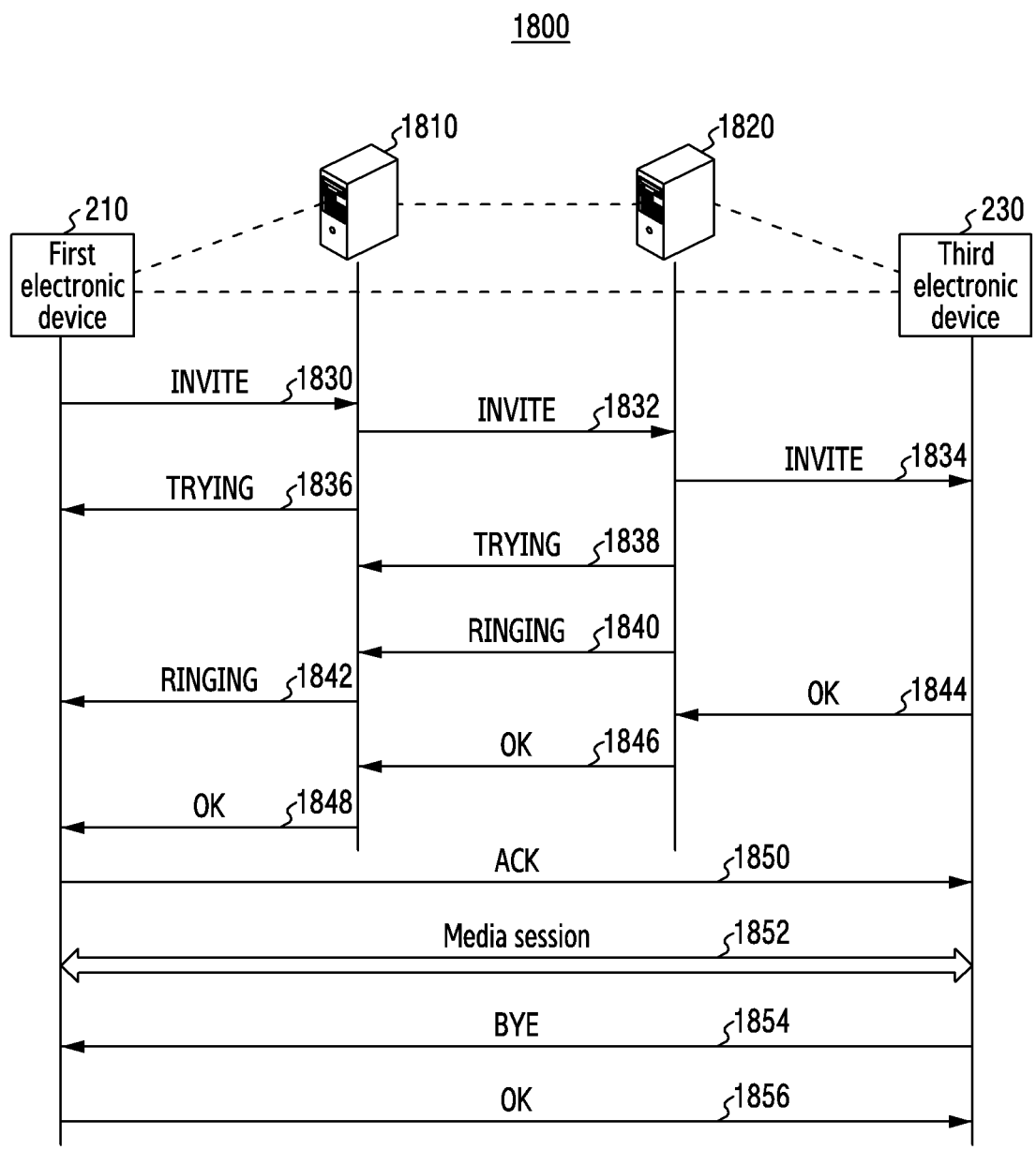
FIG. 18 is a signal flow diagram illustrating example signals transmitted by electronic devices to establish a network connection in a 5G network environment according to various embodiments.

FIG. 18 is a signal flow diagram 1800 illustrating example signals transmitted by electronic devices according to various embodiments to establish a network connection in a 5G network environment according to various embodiments.

A first electronic device 210 and a third electronic device 230 in FIG. 18 may correspond to the first electronic device 210 and the third electronic device 230 in FIGS. 2 and 3, respectively. The first electronic device 210 may be connected to a first proxy server 1810 corresponding to the location of the first electronic device 210 in a network environment. The third electronic device 230 may be connected to a second proxy server 1820 corresponding to the location of the third electronic device 230 in the network environment.

In an embodiment, if a first user of the first electronic device 210 performs a user input for initiating a voice call or a video call relating to the third electronic device 230, the first electronic device 210 may transmit a message 1830 for inviting the third electronic device 230 to the voice call or the video call. The message 1830 may be transmitted from the first electronic device 210 to the first proxy server 1810.

The first proxy server 1810 having received the message 1830 may transmit a message 1832 based on the message 1830 to the second proxy server 1820 corresponding to the third electronic device 230. In response to the transmission of the message 1832, the first proxy server 1810 may transmit a message 1836 notifying of the transmission of the message 1832 to the first electronic device 210.

The second proxy server 1820 having received the message 1832 transmitted from the first proxy server 1810 may transmit a message 1834 based on the message 1832 to the third electronic device 230. In response to the transmission of the message 1834, the second proxy server 1820 may transmit messages 1838 notifying of the transmission of the message 1834 to the first proxy server 1810. Referring to FIG. 18, the messages 1836 and/or 1838 may be messages notifying of: the respective transmission of the messages 1832 and/or 1834 relating to the invitation of the third electronic device 230; and an attempt (try) of the invitation, respectively. A message 1840 may be a message notifying that the message 1834 has been transmitted to the third electronic device 230 corresponding to the invitation. The first proxy server 1810 having received the message 1840 may transmit a message 1842 based on the message 1838 to the first electronic device 210.

In an embodiment, the third electronic device 230 having received the message 1834 may transmit a message 1844 accepting connection of a voice call or a video call of the first electronic device 210 to the second proxy server 1820. The second proxy server 1820 having received the message 1844 may transmit a message 1846 related to the message 1844 to the first proxy server 1810 corresponding to the first electronic device 210. The first proxy server 1810 having received the message 1846 may transmit a message 1848 corresponding to the message 1846 to the first electronic device 210. The first electronic device 210 may directly transmit, based on the message 1848, a message 1850 notifying that the first electronic device has received the connection acceptance by the third electronic device 230, to the third electronic device 230.

In response to the transmission of the message 1850, a media session 1852 between the first electronic device 210 and the third electronic device 230 may be established. The media session 1852 may be related to a voice call or a video call between the first electronic device 210 and the third electronic device 230. The media session 1852 may correspond to the first network connection 240 in FIG. 2.

After the establishment of the media session 1852, a first user of the first electronic device 210 or a second user of the third electronic device 230 may communicate with each other based on the voice call or the video call. After the establishment of the media session 1852, if the first user has boarded a vehicle, the media session 1852 may be switched or changed based on another electronic device (e.g. the second electronic device 220 in FIG. 2) included in the vehicle. The switch or change of the media session 1852 may be performed based on at least one of the operations in FIGS. 3 and 4, FIG. 7, or FIG. 11.

After the establishment of the media session 1852, the first user or the second user may terminate the voice call or the video call. For example, if the second user performs a user input (e.g. user input touching an icon stopping the call) for terminating the voice call or the video call, the third electronic device 230 corresponding to the second user may transmit a message 1854 for stopping the media session 1852 to the first electronic device 210. The first electronic device 210 having received the message 1854 may transmit a message 1856 that is a response signal corresponding to the message 1854 to the third electronic device 230. Based on at least one of the messages 1854 and/or 1856, the media session 1852 may be stopped.

Figure 19:
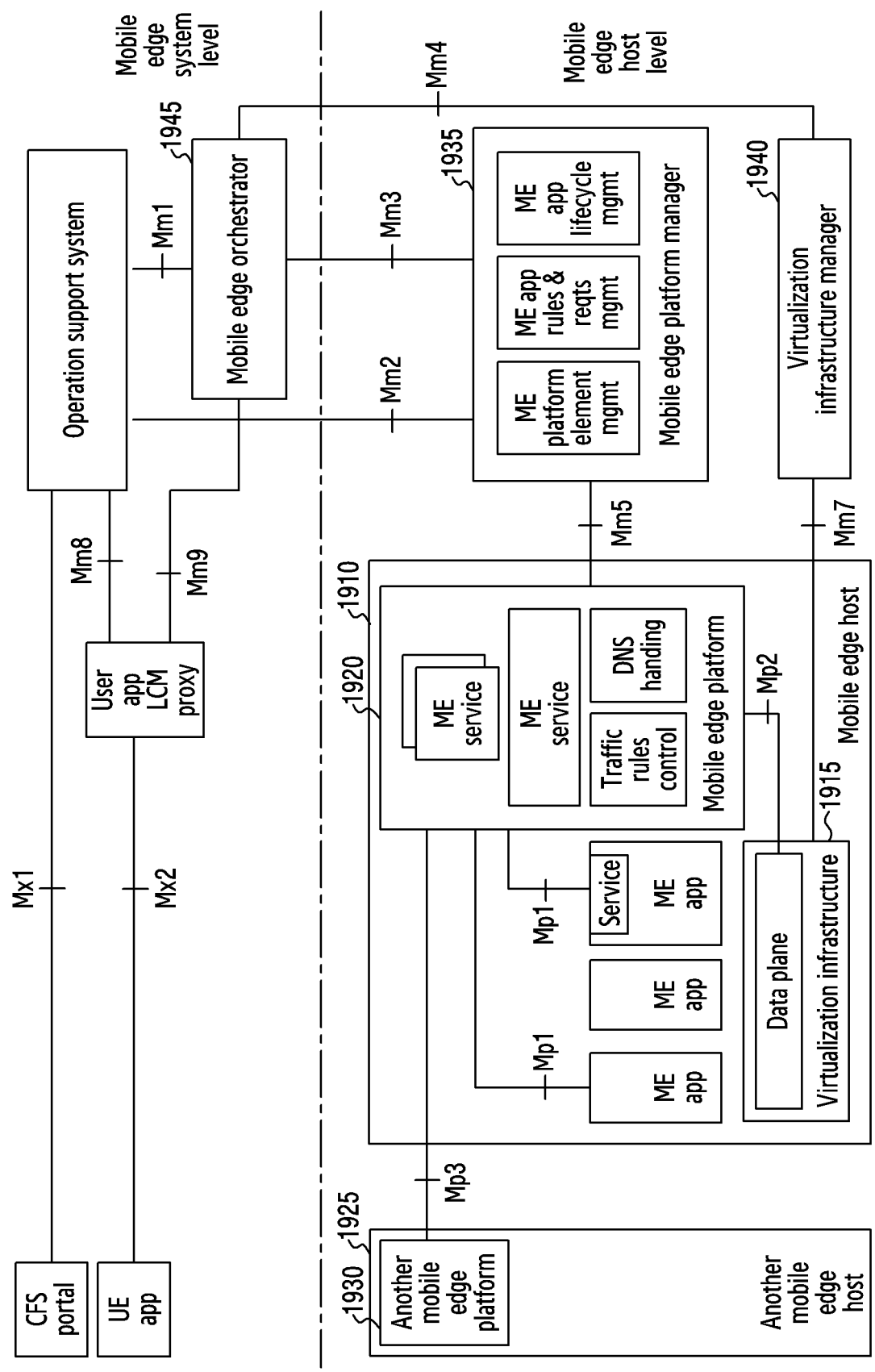
FIG. 19 is a diagram illustrating an example mobile edge host related to an electronic device according to various embodiments.

FIG. 19 is a diagram illustrating an example mobile edge host related to an electronic device according to various embodiments.

Referring to FIG. 19, a mobile edge host 1910 may indicate an entity including a virtualization infrastructure 1915 and a mobile edge platform 1920 which are used for executing a mobile edge application (ME app). The entity may correspond to a server and/or an electronic device in a network environment. The virtualization infrastructure 1915 and the mobile edge platform 1920 may provide computing, storage, and network resources.

The virtualization infrastructure 1915 may execute a traffic rule received by the mobile edge platform 1920. The virtualization infrastructure 1915 may include a date plane routing traffic among an application, a service, a domain name system (DNS) server/proxy, a 3GPP network, a local network, or an external network.

The mobile edge platform 1920 may support at least one function allowing the virtualization infrastructure 1915 to execute a mobile edge application (ME app), provide a mobile edge service, or use a mobile edge service. In an embodiment, the mobile edge platform 1920 may include a mobile edge service corresponding to another platform (e.g. another mobile edge platform 1930 of another mobile edge host 1925) to provide an environment in which a mobile edge service can be discovered, advertised, consumed, and/or provided. In an embodiment, the mobile edge platform 1920 may receive a traffic rule from a mobile edge platform manager 1935, an application program, or a service. Based on the received traffic rule, the mobile edge platform 1920 may control the data plane. In an embodiment, the mobile edge platform 1920 may receive a DNS record from the mobile edge platform manager 1935. Based on the received DNS record, the mobile edge platform 1920 may generate a DNS proxy server. In an embodiment, the mobile edge platform 1920 may host a mobile edge service. In an embodiment, the mobile edge platform 1920 may support an access to a persistent (permanent) storage device and time information.

A mobile edge application (ME app) may be instantiated on the virtualization infrastructure 1915 of the mobile edge host 1910, based on a request or configuration validated by mobile edge management.

Referring to FIG. 19, the mobile edge management may include mobile edge system level management and mobile edge host level management. The mobile edge system level management may be performed based on a mobile edge orchestrator 1945. The mobile edge orchestrator 1945 may perform management of a mobile edge system level, based on an outline of a mobile edge system.

The mobile edge host level management may be performed based on the mobile edge platform manager 1935 and a virtualization infrastructure manager 1940. The mobile edge host level management may include managing a particular function of a mobile edge of a particular mobile edge host (e.g. mobile edge host 1910 in FIG. 19) and an application program executed in the mobile edge host.

Figure 20:
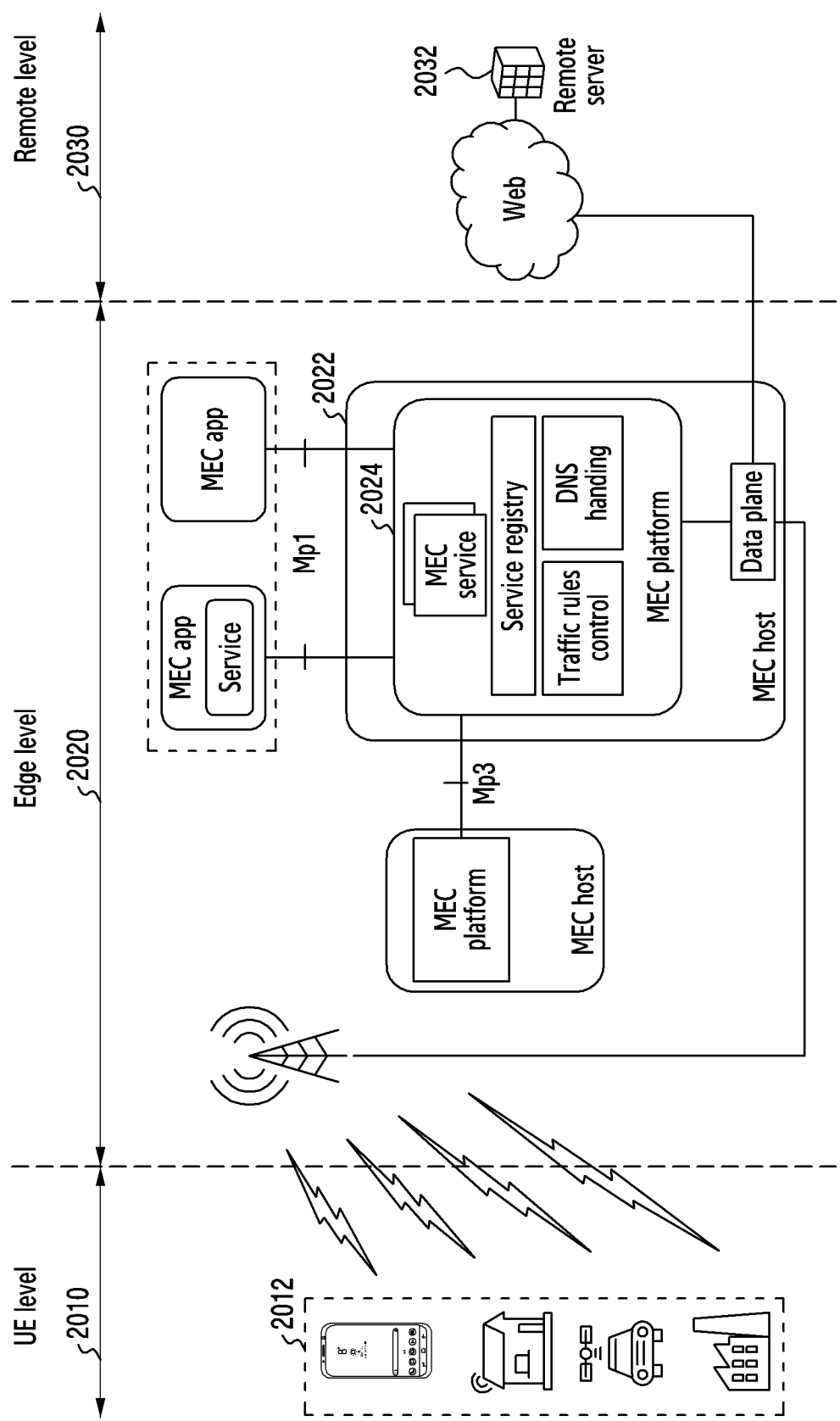
FIG. 20 is a diagram illustrating an example operation of executing an application, based on mobile edge computing, by an electronic device according to various embodiments.

FIG. 20 is a diagram illustrating an example operation of executing an application, based on mobile edge computing (MEC), by an electronic device according to various embodiments.

Referring to FIG. 20, a network environment (e.g. network environment based on a 5G mobile communication network) connected to an electronic device according to various embodiments may be divided into a user equipment level 2010, an edge level 2020, and a remote level 2030. The first electronic device 210 to the third electronic device 230 in FIGS. 2 and 3 may be classified into the user equipment level 2010. For example, the first electronic device 210 to the third electronic device 230 in FIGS. 2 and 3 may correspond to one of user terminals 2012 in the user equipment level 2010.

In a distributed computing software development model, a plurality of clients may be included in the user equipment level 2010, and a remote server 2032 corresponding to the plurality of clients may be included in the remote level 2030. The remote server 2032 may support, for example, a function of centralized computing, storage computing, and/or cloud computing.

Referring to FIG. 20, at least one MEC host 2022 may be included in the edge level 2020. The MEC host 2022 may support at least a part of a function supported by the remote server 2032 in the edge level 2020. In an embodiment, the MEC host 2022 may correspond to the mobile edge host 1910 in FIG. 19. In an embodiment, the MEC host 2022 may include an MEC platform 2024. For example, the MEC platform 2024 may correspond to the mobile edge platform 1920 in FIG. 19. The MEC host 2022 may provide computing, storage, and/or network resources to the user terminals 2012.

In an embodiment, the MEC platform 2024 may provide a secure environment in which an MEC application can discover, advertise, consume, and provide a service through a RESTful API.

Figure 21:
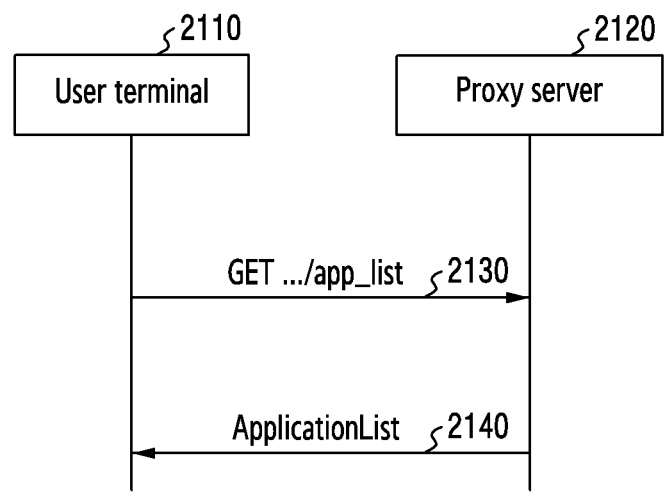
FIG. 21 is a signal flow diagram illustrating an example operation of executing an application, based on an application interface, by a user terminal in a 5G network environment according to various embodiments.

FIG. 21 is a signal flow diagram 2100 illustrating an example operation of executing an application, based on an application interface, by a user terminal 2110 in a 5G network environment. A user terminal 2110 in FIG. 21 may correspond to one of the user terminals 2012 in FIG. 20, for example, one of the first electronic device 210 to the third electronic device 230 in FIGS. 2 and 3. A user equipment application (UE app) installed in the user terminal 2110 may be connected to a proxy server 2120, based on a designated interface (e.g. Mx2 interface). The proxy server 2120 may correspond to a user application lifecycle management proxy.

A function related to a user application interface may include at least one of user application look-up, application context creation, application context deletion, application context updating or notification event reception.

Hereinafter, a user application inquiry function will be described with reference to FIG. 21. Referring to FIG. 21, in operation 2130, a user terminal 2110 may request a list of a user application usable in a mobile edge system from a proxy server 2120, based on a user application. In response to the request, the proxy server 2120 and the mobile edge system including the proxy server 2120 may search for a list of user applications available in the user application of the user terminal 2110. In operation 2140, the proxy server 2120 may transmit the list to the user terminal 2110 and/or the user application. In an embodiment, the user terminal 2110 may determine whether an MEC service related to an MEC server is available, from the list based on the user application.

A function related to a user application interface may include an application context creation function. The application context creation function may imply a procedure of requesting connection to (joining with) an available user application or instantiation of a new user application. Referring to FIG. 19, the mobile edge orchestrator 1945 may trigger application context creation in the mobile edge system, and transmit application context generated by the triggering to a user application.

A function related to a user application interface may include an application context deletion function. The application context deletion function may be initiated by requesting, by a user application, deletion of application context. Referring to FIG. 19, the mobile edge orchestrator 1945 having received the request may trigger deletion of application program context.

A function related to a user application interface may include an application context updating function. Referring to FIG. 21, the user terminal 2110 in which a user application is executed may request the proxy server 2120 corresponding to a user application lifecycle management proxy to update user application context. In response to the request, the proxy server 2120 may update context of the user application.

A function related to a user application interface may include a notification event reception function. Referring to FIG. 21, in a state where a user application is executed in the user terminal 2110, based on a user application lifecycle management proxy (e.g. the proxy server 2120)), in response to generation of an event with an MEC level, the proxy server 2120 may transmit an notification event to the application of the user terminal 2110.

Figure 22:
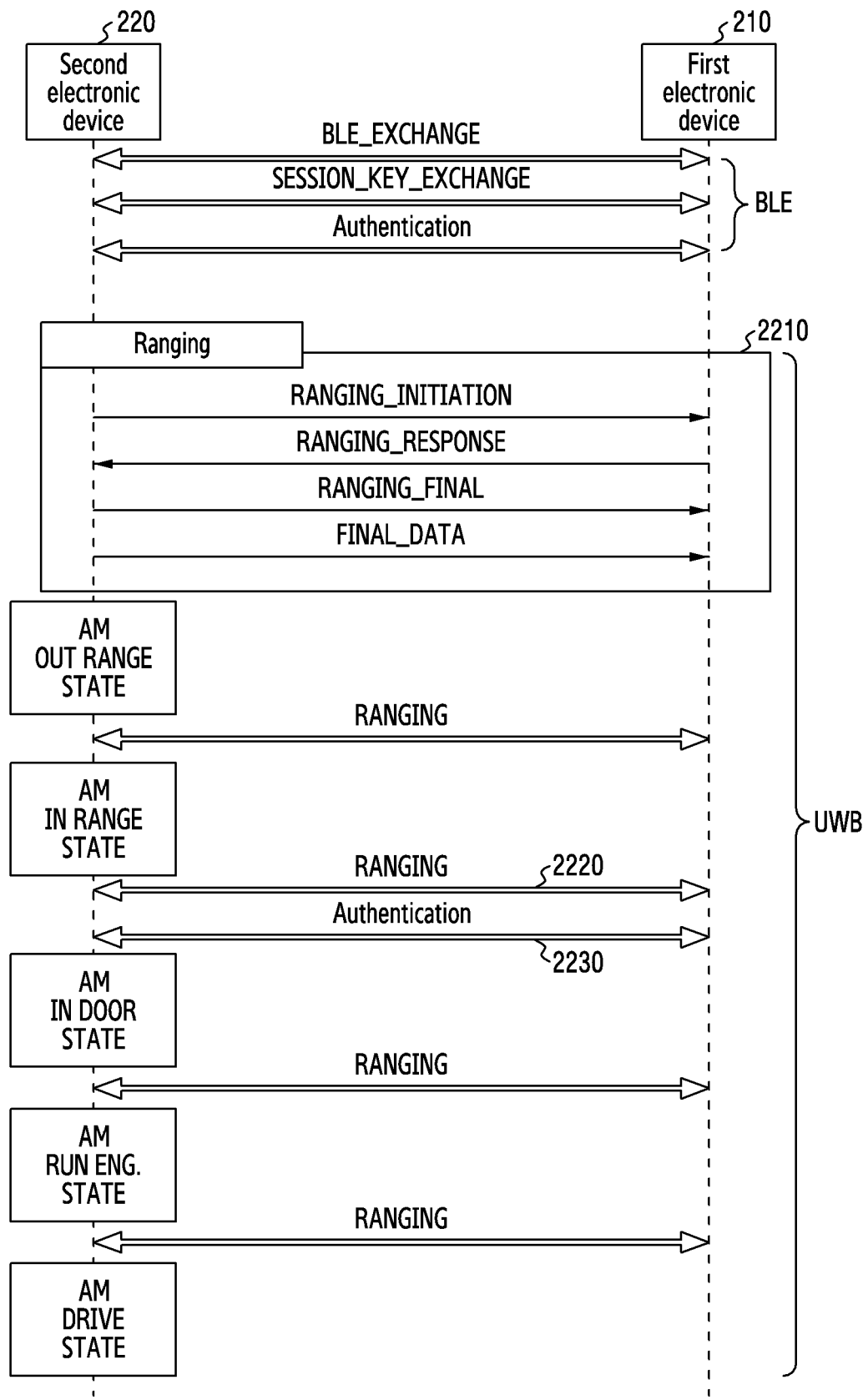
FIG. 22 is a diagram illustrating an example operation of establishing a network connection by a first electronic device and a second electronic device according to various embodiments.

FIG. 22 is a diagram illustrating an example operation of establishing a network connection by a first electronic device 210 and a second electronic device 220 according to various embodiments. A first electronic device 210 and a second electronic device 220 in FIG. 22 may correspond to the first electronic device 210 and the second electronic device 220 in FIGS. 2 and 3, respectively.

A user carrying a first electronic device 210 according to an embodiment may approach a vehicle including a second electronic device 220. As the user approaches the second electronic device 220, the first electronic device 210 according to an embodiment may be wirelessly connected to the vehicle and/or the second electronic device 220 to support a function (e.g. car key) related to the vehicle.

Referring to FIG. 22, the first electronic device 210 and the second electronic device 220 according to an embodiment may measure the distance between the first electronic device 210 and the second electronic device 220, based on operation 2210. For example, operation 2210 may be based on ranging. In an embodiment, the first electronic device 210 may transmit a signal (e.g. RANGING_INITIATION) having a designated format (e.g. a format of a normal preamble in ISO 24730-62) to the second electronic device 220. The second electronic device 220 may identify time spent transmitting the signal, based on propagation time (time-of-flight, ToF). The second electronic device 220 may send (e.g. RANGING_RESPONSE) a reply including the identified time to the first electronic device 210.

In an embodiment, the first electronic device 210 and the second electronic device 220 may measure the distance between the first electronic device 210 and the second electronic device 220, based on two-way ranging (TWR). A TWR scheme may include, for example, single-ride TWR (SS-TWR) and double-side TWR (DS-TWR) schemes. If the first electronic device 210 and the second electronic device 220 measure distance in a DS-TWR scheme, both the first electronic device 210 and the second electronic device 220 may obtain the distance. The second electronic device 220 may identify whether the first electronic device 210 is in a state (auto mobile (AM) out range state) of staying outside the vehicle or in a state (AM in range state) staying inside the vehicle, based on the obtained distance. For example, if the obtained distance is longer than a designated distance, the second electronic device 220 may identify that the first electronic device 210 is in a state of staying outside the vehicle. As another example, if the obtained distance is equal to or shorter than a designated distance, the second electronic device 220 may identify that the first electronic device 210 is in a state of staying inside the vehicle. While the second electronic device 220 is identifying, based on the obtained distance, that the first electronic device 210 is in a state (AM out range state) of staying outside the vehicle, the second electronic device may perform ranging with the first electronic device 210. The second electronic device 220 may identify that the state of the first electronic device 210 is switched from the state of staying outside the vehicle to a state (AM in range state) of staying inside the vehicle, based on the ranging.

Various example embodiments illustrate an operation performed by each of the first electronic device 210 and the second electronic device 220 when a door of the vehicle including the second electronic device 220 is opened in a state where the first electronic device 210 and the second electronic device 220 have performed the measurement of the distance between the first electronic device 210 and the second electronic device 220 and the authentication of the first electronic device 210 and the second electronic device 220, based on operation 2210. In response to identification of a designated event such as the opening of the door of the vehicle, the first electronic device 210 and the second electronic device 220 may measure the distance between the first electronic device 210 and the second electronic device 220 again, based on operation 2220. In the identification of the event, the first electronic device 210 and the second electronic device 220 may further perform authentication between the first electronic device 210 and the second electronic device 220, based on operation 2230.

In one or more embodiments, the first electronic device 210 and the second electronic device 220 may further identify that the first electronic device 210 is in a state (AM run ENG. state) of staying in the vehicle with an engine turned on, or a state (AM drive state) of staying in the vehicle traveling, based on the ranging.

According to various embodiments, the first electronic device 210 and the second electronic device 220 may be connected to each other based on at least one of a sensor, Bluetooth, Bluetooth low energy (BLE), WiFi, ultra-wide band (UWB), or V2X. Referring to FIG. 22, in operation 2210, the first electronic device 210 and the second electronic device 220 may transmit or receive session information using Bluetooth low energy. The first electronic device 210 and the second electronic device 220 may transfer session information, synchronize session information, or perform handover (e.g. soft handover between the first network connection 240 and the second network connection 250 in FIG. 2), based on the session information.

Figure 23:
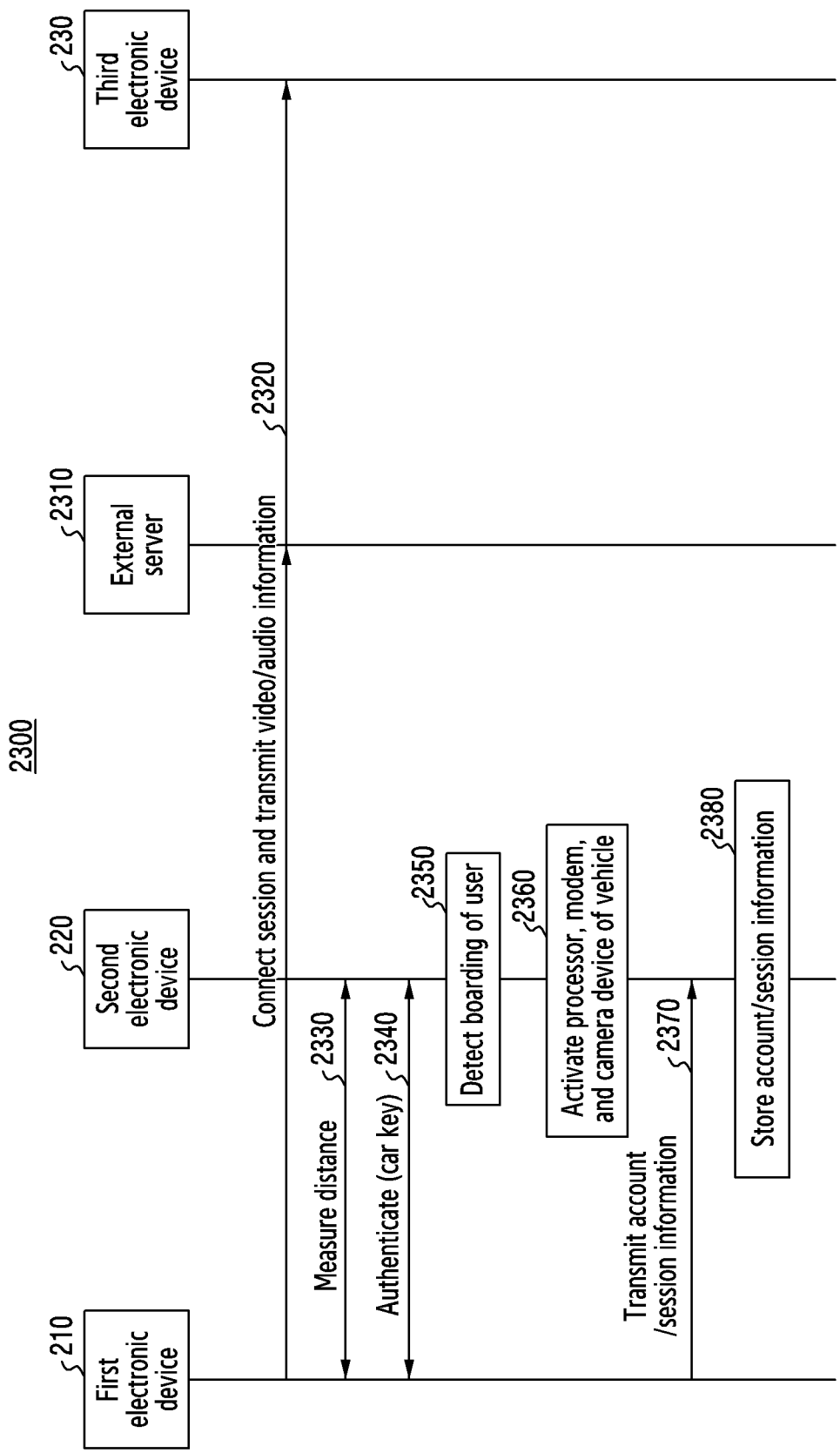
FIG. 23 is a signal flow diagram illustrating an example operation of transmitting information relating to a network connection by electronic devices according to various embodiments.

FIG. 23 is a signal flow diagram 2300 illustrating an example operation of transmitting information relating to a network connection by electronic devices according to various embodiments. A first electronic device 210, a second electronic device 220, and a third electronic device 230 in FIG. 23 may correspond to the first electronic device 210, the second electronic device 220, and the third electronic device 230 in FIGS. 2 and 3, respectively. In an embodiment, the network connection may be related to a voice call and/or a video call between the first electronic device 210 and the third electronic device 230. In an embodiment, the network connection may be related to a streaming service, such as personal broadcasting, of a personal user. For example, a user may board a vehicle including the second electronic device 220 while performing personal broadcasting using the first electronic device 210. After the boarding on the vehicle, the user may continuously perform the personal broadcasting, based on the second electronic device 220 including a modem and/or a SIM.

Referring to FIG. 23, in operation 2320, a first electronic device 210 and a third electronic device 230 according to various embodiments may be connected to each other through a session based on, for example, a service such as personal broadcasting. In an embodiment, the first electronic device 210 may transmit information (e.g. information obtained from the camera module 180 and/or the sensor module 176 in FIG. 2) obtained from a camera and/or a microphone to an external server 2310. The external server 2310 may be a server configured to provide a personal broadcasting service. The external server 2310 may transmit the information obtained from the first electronic device 210 to at least one third electronic device 230.

While personal broadcasting is performed based on operation 2320, a user of the first electronic device 210 may approach a vehicle including a second electronic device 220. In operation 2330, the first electronic device 210 and the second electronic device 220 may detect the distance between the first electronic device 210 and the second electronic device 220. For example, the first electronic device 210 and the second electronic device 220 may measure the distance between the first electronic device 210 and the second electronic device 220 using a wireless signal based on a UWB. Measuring of the distance between the first electronic device 210 and the second electronic device 220 using a UWB may be performed after the first electronic device 210 and the second electronic device 220 have detected each other based on wireless communication using relatively low power such as BLE.

In operation 2340, the first electronic device 210 and the second electronic device 220 may perform an authentication operation. The authentication operation may be performed based on a UWB and/or Bluetooth. The authentication operation may indicate an operation of determining whether the user of the first electronic device 210 is a user of the vehicle including the second electronic device 220. In an embodiment, if the distance measured based on operation 2330 is less than a designated threshold, an authentication operation based on operation 2340 may be performed.

In operation 2350, the second electronic device 220 may detect that the user boards the vehicle. The second electronic device 220 may detect that the user boards the vehicle, based on, for example, an embodiment in FIG. 7, and FIGS. 8A and 8B. In response to the detection of the user having boarded the vehicle, the second electronic device 220 may activate at least one hardware component (e.g. processor, modem, and/or camera) included in the vehicle, in operation 2360. In an embodiment, activation related to operation 2360 may be performed before the user has boarded the vehicle.

In operation 2370, the first electronic device 210 may transmit information (e.g. account information and/or session information) relating to the session of operation 2320 to the second electronic device 220. In an embodiment, the first electronic device 210 may transmit the information to the second electronic device 220, based on operation 450 in FIG. 4. Account information may correspond to an account in which the first electronic device 210 has been authenticated based on an application protocol of the external server 2310. Account information may include an identifier (ID) and a password (e.g. the identifier and password of the user of the first electronic device 210) of an account. Session information may include, for example, a session based on a transport layer security (TLS) stack and/or a session connected to TLS using hypertext transfer protocol secure (https). Session information may include, for example, information indicating cookie and/or profile on a client side, such as the first electronic device 210, and may include information indicating an identifier on a server side, such as the external server 2310.

In response to reception of the information relating to the session from the first electronic device 210, the second electronic device 220 may store the received information in operation 2380. The received information may be used by the second electronic device 220 to switch the session of operation 2320 or generate a new session (e.g. a session between the second electronic device 220 and the third electronic device 230) based on the session. For example, the second electronic device 220 may establish a network connection (e.g. the second network connection 250 in FIG. 2) between the second electronic device 220 and the third electronic device 230, based on operation 730 in FIG. 7, and may use the information stored in operation 2380 to establish the network connection.

Figure 24:
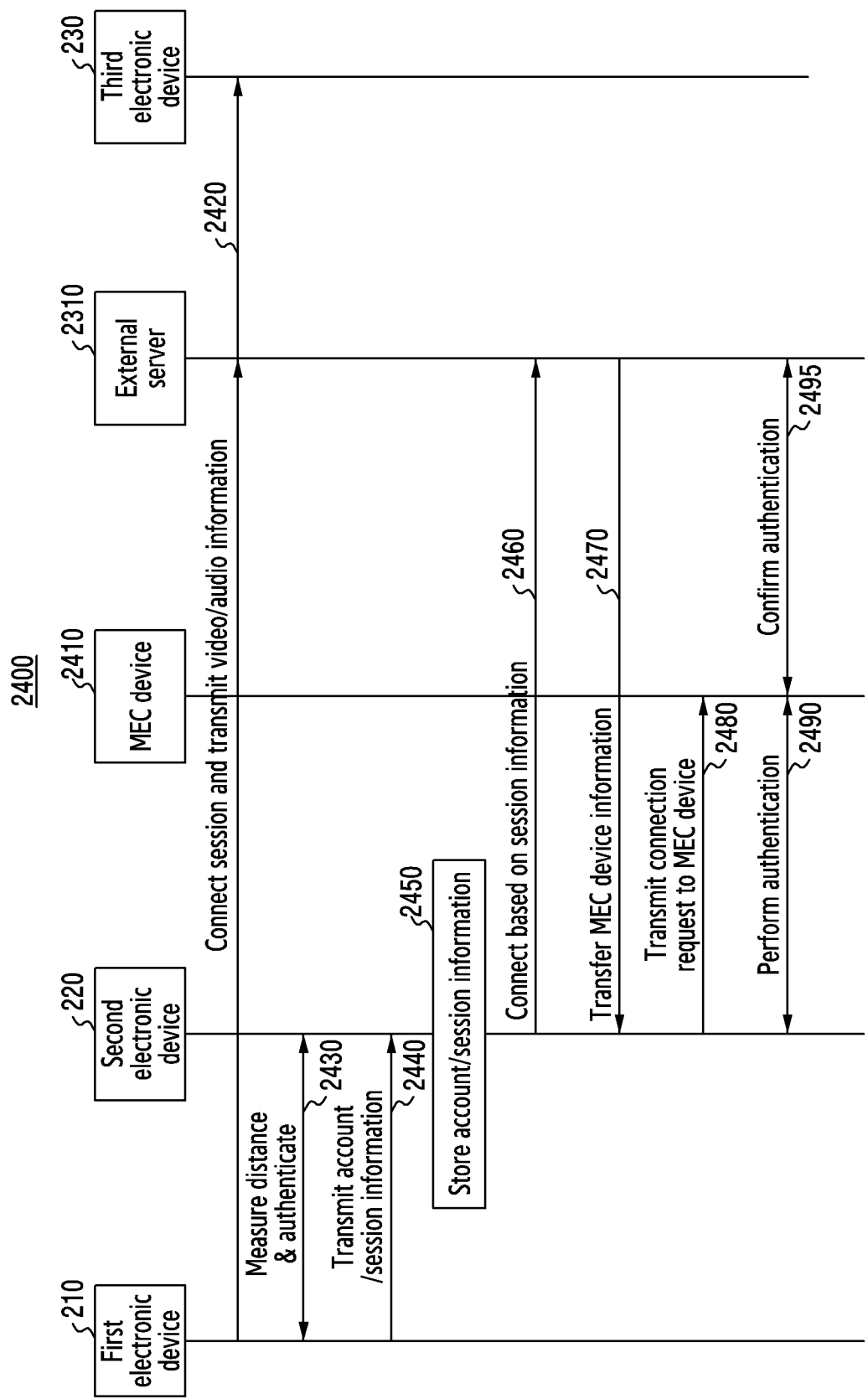
FIG. 24 is a signal flow diagram illustrating an example operation of establishing a network connection in a network including an MEC device by electronic devices according to various embodiments.

FIG. 24 is a signal flow diagram 2400 illustrating an example operation of establishing a network connection in a network including an MEC device 2410 by electronic devices according to various embodiments. A first electronic device 210 to a third electronic device 230 in FIG. 24 may correspond to the first electronic device 210 and the third electronic device 230 in FIGS. 2 and 3, respectively. An MEC device 2410 in FIG. 24 may correspond to the MEC host 2022 in FIG. 20. Referring to FIG. 24, a second electronic device 220 according to an embodiment may store information relating to a session established between a first electronic device 210 and at least one third electronic device 230, and may connect to an external server 2310, based on the stored information.

Referring to FIG. 24, in operation 2420, a first electronic device 210, an external server 2310, and a third electronic device 230 may be connected through a session. The session may be related to, for example, a service such as personal broadcasting. Video information and/or audio information obtained by the first electronic device 210 using the session may be transmitted to the external server 2310 and/or the third electronic device 230.

In a state where the first electronic device 210, the external server 2310, and the third electronic device 230 are connected to each other based on 2420, a user of the first electronic device 210 may approach the second electronic device 220 including a vehicle. As the user approaches the second electronic device 220, the first electronic device 210 and the second electronic device 220 may measure the distance therebetween and/or authenticate each other, in operation 2430. The first electronic device 210 and the second electronic device 220 may perform operation 2430, for example, similar to at least one of operation 2330 and/or operation 2340 in FIG. 23.

Based on a result of the authentication between the first electronic device 210 and the second electronic device 220, the first electronic device 210 may transmit information (e.g. account information and/or session information) relating to the session of operation 2420 to the second electronic device 220, in operation 2440. The first electronic device 210 may perform operation 2440, for example, similar to operation 2370 in FIG. 23. In response to reception of the information, the second electronic device 220 may store the received information relating to the session, in operation 2450. For example, the second electronic device 220 may perform operation 2450 similar to operation 2380.

In operation 2460, the second electronic device 220 according to an embodiment may establish a connection with the external server 2310, based on the stored information. The second electronic device 220 may establish a connection between the second electronic device 220 and the external server 2310, based on information (e.g. account information and/or session information) relating to the session of operation 2420. For example, the second electronic device 220 may perform account-based access and authentication based on a platform/server such as IMS/HTTPS. After the authentication, the second electronic device 220 may request, based on the information received from the first electronic device 210, the external server 2310 to switch a service performed in the first electronic device 210. For example, the second electronic device 220 may request the external server 2310 to switch a broadcasting service performed in the first electronic device 210, based on soft handover. For example, soft handover may indicate an operation of initiating transmission, based on the second electronic device 220, of video information and/or audio information and terminating transmission, based on the first electronic device 210, of video information and/or audio information while maintaining the transmission, based on the first electronic device 210, of the video information and/or audio information.

In an embodiment, the external server 2310 having received the service switching request may establish a session related to the second electronic device 220 without terminating the session of operation 2420. The external server 2310 may transmit a command (e.g. on-board command) relating to an application service (e.g. broadcasting application service) related to the external server 2310 to an MEC device 2410. In an embodiment, the command may be transmitted if an application service related to the external server 2310 is not loaded in the MEC device 2410. The on-board command may indicate a command making the MEC device 2410 install an application in a state where the application is not installed in the MEC device 2410. The MEC device 2410 may install an application and/or provide a service based on the application in response to the on-board command.

In operation 2470, the external server 2310 may transmit information relating to the MEC device 2410 to the second electronic device 220. In an embodiment, the second electronic device 220 may receive information for identifying the MEC device 2410 from the external server 2310 and/or an operator (e.g. communication operator) of a network connected to the second electronic device 220. Alternatively, the external server 2310 may transmit information for identifying an MEC proxy server to the second electronic device 220. In response to reception of the information relating to the MEC device 2410, the second electronic device 220 may transmit a connection request to the MEC device 2410, in operation 2480. In operation 2490, the second electronic device 220 and the MEC device 2410 may perform authentication based on an account related to the session 2420. In operation 2495, the MEC device 2410 may confirm a result of the authentication of the second electronic device 220 from the external server 2310. After the confirmation, the connection of the session based on operation 2420 between the first electronic device 210 and the third electronic device 230, and another session between the second electronic device 220 and the third electronic device 230 may be simultaneously established, and the third electronic device 230 may become a state in which the first electronic device can simultaneously receive video information and/or audio information from the first electronic device 210 and video information and/or audio information from the second electronic device 220.

Figure 25:
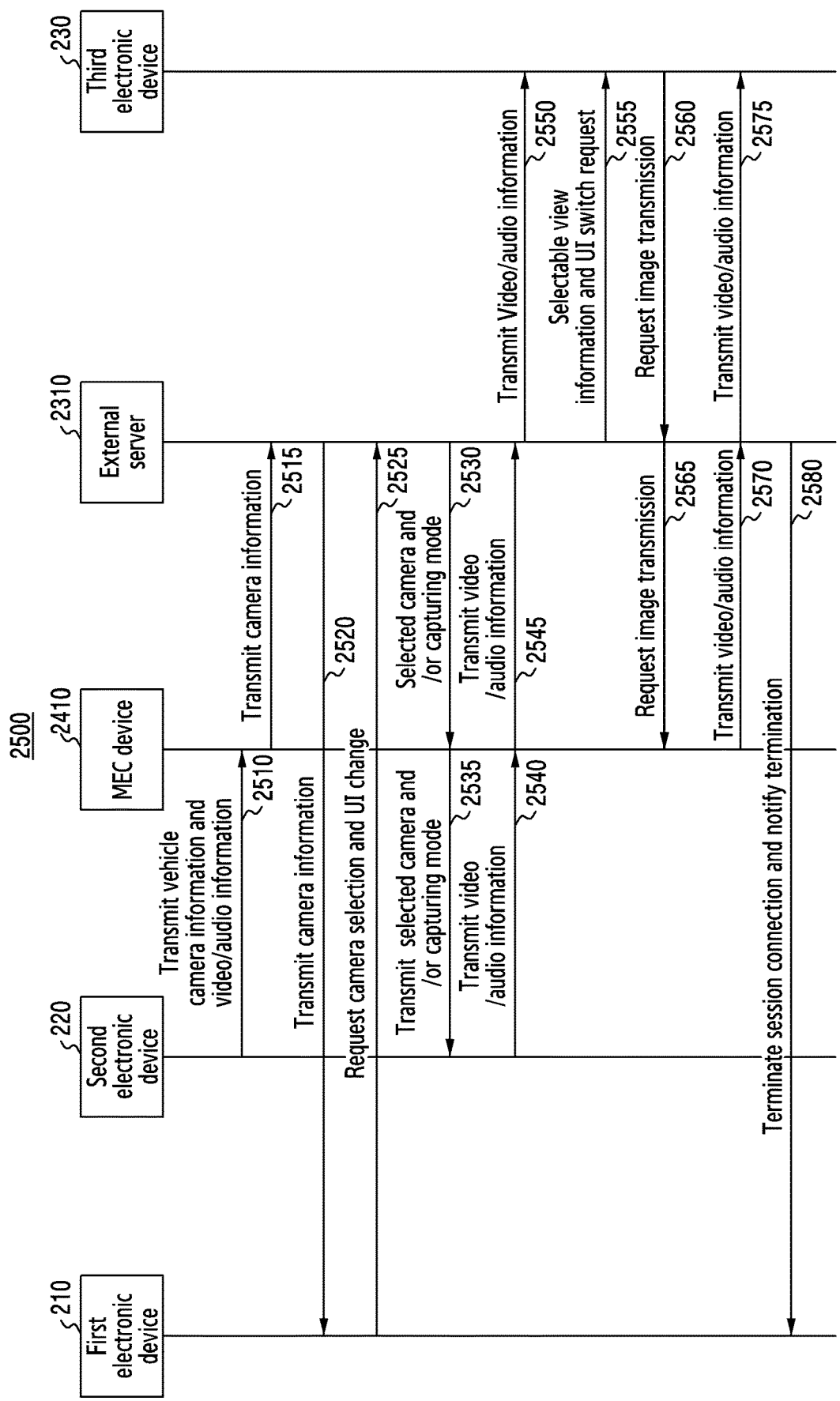
FIG. 25 is a signal flow diagram illustrating an example operation of switching a network connection in a network including an MEC device by electronic devices according to various embodiments.

FIG. 25 is a signal flow diagram 2500 illustrating an example operation of switching a network connection in a network including an MEC device 2410 by electronic devices according to an embodiment. A first electronic device 210 to a third electronic device 230 in FIG. 25 may correspond to the first electronic device 210 to the third electronic device 230 in FIGS. 2 and 3, and FIG. 24, respectively. An MEC device 2410 in FIG. 25 may correspond to the MEC device 2410 in FIG. 24. In an embodiment, operations in FIG. 25 may be performed after the operations in FIG. 24. Operations in FIG. 25 may relate to soft handover between the first electronic device 210 and the third electronic device 230.

Referring to FIG. 25, in operation 2510, the second electronic device 220 may transmit information for identifying a camera included in the vehicle and video information and/or audio information obtained from the camera to the MEC device 2410. In an embodiment, the transmission of the information based on operation 2510 may be performed by identification (e.g. a user's operation touching the visual element 610 in FIG. 6A) of the user of the first electronic device 210 and/or the second electronic device 220.

The MEC device 2410 having received the information may process video information and/or audio information received from the second electronic device 220. In operation 2515, the MEC device 2410 may transmit information (e.g. information for identifying a camera in the vehicle, and video information and/or audio information obtained from the camera, which are received from the second electronic device 220) relating to the camera of the vehicle to the external server 2310 and/or the second electronic device 220. In an embodiment, the MEC device 2410 may transmit the video information and/or audio information received in operation 2510 to a TURN server 1740 in FIG. 17 and/or an application server (e.g. the external server 2310 configured to support a personal broadcasting service).

The external server 2310 having received the information from the MEC device 2410 may transmit information relating to a camera of the second electronic device 220 to the first electronic device 210, in operation 2520. In response to reception of the information, the first electronic device 210 may request the external server 2310 to select a camera which is to transmit an image, or change a UI of the external server 2310 and/or the third electronic device 230 connected to the first electronic device 210, in operation 2525.

In operation 2530, in response to selection of a camera and/or a capturing mode, caused by the external server 2310 and/or a request from the third electronic device 230, the external server 2310 may transmit the selected camera and/or capturing mode to the MEC device 2410. For example, the request from the third electronic device 230 may be provided to the external server 2310 from the third electronic device 230, based on a user input received by the third electronic device 230 to select at least a part of a plurality of cameras (e.g. a plurality of cameras of the vehicle including the second electronic device 220) related to the second electronic device 220, or a user input received by the third electronic device 230 to select a capturing mode among a plurality of capturing modes supportable by the second electronic device 220. For example, the selection of a camera and/or a capturing mode, caused by the external server 2310 may imply that the external server 2310 selects a camera and/or capturing mode suitable for a streaming service provided by the external server 2310 (or through the external server 2310), based on at least one of a user request or machine learning. For example, the selected camera may be a camera selected by the external server 2310 or the user input received by the third electronic device 230 among a plurality of cameras (e.g. the plurality of cameras of the vehicle including the second electronic device 220) related to the second electronic device 220. For example, the capturing mode may include a mode of transmitting an external image of the vehicle, a mode of transmitting an internal image of the vehicle, and/or a mode of providing all the surrounding images of the vehicle using a panorama image and/or a 360° image. In operation 2535, the MEC device 2410 may transmit the camera and/or capturing mode received from the external server 2310, to the second electronic device 220. In operation 2540, the second electronic device 220 having received the selected camera and/or capturing mode may transmit video information and/or audio information based on the selected camera and/or capturing mode to the MEC device 2410. In operation 2545, the MEC device 2410 may transmit the video information and/or audio information received based on operation 2540, to the external server 2310.

In operation 2550, the external server 2310 may transmit the video information and/or audio information received based on operation 2545, to the third electronic device 230. In operation 2555, together with the video information and/or audio information, the external server 2310 may transmit, to the third electronic device 230: information (e.g. a panorama image and/or a 360° image of the periphery of the vehicle as well as a side image, a front image, and a rear image of the vehicle) indicating an image which can be selected or received from a plurality of cameras included in the vehicle of the second electronic device 220; and a request of displaying a UI (e.g. a UI for selecting a camera included in the vehicle, for example, the portion 1450 of the UI in the FIG. 14B) for selecting the plurality of cameras.

In an embodiment, there may be a plurality of third electronic device 230 receiving an image from the first electronic device 210 and/or the second electronic device 220. In this case, in operation 2560, the plurality of third electronic devices 230 may request the external server 2310 to transmit images with different capturing modes and/or images obtained by different cameras from the second electronic device 220, respectively. In operation 2565, the external server 2310 having received the request may relay the request to the MEC device 2410. In operation 2570, the MEC device 2410 having received the request may transmit an image relating to the request, based on video information and/or audio information received from the second electronic device 220, to the external server 2310. In an embodiment, to transmit an image to the external server 2310, the MEC device 2410 may perform an operation for obtaining an image from the second electronic device 220, for example, operation 2535 and/or operation 2540. In an embodiment, the MEC device 2410 may process video information and/or audio information of the second electronic device 220 to obtain individual video information and/or audio information corresponding to the plurality of third electronic devices 230, respectively.

In operation 2575, the external server 2310 may transmit corresponding images to the plurality of third electronic devices 230, respectively. In operation 2580, the external server 2310 may notify the first electronic device 210 of stopping of the connection of a session (e.g. the session in operation 2420 in FIG. 24) related to the first electronic device 210 to the first electronic device 210.

Figure 26:
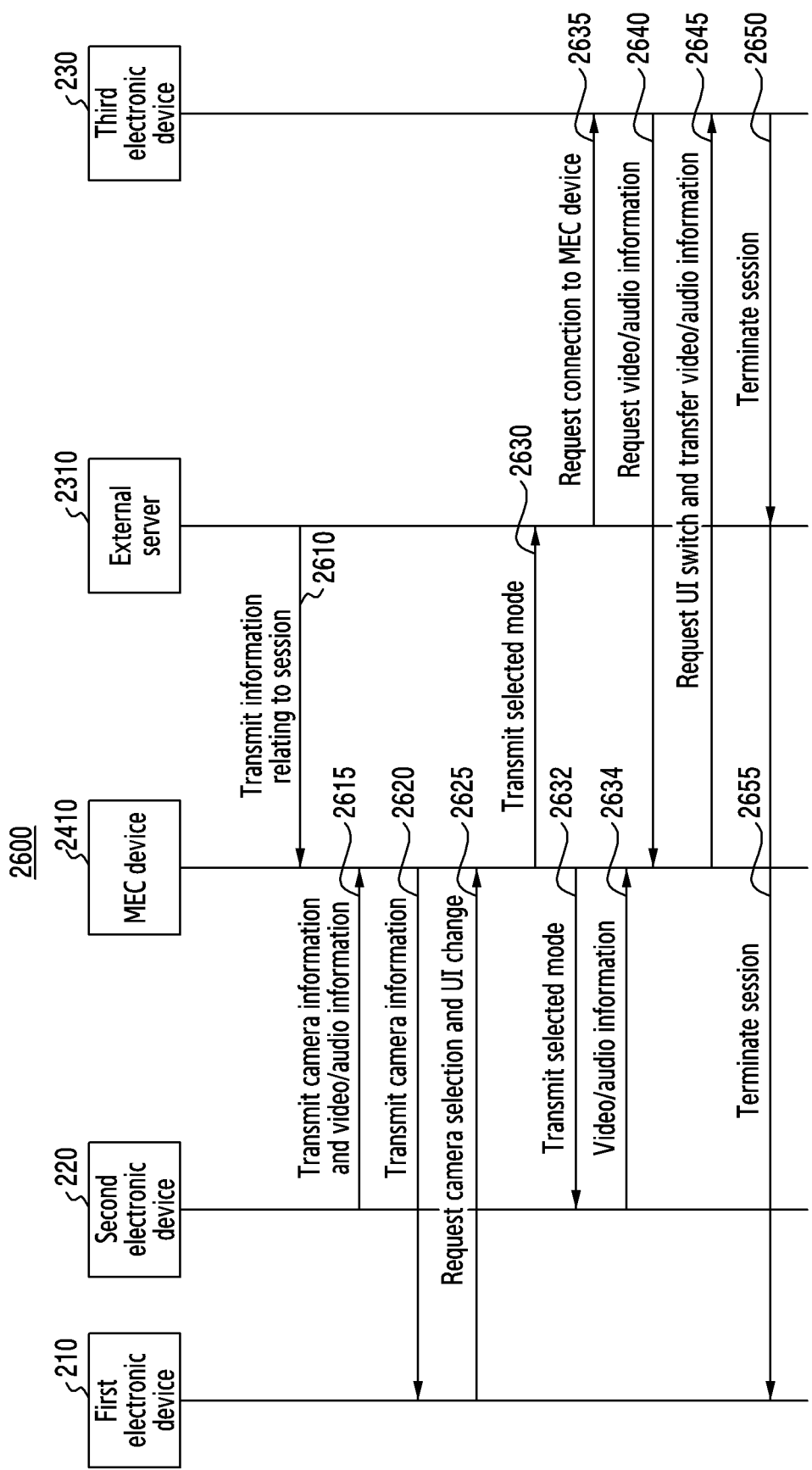
FIG. 26 is a signal flow diagram illustrating an example operation of switching a network connection in a network including an MEC device by electronic devices according to various embodiments.

FIG. 26 is a signal flow diagram 2600 illustrating an example operation of switching a network connection in a network including an MEC device 2410 by electronic devices according to an embodiment. A first electronic device 210 to a third electronic device 230 in FIG. 26 may correspond to the first electronic device 210 to the third electronic device 230 in FIGS. 2 and 3, and FIGS. 24 and 25, respectively. An MEC device 2410 in FIG. 26 may correspond to the MEC device 2410 in FIGS. 24 and 25. In an embodiment, operations in FIG. 26 may be performed after the operations in FIG. 24. In an embodiment, at least one of operations in FIG. 26 may be performed similar to at least one of the operations in FIG. 25. Operations in FIG. 26 may relate to soft handover between the first electronic device 210 and the third electronic device 230.

Referring to FIG. 26, the MEC device 2410 instead of an application server such as the external server 2310 may transmit video information and/or audio information of the second electronic device 220 to the third electronic device 230. To directly connect the MEC device 2410 and the third electronic device 230, the external server 2310 may transmit information required for connection of the MEC device 2410 to the third electronic device 230.

Referring to FIG. 26, in operation 2610, the external server 2310 may transmit information relating to a session (e.g. the session of operation 2420 in FIG. 24) between the first electronic device 210 and the third electronic device 230 to the MEC device 2410. The information may be used by the MEC device 2410 to connect the second electronic device 220 and the third electronic device 230, based on the session. In operation 2615, the second electronic device 220 may transmit information for identifying a camera included in the vehicle and video information and/or audio information obtained from the camera to the MEC device 2410. The second electronic device 220 may perform operation 2615 similar to operation 2510 in FIG. 25.

In operation 2620, the MEC device 2410 may transmit information relating to a camera of the second electronic device 220 to the first electronic device 210. The MEC device 2410 may perform operation 2620 similar to operation 2520 in FIG. 25. In response to reception of the information, the first electronic device 210 may request the MEC device 2410 to select a camera (or capturing mode) which is to transmit an image, or change a UI of the third electronic device 230 connected to the first electronic device 210, in operation 2625. The first electronic device 210 may perform operation 2625 similar to operation 2525 in FIG. 25.

In operation 2630, the MEC device 2410 having received the request may transmit a camera and/or capturing mode selected by the first electronic device 210, to the external server 2310.

In operation 2632, the MEC device 2410 having received the request may transmit a camera and/or capturing mode selected by the first electronic device 210, to the second electronic device 220. The transmission may be performed so that the MEC device 2410 obtains video information and/or audio information based on the selected camera and/or capturing mode from the second electronic device 220. The second electronic device 220 may receive the selected camera and/or capturing mode from the MEC device 2410.

In operation 2634, the second electronic device 220 may obtain video information and/or audio information, based on the selected camera and/or capturing mode using at least a part of the plurality of cameras included in the vehicle, and may transmit the obtained video information and/or audio information to the MEC device 2410.

In operation 2635, the external server 2310 may request the third electronic device 230 to connect to the MEC device 2410. The request may include information (e.g. an IP address and/or MAC address of the MEC device 2410) for identifying the MEC device 2410. In response to reception of the request, in operation 2640, the third electronic device 230 may request the video information and/or audio information of the second electronic device 220 from the MEC device 2410. In response to the request, in operation 2645, the MEC device 2410 may transmit the video information and/or audio information to the third electronic device 230. In an embodiment, the MEC device 2410 may request the third electronic device 230 to change the UI. The change of the UI may include a request of displaying, for example, a UI relating to the transmitted video information and/or audio information.

After an image obtained based on the second electronic device 220 and/or the vehicle has been transmitted to the third electronic device 230, the session between the first electronic device 210 and the third electronic device 230 may be stopped or terminated based on operation 2650 and/or operation 2655.

Figure 27:
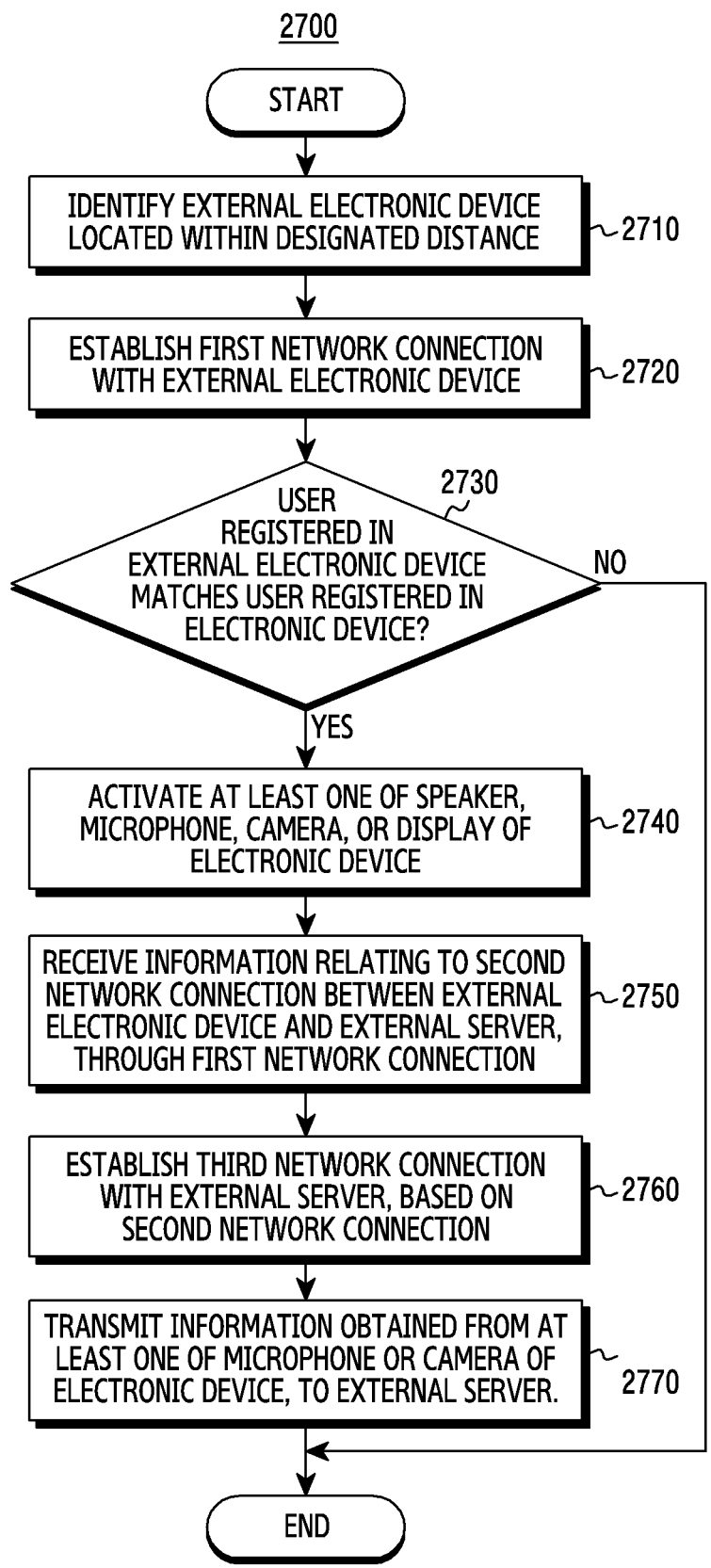
FIG. 27 is a flowchart illustrating an example operation of electronic device according to various embodiments.

FIG. 27 is a flowchart 2700 illustrating an example operation of an electronic device according to various embodiments. An electronic device in FIG. 27 may correspond to the second electronic device 220 in FIGS. 2, 3, and 5. At least one of operations in FIG. 27 may be performed by the second electronic device 220 in FIGS. 2, 3, and 5, and/or the processor 120-1 of the second electronic device 220 in FIG. 2. At least one of operations in FIG. 27 may be performed similar to at least one of the operations in FIGS. 3, 7, and/or 9.

Referring to FIG. 27, in operation 2710, an electronic device according to various embodiments may identify an external electronic device located within a designated distance. The external electronic device may correspond to, for example, the first electronic device 210 in FIG. 2. The electronic device according to an embodiment may perform operation 2710 similar to operation 710 in FIG. 7.

The electronic device according to an embodiment may identify an external electronic device located within a designated distance from the electronic device through at least one communication module (e.g. the communication module 190-1 in FIG. 2) included in the electronic device. In an embodiment, the communication module included in the electronic device may transmit and/or receive a wireless signal based on at least one of Bluetooth (BT), Bluetooth low energy (BLE), or ultra-wide band (UWB). In an embodiment, the electronic device may identify the external electronic device located within a second designated distance equal to or longer than the designated distance, based on the BLE or the UWB. In response to the identification of the external electronic device located within the second distance, the electronic device may initiate an operation, such as pairing, for wirelessly connecting to the external electronic device. In an embodiment, the electronic device may identify the external electronic device located within the designated distance, based on the BT or the UWB.

Referring to FIG. 27, in operation 2720, the electronic device according to various embodiments may establish a first network connection with the external electronic device. The first network connection may correspond to, for example, the third network connection 260 in FIG. 2. In an embodiment, in response to the identification of the external electronic device, the electronic device may establish a first network connection with the external electronic device to identify whether a user registered in the external electronic device is a user registered in the electronic device. The first network connection may be based on BT and/or a UWB.

Referring to FIG. 27, in operation 2730, the electronic device according to various embodiments may determine whether a user registered in the external electronic device matches a user registered in the electronic device. For example, the electronic device may determine whether a user registered in or using the external electronic device matches a user registered in the electronic device, based on biometric information and/or account information. For example, the electronic device may determine whether a user of the external electronic device matches a user registered in the electronic device, by comparing biometric information and/or account information registered in the electronic device before operation 2710 and biometric information and/or account information obtained from the external electronic device through the first network connection of operation 2720. The electronic device according to an embodiment may receive information relating to a user registered in the external electronic device, based on the BT or the UWB, and may identify or determine that the user registered in the external electronic device is a user registered in the electronic device, based on the information. If the user registered in the external electronic device does not match the user registered in the electronic device (operation 2730—No), the electronic device according to various embodiments may not switch a service being executed in the external electronic device.

If the user registered in the external electronic device matches the user registered in the electronic device (operation 2730—Yes), the electronic device according to various embodiments may activate at least one of a speaker, a microphone, a camera, or a display included in the electronic device, in operation 2740. In an embodiment, in response to the identification of the user registered in the external electronic device as the user registered in the electronic device, the electronic device may activate at least one of a speaker, a microphone, a camera, or a display. The speaker, the microphone, the camera, and/or the display may be installed in a vehicle including the electronic device. For example, the display may correspond to the display 1000 in FIG. 10A. The activation may include at least one of an operation of switching a hardware component from a sleep state to an active state and/or an operation of turning on a hardware component.

Referring to FIG. 27, in operation 2750, the electronic device according to various embodiments may receive information relating to a second network connection between the external electronic device and an external server, through the first network connection. The second network connection may be distinguished from the first network connection. The information relating to the second network connection may correspond to, for example, the information relating to the first network connection 240 in FIG. 2. The electronic device according to an embodiment may perform operation 2750 similar to operation 720 in FIG. 7.

In an embodiment, the external server may correspond to at least one of the server 1570 in FIG. 15, and the external server 2310 in FIGS. 23 to 26. In an embodiment, the electronic device and/or the external electronic device may connect to a 5G mobile communication network. In an embodiment, the external server may include a broadcasting server and a 5G mobile communication network mobile edge computing (MEC) server. The MEC server may correspond to, for example, at least one of the MEC 1540 in FIG. 15, the MEC host 2022 in FIG. 20, and/or the MEC device 2410 in FIGS. 24 to 26.

Referring to FIG. 27, in operation 2760, the electronic device according to various embodiments may establish a third network connection with the external server, based on the second network connection. The third network connection may correspond to, for example, the second network connection 250 in FIG. 2. The electronic device according to an embodiment may establish a third network connection with at least one external server, based on the second network connection through at least one communication module, based on the information received by operation 2750. For example, the third network connection may be established to provide a service corresponding to the second network connection. For example, the third network connection may be created based on an identifier related to an identifier (e.g. session ID) of the second network connection.

In an embodiment, in a case where the external server is a broadcasting server, the electronic device may request the broadcasting server to establish the third network connection related to an application used for transmitting information of a camera activated in operation 2740. The application may be previously installed in the electronic device, and may include information for connecting to the external server.

In an embodiment, if the electronic device is connected to a broadcasting server, based on a 5G mobile communication network, the electronic device may receive information of an MEC server from the broadcasting server. Based on the received information of the MEC server, the electronic device may transmit a connection request to the MEC server. The electronic device may perform authentication with the MEC server to establish a third network connection. The authentication may include an operation (e.g. an operation of obtaining and authenticating biometric information of a user, and receiving an ID and/or a password from a user) performed to log in to a service of the broadcasting server, based on a user input.

Referring to FIG. 27, in operation 2770, the electronic device according to various embodiments may transmit information obtained from at least one of the microphone or the camera of the electronic device, to the external server. In an embodiment, if the first network connection is based on a personal broadcasting application or a communication related application, the electronic device may execute the personal broadcasting application or the communication related application. The electronic device according to an embodiment may transmit information (e.g. information obtained from the microphone and/or the camera) obtained from the electronic device and/or the vehicle including the electronic device, to the external server through the application. The electronic device according to an embodiment may output data through at least one of the speaker or the display in response to reception of the data from the external server. For example, the electronic device may display information obtained from the electronic device and/or the external server, similar to the UI displayed in the display 1000 in FIGS. 10A to 10F. In an embodiment, the electronic device may perform operation 2770 similar to at least one of the operations in FIG. 9. In an embodiment, the electronic device may transmit information obtained from at least one of the microphone or the camera of the electronic device, to the MEC server.

Figure 28:
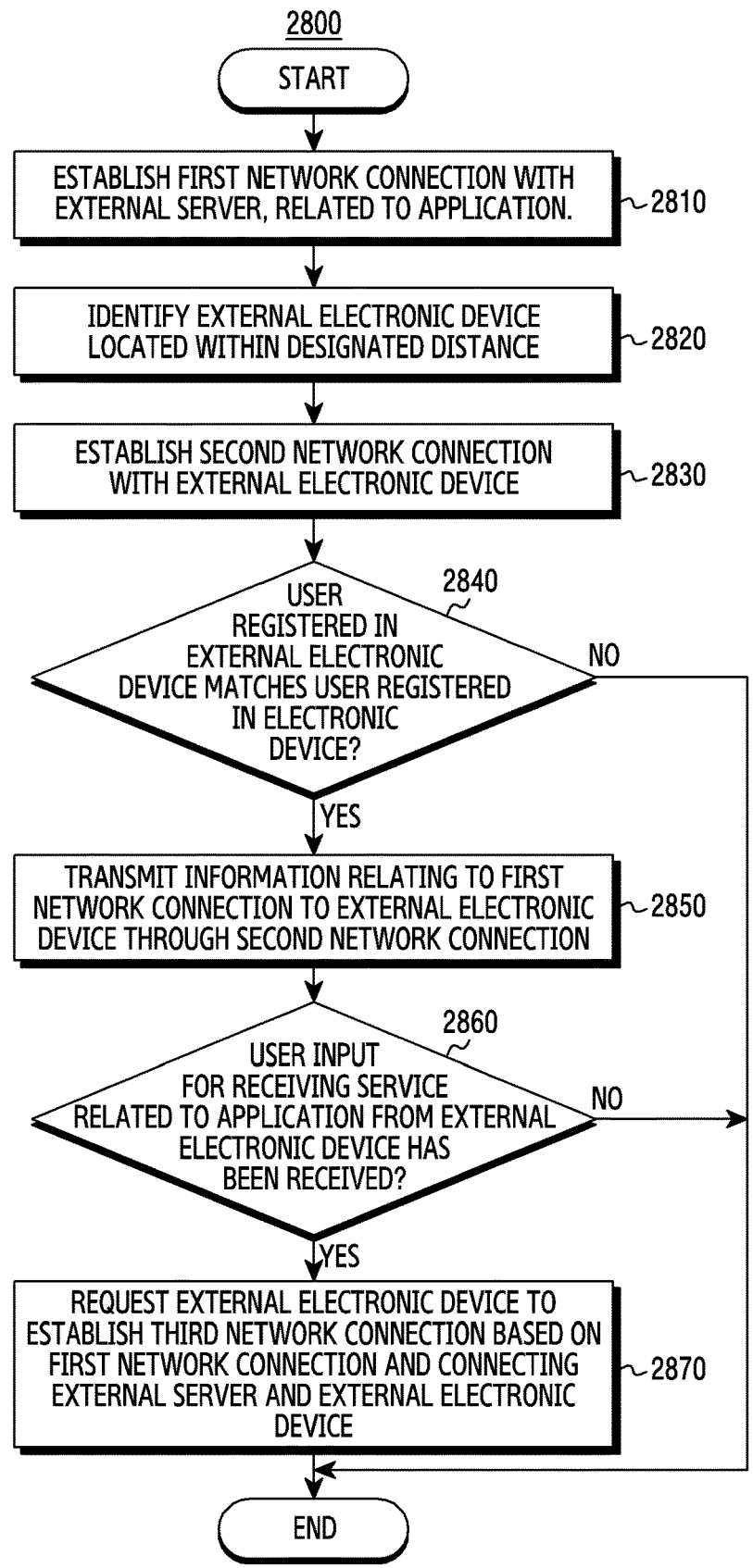
FIG. 28 is a flowchart illustrating an example operation of electronic device according to various embodiments.

FIG. 28 is a flowchart 2800 illustrating an example operation of an electronic device according to various embodiments. An electronic device in FIG. 28 may correspond to the first electronic device 210 in FIGS. 2, 3, and 5. At least one of operations in FIG. 28 may be performed by the first electronic device 210 in FIGS. 2, 3, and 5, and/or the processor 120 of the first electronic device 210 in FIG. 2. At least one of operations in FIG. 28 may correspond to or be performed similar to at least one of the operations in FIGS. 3 and 4 and/or FIG. 27.

Referring to FIG. 28, in operation 2810, an electronic device according to various embodiments may establish a first network connection with an external server, related to an application. In an embodiment, the external server may correspond to at least one of the server 1570 in FIG. 15, and the external server 2310 in FIGS. 23 to 26. In an embodiment, the electronic device and/or the external electronic device may connect to a 5G mobile communication network. In an embodiment, the external server may include a broadcasting server and a 5G mobile communication network mobile edge computing (MEC) server. The MEC server may correspond to, for example, at least one of the MEC 1540 in FIG. 15, the MEC host 2022 in FIG. 20, and/or the MEC device 2410 in FIGS. 24 to 26.

The electronic device according to an embodiment may establish a first network connection with at least one external server, configured for an application, using at least one communication module. The application may relate to a service for transmitting or receiving, in real time, a large volume of images, such as a video call service and/or personal broadcasting service provided through the external server. For example, the application may be based on a personal broadcasting application or a communication related application.

Referring to FIG. 28, in operation 2820, the electronic device according to various embodiments may identify an external electronic device located within a designated distance. The electronic device according to an embodiment may identify an external electronic device located within a designated distance from the electronic device and distinguished from the external server, using at least one communication module while the electronic device is establishing the first network connection of operation 2810. The external electronic device may correspond to, for example, the second electronic device 220 in FIG. 2. The identification of an external electronic device, based on operation 2820 by the electronic device may be performed, for example, corresponding to operation 2710 in FIG. 27.

The electronic device according to an embodiment may transmit or receive a wireless signal based on Bluetooth (BT), Bluetooth low energy (BLE), and/or ultra-wide band (UWB) using at least one communication module, so as to identify the external electronic device. For example, the electronic device may identify the external electronic device located within a second designated distance equal to or longer than the designated distance, based on the BLE or the UWB. In response to the identification of the external electronic device located within the second distance, the electronic device may initiate an operation, such as pairing, for wirelessly connecting to the external electronic device. In an embodiment, the electronic device may identify the external electronic device located within the designated distance, based on the BT or the UWB.

Referring to FIG. 28, in operation 2830, the electronic device according to various embodiments may establish a second network connection with the external electronic device. In response to the identification of the external electronic device, the electronic device according to an embodiment may establish a second network connection with the external electronic device to identify whether a user registered in the external electronic device is a user registered in the electronic device. The second network connection may correspond to, for example, the third network connection 260 in FIG. 2. The electronic device according to an embodiment may display device information and camera information of the external electronic device in a display (e.g. user interface) of the electronic device in response to the establishment of the second network connection.

Referring to FIG. 28, in operation 2840, the electronic device according to various embodiments may determine whether a user registered in the external electronic device matches a user registered in the electronic device. The electronic device according to an embodiment may determine whether a user registered in the external electronic device matches a user registered in the electronic device, by communicating with the external electronic device through the second network connection of operation 2830. The electronic device according to an embodiment may identify that a user registered in the external electronic device is a user registered in the electronic device, based on the BT or the UWB. In an embodiment, performing of operation 2830 and/or operation 2840 by the electronic device may correspond to performing of operation 2720 and/or operation 2730 in FIG. 27 by the external electronic device. If the user registered in the external electronic device does not match the user registered in the electronic device (operation 2840—No), the electronic device according to various embodiments may not switch a service based on the first network connection to the external electronic device.

If the user registered in the external electronic device matches the user registered in the electronic device (operation 2840—Yes), the electronic device according to various embodiments may transmit information relating to the first network connection to the external electronic device through the second network connection, in operation 2850. After the electronic device according to an embodiment has identified that the user registered in the external electronic device is the user registered in the electronic device, the electronic device may transmit information relating to the first network connection to the external electronic device through the second network connection. The second network connection may be distinguished from the first network connection. The second network connection may correspond to, for example, the first network connection 240 in FIG. 2. In an embodiment, the information relating to the first network connection, transmitted by the electronic device may be transmitted to the external electronic device, based on operation 2750 in FIG. 27.

Referring to FIG. 28, in operation 2860, the electronic device according to various embodiments may determine whether a user input for receiving a service related to the application from the external electronic device has been received. The electronic device according to an embodiment may receive a user input relating to whether to receive a service related to the application through the external electronic device, through a user interface based on the application. For example, the electronic device may display a visual element for selecting whether to switch a service related to the first network connection to the external electronic device, similar to the visual element 610 in FIG. 6A. In this case, the user input may include a user's gesture (e.g. click, double-click, tap, and double-tap) or voice input for selecting the visual element. If the user input is not received (operation 2860—No), the electronic device according to various embodiments may maintain the providing of the application and/or service through the first network connection.

If the user input has been received (operation 2860—Yes), the electronic device according to various embodiments may request the external electronic device to establish a third network connection that is based on the first network connection and connects the external server and the external electronic device, in operation 2870. The electronic device according to an embodiment may request the external electronic device to establish a third network connection that is based on the first network connection and connects the external server and the external electronic device, in response to the reception of the user input in operation 2860. The request may further include a request of switching the service based on the first network connection between the electronic device and the external server to the third network connection to be established between the external electronic device and the external server.

In an embodiment, after the establishment of the third network connection, the electronic device may receive a request of terminating the first network connection from the external server. Based on the received request, the electronic device may terminate the first network connection. In this case, the service which has been provided to the user of the electronic device, based on the first network connection between the electronic device and the external server may be continuously provided to the user, based on the third network connection between the external electronic device and the external server.

An electronic device (e.g. the electronic device 101 in FIG. 1, and the first electronic device 210 in FIG. 2) according to various example embodiments may include: a communication circuit (e.g. the communication module 190 in FIGS. 1 and 2); a display (e.g. the display device 160 in FIGS. 1 and 2); a memory (e.g. the memory 130 in FIGS. 1 and 2); and at least one processor (e.g. the processor 120 in FIGS. 1 and 2) operably connected to the communication circuit, the display, and the memory, wherein the at least one processor is configured to: identify a first network connection (e.g. the first network connection 240 in FIG. 2) between the electronic device and a first external electronic device (e.g. the third electronic device 230 in FIG. 2) using the communication circuit; identify a second external electronic device (e.g. the electronic device 220 in FIG. 2) and the first external electronic device in a state where the identified first network connection is maintained; in response to the identification of the second external electronic device, control the display to display a UI for connecting the first external electronic device and the second external electronic device on the display; and in response to an identification of an input to the UI, control the communication circuit to transmit, to the second external electronic device, information at least partially based on the first network connection and usable for establishing a second network connection (e.g. the second network connection 250) between the first external electronic device and the second external electronic device.

The electronic device according to an example embodiment may further include: a camera (e.g. the camera module 180 in FIG. 2); at least one microphone; and at least one speaker, wherein the at least one processor is configured to control the electronic device to: in response to identification of the first network connection related to a video call using the camera, the at least one microphone, and the at least one speaker, transmit a first image being captured by the camera to the first external electronic device through the first network connection; based on the first image being transmitted, receive a second image from the first external electronic device; and display at least one of the first image or the received second image on the display.

In the electronic device according to an example embodiment, the at least one processor may be configured to control the electronic device to transmit at least one of an identifier of the first external electronic device, time information of the first image, or time information of the second image to the second external electronic device in response to the identification of the user input.

In the electronic device according to an example embodiment, the at least one processor may be configured to identify the second external electronic device in response to identification of a distance between a vehicle including the second external electronic device and the electronic device, the distance corresponding to a distance shorter than a designated distance.

In the electronic device according to an example embodiment, the at least one processor may be configured to control the electronic device to: based on a wireless signal emitted from at least one of the second external electronic device or a vehicle including the second external electronic device, identify a state of the electronic device entering into the vehicle; and in response to the identification of the state of the electronic device entering into the vehicle, display the UI for connecting the first external electronic device and the second external electronic device on the display.

In the electronic device according to an example embodiment, the at least one processor may be configured to identify the state of the electronic device entering into the vehicle, based on the wireless signal received through the communication circuit and based on ultra-wide band (UWB) or Bluetooth low energy (BLE).

In the electronic device according to an example embodiment, the at least one processor may be configured to: at least based on the identification of the second external electronic device, request the first external electronic device to display a UI relating to a connection between the first external electronic device and the second external electronic device; and in response to reception of a request for connecting the first external electronic device and the second external electronic device from the first external electronic device, transmit the information for establishing the second network connection to the second external electronic device.

In the electronic device according to an example embodiment, the at least one processor may be configured to control the electronic device to terminate the first network connection in response to receiving a request of stopping the first network connection from the second external electronic device.

In the electronic device according to an example embodiment, the at least one processor may be configured to control the electronic device to: in response to the identification of the second external electronic device, receive information indicating a result of authentication of a user of the electronic device from the second external electronic device; and at least based on the received information, display a UI for connecting the first external electronic device and the second external electronic device in the display.

An electronic device (e.g. the electronic device 101 in FIG. 1, and the second electronic device 220 in FIG. 2) according to various example embodiments may include: at least one communication module comprising communication circuitry (e.g. the communication module 190-1 in FIG. 2); a speaker; a microphone; a camera (e.g. the camera module 180-1 in FIG. 2); a display (e.g. the display device 160-1 in FIG. 2); a processor (e.g. the processor 120-1 in FIG. 2) operably connected to the at least one communication module, the speaker, the microphone, the camera, and the display; and a memory (e.g. the memory 130-1 in FIG. 2) operably connected to the processor, wherein the memory is configured to store instructions which, when executed, cause the processor to control the electronic device to: identify an external electronic device (e.g. the first electronic device 210 in FIG. 2) located within a designated distance from the electronic device, through the at least one communication module; in response to the identification of the external electronic device, establish a first network connection (e.g. the third network connection 260 in FIG. 2) with the external electronic device to identify whether a user registered in the external electronic device is a user registered in the electronic device; in response to an identification of the user registered in the external electronic device as the user registered in the electronic device, activate at least a part of the speaker, the microphone, the camera, and the display; receive information relating to a second network connection (e.g. the first network connection 240 in FIG. 2) from the external electronic device through the first network connection; based on the received information, establish a third network connection (e.g. the second network connection 250 in FIG. 2) based on at least one external server (e.g. the third electronic device 230 in FIG. 2, and the external server 2310 in FIGS. 23 to 26) and the second network connection through the at least one communication module; and transmit information obtained from at least one of the microphone or the camera of the electronic device, to the external server through the third network connection.

In the electronic device according to an example embodiment, the at least one communication module may be based on at least one of Bluetooth (BT), Bluetooth low energy (BLE), or ultra-wide band (UWB), and the instructions may, when executed, cause the processor to control the electronic device to: identify the external electronic device located within a second designated distance equal to or greater than the designated distance, based on the BLE or the UWB; identify the external electronic device located within the designated distance, based on the BT or the UWB; and identify that the user registered in the external electronic device is the user registered in the electronic device, based on the BT or the UWB.

The electronic device according to an example embodiment may establish the third network connection related to a personal broadcasting application or a communication related application, based on the information relating to the second network connection; and in response to receiving data from the external server, output the data through at least one of the speaker or the display.

In an example embodiment, the at least one external server may include a broadcasting server and a mobile edge computing (MEC) server.

In the electronic device according to an example embodiment, the instructions may, when executed, cause the processor to control the electronic device to: request the broadcasting server to establish the third network connection related to an application for transmitting the camera information.

In the electronic device according to an example embodiment, the instructions may, when executed, cause the processor to control the electronic device to: receive information of the MEC server from the broadcasting server; transmit a connection request to the MEC server, based on the received information of the MEC server; and perform authentication with the MEC server to establish the third network connection.

An electronic device (e.g. the electronic device 101 in FIG. 1, and the first electronic device 210 in FIG. 2) according to various example embodiments may include: at least one communication module comprising communication circuitry (e.g. the communication module 190 in FIGS. 1 and 2); a user interface; a processor (e.g. the processor 120 in FIGS. 1 and 2) operably connected to the at least one communication module and the user interface; and a memory (e.g. the memory 130 in FIGS. 1 and 2) operably connected to the processor, wherein the memory is configured to store instructions which, when executed, cause the processor to control the electronic device to: establish a first network connection (e.g. the first network connection 240) with at least one external server (e.g. the third electronic device 230 in FIG. 2, and the external server 2310 in FIGS. 23 to 26) configured for an application, using the at least one communication module; based on the first network connection being established, identify an external electronic device (e.g. the electronic device 220 in FIG. 2) located within a designated distance from the electronic device and distinguished from the external server, using the at least one communication module; in response to the identification of the external electronic device, establish a second network connection (e.g. the third network connection 260 in FIG. 2) with the external electronic device to identify whether a user registered in the external electronic device is a user registered in the electronic device; based on the user registered in the external electronic device being identified to be the user registered in the electronic device, transmit information relating to the first network connection to the external electronic device through the second network connection; receive an input relating to whether to receive a service related to the application through the external electronic device, through a user interface based on the application; and in response to receiving the input, request the external electronic device to establish a third network connection (e.g. the second network connection 250) based on the first network connection and connecting the external server and the external electronic device.

In an example embodiment, the at least one communication module may be based on Bluetooth (BT), Bluetooth low energy (BLE), and/or ultra-wide band (UWB), and the instructions may, when executed, cause the processor to control the electronic device to: identify the external electronic device located within a second designated distance equal to or greater than the designated distance, based on the BLE or the UWB; identify the external electronic device located within the designated distance, based on the BT or the UWB; and identify that the user registered in the external electronic device is the user registered in the electronic device, based on the BT or the UWB.

The electronic device according to an example embodiment may request the establishment of the third network connection, based on a personal broadcasting application or a communication related application.

In the electronic device according to an example embodiment, the instructions may, when executed, cause the processor to control the electronic device to: display device information and camera information of the external electronic device through the user interface.

In the electronic device according to an example embodiment, the instructions may, when executed, cause the processor to control the electronic device to: receive a request of terminating the first network connection from the external server; and terminate the first network connection, based on the received request.

Methods disclosed in the claims and/or methods according to various embodiments described in the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. An electronic device comprising:
a communication circuit;
a display;

a memory; and at least one processor operably connected to the communication circuit, the display, and the memory, wherein the at least one processor is configured to:

identify a first network connection between the electronic device and a first external electronic device using the communication circuit;

identify a second external electronic device while the first network connection is maintained;

transmit, to the first external device, information notifying that the electronic device has entered into a vehicle comprising the second external electronic device, in response to the identification of the second external electronic device, control a display to display a user interface (UI) for connecting the first external electronic device and the second external electronic device; and in response to an identification of an input in the UI, control the electronic device to transmit, to the second external electronic device, information at least partially based on the first network connection and usable for establishing a second network connection between the first external electronic device and the second external electronic device.

2. The electronic device of claim 1, further comprising:
a camera;
at least one microphone; and
at least one speaker, wherein the at least one processor is configured to control the electronic device to:

in response to identification of the first network connection related to a video call using the camera, the at least one microphone, and the at least one speaker, transmit a first image being captured by the camera to the first external electronic device through the first network connection;

based on the first image being transmitted, receive a second image from the first external electronic device; and display at least one of the first image or the received second image on the display.

3. The electronic device of claim 2, wherein the at least one processor is configured to control the electronic device to transmit at least one of an identifier of the first external electronic device, time information of the first image, or time information of the second image to the second external electronic device in response to the identification of the input.

4. The electronic device of claim 1, wherein the at least one processor is configured to identify the second external electronic device in response to identification of a distance between the vehicle comprising the second external electronic device and a user of the electronic device, the distance corresponding to a distance less than a designated distance.

5. The electronic device of claim 1, wherein the at least one processor is configured to control the electronic device to:

based on a wireless signal emitted from at least one of the second external electronic device or the vehicle comprising the second external electronic device, identify a state of the electronic device entering into the vehicle; and in response to the identification of the state of the electronic device entering into the vehicle, display the UI for connecting the first external electronic device and the second external electronic device on the display.

6. The electronic device of claim 5, wherein the at least one processor is configured to identify the state of the electronic device entering into the vehicle, based on the wireless signal received through the communication circuit and based on ultra-wide band (UWB) or Bluetooth low energy (BLE).

7. The electronic device of claim 1, wherein the at least one processor is configured to control the electronic device to:

at least based on the identification of the second external electronic device, request the first external electronic device to display a UI relating to a connection between the first external electronic device and the second external electronic device; and in response to receiving a request for connecting the first external electronic device and the second external electronic device from the first external electronic device, transmit the information for establishing the second network connection to the second external electronic device.

8. The electronic device of claim 1, wherein the at least one processor is configured to terminate the first network connection in response to receiving a request for stopping the first network connection from the second external electronic device.

9. The electronic device of claim 1, wherein the at least one processor is configured to control the electronic device to:

in response to the identification of the second external electronic device, receive information indicating a result of authentication of a user of the electronic device from the second external electronic device; and at least based on the received information, display a UI for connecting the first external electronic device and the second external electronic device on the display.

10. An electronic device comprising:
at least one communication module comprising communication circuitry;
a speaker;
a microphone;
a camera;
a display;
a processor operably connected to the at least one communication module, the speaker, the microphone, the camera, and the display; and
a memory operably connected to the processor, wherein the memory is configured to store instructions which, when executed, cause the processor to control the electronic device to:

identify an external electronic device located within a designated distance of the electronic device, through the at least one communication module;

in response to the identification of the external electronic device, establish a first network connection with the external electronic device to identify whether a user registered in the external electronic device is a user registered in the electronic device;

in response to an identification of the user registered in the external electronic device as the user registered in the electronic device, activate at least one of the speaker, the microphone, the camera, or the display;

receive information relating to a second network connection from the external electronic device through the first network connection;

based on the received information, establish a third network connection based on at least one external server and the second network connection through the at least one communication module; and transmit information obtained from at least one of the microphone or the camera of the electronic device, to the external server through the third network connection.

11. The electronic device of claim 10, wherein the at least one communication module is based on at least one of Bluetooth (BT), Bluetooth low energy (BLE), or ultra-wide band (UWB), and wherein the instructions, when executed, cause the processor to control the electronic device to:

identify the external electronic device located within a second designated distance equal to or greater than the designated distance, based on the BLE or the UWB;

identify the external electronic device located within the designated distance, based on the BT or the UWB; and identify that the user registered in the external electronic device is the user registered in the electronic device, based on the BT or the UWB.

12. The electronic device of claim 10, wherein the instructions, when executed, cause the processor to control the electronic device to:

establish the third network connection related to a personal broadcasting application or a communication related application based on the information relating to the second network connection; and in response to receiving data from the external server, output the data through at least one of the speaker or the display.

13. The electronic device of claim 10, wherein the at least one external server comprises a broadcasting server and a mobile edge computing (MEC) server.

14. The electronic device of claim 13, wherein the instructions, when executed, cause the processor to control the electronic device to request the broadcasting server to establish the third network connection related to an application for transmitting the information obtained from at least one of the microphone or the camera.

15. The electronic device of claim 14, wherein the instructions, when executed, cause the processor to:

receive information of the MEC server from the broadcasting server;

transmit a connection request to the MEC server based on the received information of the MEC server; and perform authentication with the MEC server to establish the third network connection.

16. An electronic device comprising:

at least one communication module comprising communication circuitry;

a user interface;

a processor operably connected to the at least one communication module and the user interface; and a memory operably connected to the processor, wherein the memory is configured to store instructions which, when executed, cause the processor to control the electronic device to:

establish a first network connection with at least one external server, configured for an application, using the at least one communication module;

based on the first network connection being established, identify an external electronic device located within a designated distance from the electronic device, the external electronic device being distinguished from the external server, using the at least one communication module;

in response to the identification of the external electronic device, establish a second network connection with the external electronic device to identify whether a user registered in the external electronic device is a user registered in the electronic device;

based on the user registered in the external electronic device being identified to be the user registered in the electronic device, transmit information relating to the first network connection to the external electronic device through the second network connection;

receive an input relating to whether to receive a service related to the application through the external electronic device through a user interface based on the application; and in response to the receiving the input, request the external electronic device to establish a third network connection based on the first network connection and connecting the external server and the external electronic device.

17. The electronic device of claim 16, wherein the at least one communication module is based on Bluetooth (BT), Bluetooth low energy (BLE), and/or ultra-wide band (UWB), and wherein the instructions, when executed, cause the processor to control the electronic device to:

identify the external electronic device located within a second designated distance equal to or greater than the designated distance based on the BLE or the UWB;

identify the external electronic device located within the designated distance based on the BT or the UWB; and identify that the user registered in the external electronic device is the user registered in the electronic device based on the BT or the UWB.

18. The electronic device of claim 16, wherein the instructions, when executed, cause the processor to control the electronic device to request the establishment of the third network connection based on a personal broadcasting application or a communication related application.

19. The electronic device of claim 16, wherein the instructions, when executed, cause the processor to control the electronic device to display device information and camera information of the external electronic device through the user interface.

20. The electronic device of claim 16, wherein the instructions, when executed, cause the processor to control the electronic device to:

receive a request for terminating the first network connection from the external server; and terminate the first network connection based on the received request.

* * * * *